United States Patent
Lan

(10) Patent No.: US 10,364,936 B2
(45) Date of Patent: Jul. 30, 2019

(54) ADHESION-TYPE HOLDING STRUCTURE MOUNTED ONTO WALL

(71) Applicant: Yung-Huei Lan, Taipei (TW)

(72) Inventor: Yung-Huei Lan, Taipei (TW)

(*) Notice: Subject to any disclaimer, the term of this patent is extended or adjusted under 35 U.S.C. 154(b) by 264 days.

(21) Appl. No.: 15/269,953

(22) Filed: Sep. 19, 2016

(65) Prior Publication Data

US 2017/0009936 A1 Jan. 12, 2017

Related U.S. Application Data

(63) Continuation of application No. PCT/CN2015/074152, filed on Mar. 13, 2015.

(30) Foreign Application Priority Data

Mar. 21, 2014 (CN) .......................... 2014 1 0108648

(51) Int. Cl.
| | |
|---|---|
| *A47G 1/17* | (2006.01) |
| *F16M 13/02* | (2006.01) |
| *F16B 1/00* | (2006.01) |
| *F16B 11/00* | (2006.01) |
| *F16B 47/00* | (2006.01) |
| *G08B 21/18* | (2006.01) |

(52) U.S. Cl.
CPC .............. *F16M 13/022* (2013.01); *A47G 1/17* (2013.01); *F16B 1/00* (2013.01); *F16B 11/006* (2013.01); *F16B 47/00* (2013.01); *G08B 21/18* (2013.01); *F16B 2001/0028* (2013.01); *F16B 2001/0035* (2013.01)

(58) Field of Classification Search
USPC ......... 248/550, 683, 685, 205.3, 205.4, 304, 248/306, 307, 308, 316.8, 322
See application file for complete search history.

(56) References Cited

U.S. PATENT DOCUMENTS

| | | | | |
|---|---|---|---|---|
| 1,219,045 | A * | 3/1917 | Schmidt ............... | A22C 15/003 248/306 |
| 4,821,992 | A * | 4/1989 | Johnson .................... | A47G 1/20 248/306 |
| 5,507,464 | A * | 4/1996 | Hamerski .............. | A47G 1/175 248/205.3 |
| 6,082,686 | A * | 7/2000 | Schumann ............. | A47G 1/175 205/308 |
| 8,814,112 | B2 * | 8/2014 | Thompson ............. | A47G 1/175 248/205.3 |

(Continued)

*Primary Examiner* — Terrell L McKinnon
*Assistant Examiner* — Michael McDuffie

(57) ABSTRACT

The present invention provides an adhesion-type holding structure mounted onto a wall comprising: a main attaching member including a holding portion for bearing an external object, and an adhering portion for adhering to a wall; a backup attaching member including an adhering portion for adhering to a wall; and a safety mechanism including a replacement device disposed between the main attaching member and the backup attaching member. When the main attaching member and the backup attaching member are attached to a wall on positions close to each other and the main attaching member comes loose from the wall and falls down, the backup attaching member can prevent, by means of the replacement device, the main attaching member from falling down, and timely replaces the main attaching member to hold the holding portion.

12 Claims, 37 Drawing Sheets

(56) References Cited

U.S. PATENT DOCUMENTS

| | | | | |
|---|---|---|---|---|
| 8,973,878 B2* | 3/2015 | Thompson | ............ | A47G 1/175 |
| | | | | 248/221.11 |
| 2001/0028022 A1* | 10/2001 | Hamerski | ............... | A47G 1/175 |
| | | | | 248/205.3 |
| 2007/0257165 A1* | 11/2007 | Newbould | ............. | A47G 1/175 |
| | | | | 248/205.3 |
| 2009/0211066 A1* | 8/2009 | Swanepoel | ............. | A47G 1/17 |
| | | | | 24/304 |
| 2011/0011994 A1* | 1/2011 | Ahlstrom | ............... | A47G 1/168 |
| | | | | 248/205.4 |
| 2015/0201764 A1* | 7/2015 | Sato | ....................... | A47G 1/175 |
| | | | | 248/205.4 |
| 2016/0009393 A1* | 1/2016 | Repp | ........................ | B64D 1/22 |
| | | | | 701/34.4 |
| 2017/0007046 A1* | 1/2017 | Wiseman | ................ | A47G 1/17 |

* cited by examiner

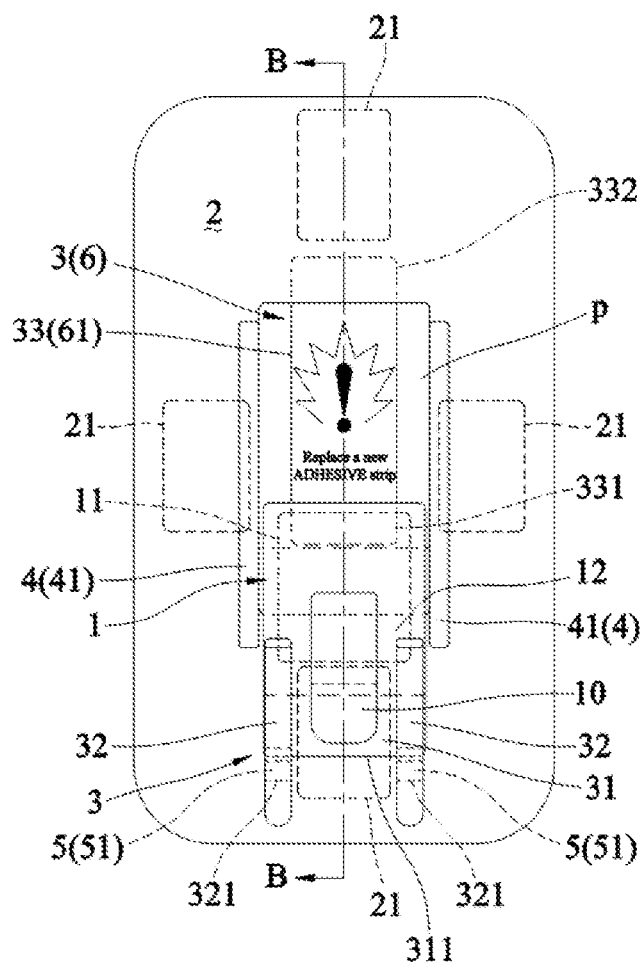
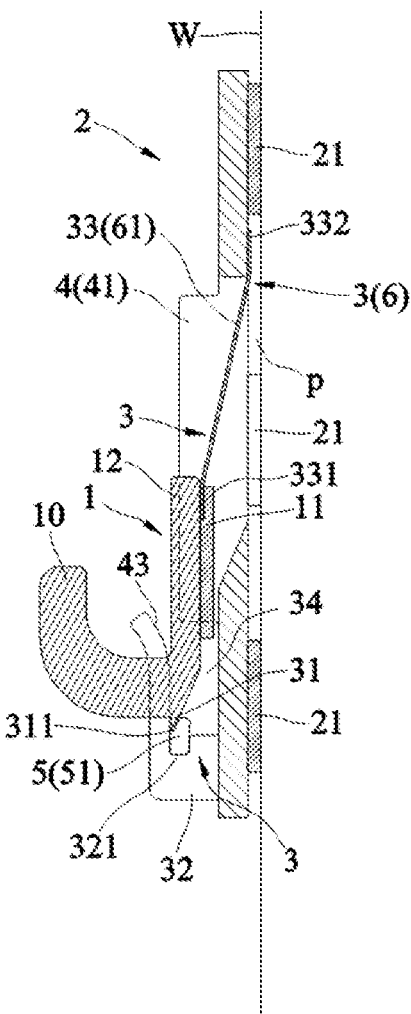
Fig.4
Fig.5

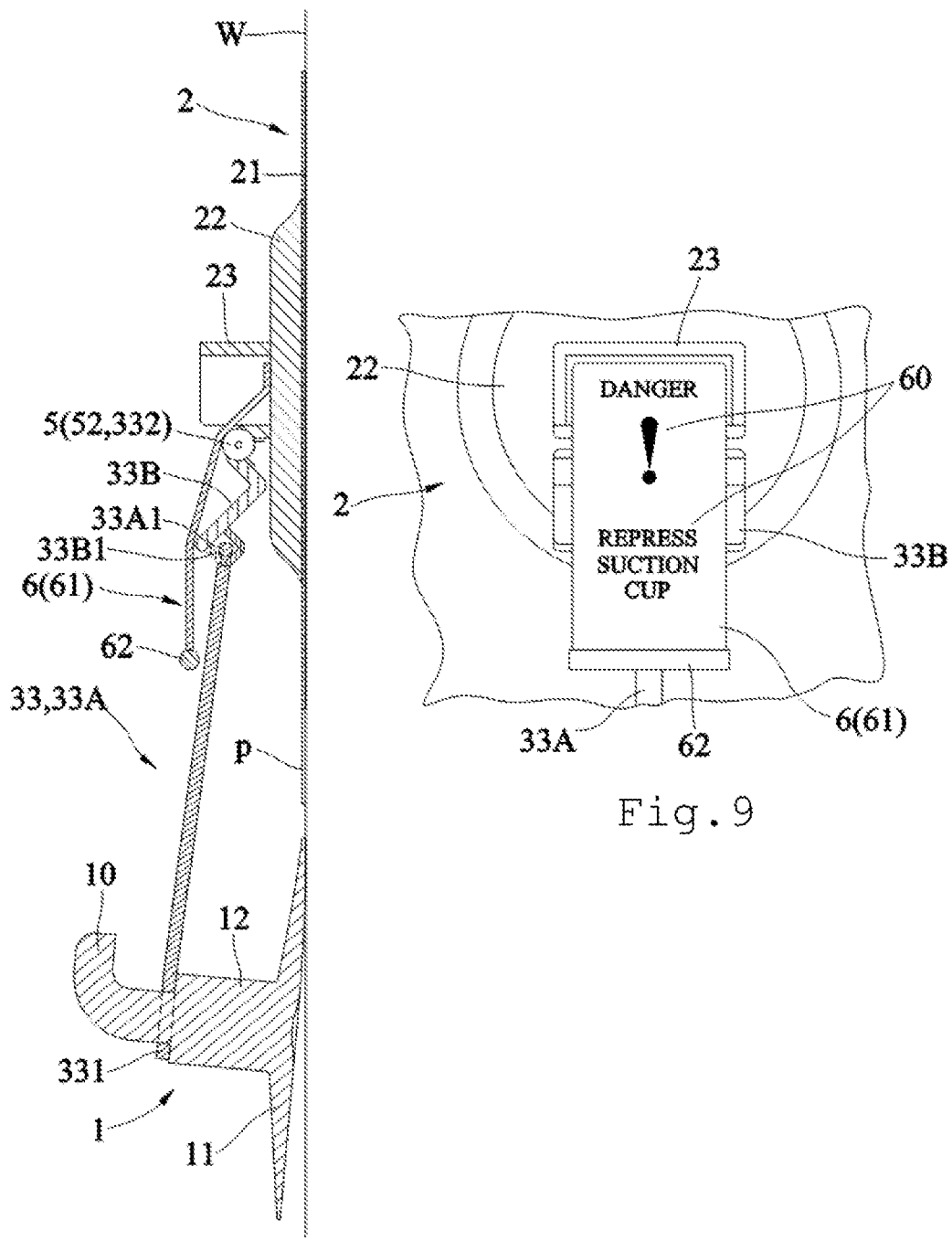

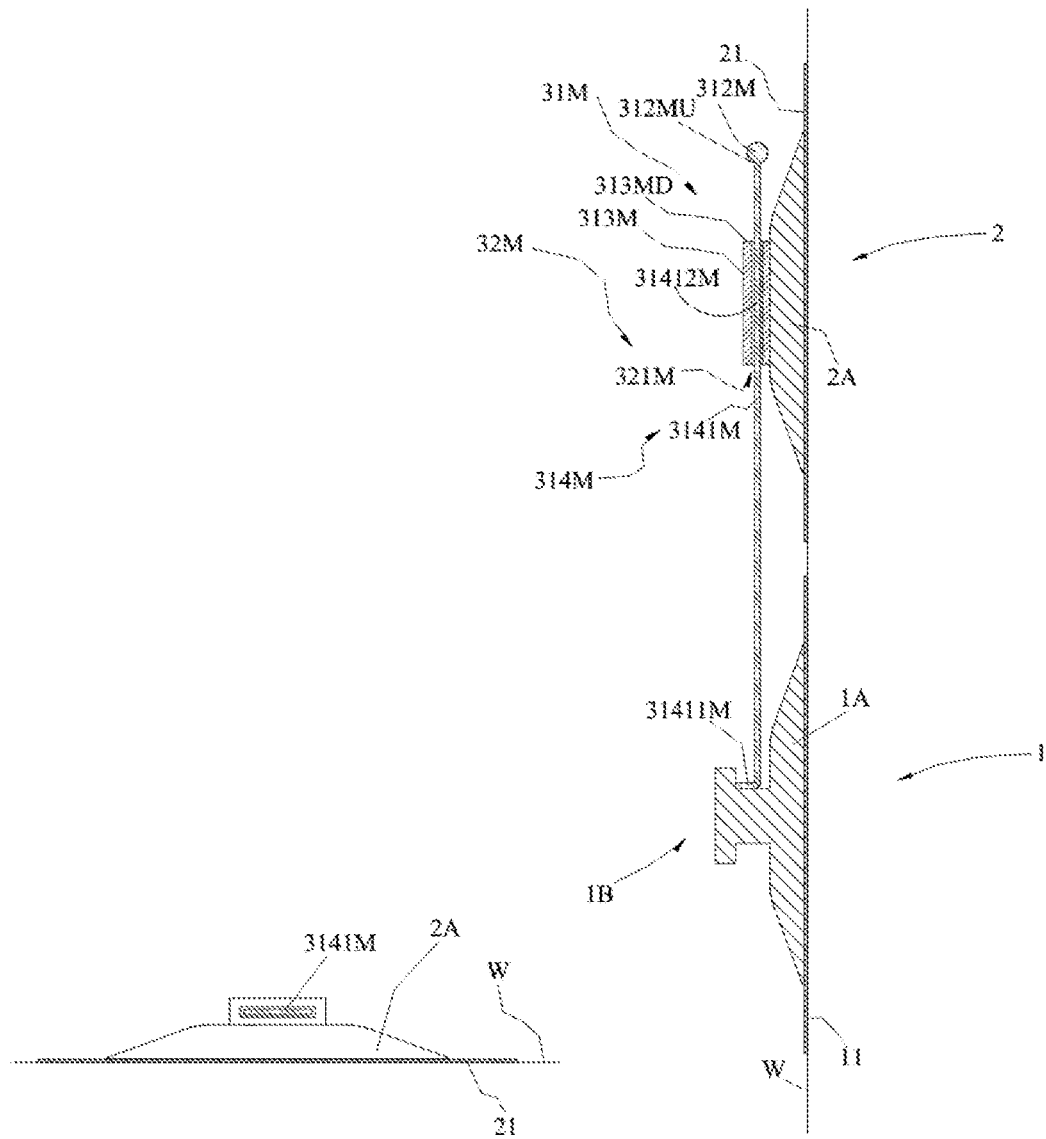

ADHESION-TYPE HOLDING STRUCTURE MOUNTED ONTO WALL

CROSS-REFERENCE TO RELATED APPLICATIONS

This present application is a Continuation application of PCT application No. PCT/CN2015/074152 filed on Mar. 13, 2015, which claims the benefit of Chinese Patent Application No. 201410108648.0 filed on Mar. 21, 2014, the contents of which are hereby incorporated by reference.

BACKGROUND OF THE INVENTION

1. Field of the Invention

The present invention relates to a holding structure that is attached and fastened to an application surface or a wall by means of a non-permanent fastening manner such as sticking, adhesion, or absorption, and more particularly to an adhesion-type holding structure mounted onto a wall capable of preventing a borne external object from falling.

2. Description of the Related Art

A known adhesion-type holding member mounted onto a wall that is fastened to an application surface or a wall by means attachment manners such as sticking, adhesion, or absorption and has a shape or structure for holding, supporting, or placing an object may fall due to a reason that an external object placed on the holding member is excessively heavy and exceeds a bearing capability of the holding member or a usage time is excessively long, which may cause an unsafe event such as an object is broken or an object hits a person. The holding member falls at an unpredictable time. The foregoing circumstances may be acceptable to consumers or users in earlier years. However, modern products place emphasis on safety and reliability, which has long been the trend of the times. A holding member that falls at an unpredictable time fails to meet the requirements of the times, and there is an urgent demand for upgrading and seeking an improvement or resolving approach.

SUMMARY OF THE INVENTION

In view of the above, an objective of the present invention is to provide, with regard to a situation that an adhesion-type holding portion mounted onto a wall falls at an unpredictable time due to a reason that an external object is excessively heavy and exceeds a bearing capability of the holding portion or a usage time is excessively long, an adhesion-type holding structure mounted onto a wall capable of preventing an external object held by a holding portion from falling to the ground, and it is expected that a user timely enables, when the user notices occurrence of a falling situation, an attaching member to be recovered to a normal adhesion state, thereby permanently guaranteeing the safety of the held external object.

To achieve the foregoing objective, the present invention provides an adhesion-type holding structure mounted onto a wall, including:

a main attaching member, including a holding portion for bearing an external object and an adhering portion for adhering to a wall;

a backup attaching member, including an adhering portion for adhering to a wall; and a safety mechanism, including a replacement device disposed between the main attaching member and the backup attaching member, where when the main attaching member and the backup attaching member are synchronously attached to a wall on positions close to each other, and the main attaching member comes loose from the wall and falls down, the backup attaching member can prevent, by means of the replacement device, the main attaching member from falling down, and timely replaces the main attaching member to hold the holding portion.

In the adhesion-type holding structure mounted onto a wall, the safety mechanism further includes a guiding device for enabling the holding portion to keep an upright posture when the holding portion comes loose from the wall and falls down.

In the adhesion-type holding structure mounted onto a wall, the safety mechanism further includes a buffer device for reducing a falling speed of the main attaching member that comes loose from the wall and falls down and/or reducing vibration and shaking of the holding portion. In the adhesion-type holding structure mounted onto a wall, the safety mechanism further includes a warning device for generating warning information when the holding portion comes loose from the wall and falls down.

In the adhesion-type holding structure mounted onto a wall, the safety mechanism further includes a guiding device for enabling the holding portion to keep an upright posture when the holding portion comes loose from the wall and falls down, and a buffer device for reducing a falling speed of the main attaching member that comes loose from the wall and falls down and/or reducing vibration and shaking of the holding portion. In the adhesion-type holding structure mounted onto a wall, the safety mechanism further includes a guiding device for enabling the holding portion to keep an upright posture when the holding portion comes loose from the wall and falls down, and a warning device for generating warning information when the holding portion comes loose from the wall and falls down.

In the adhesion-type holding structure mounted onto a wall, the safety mechanism further includes a buffer device for reducing a falling speed of the main attaching member that comes loose from the wall and falls down and/or reducing vibration and shaking of the holding portion, and a warning device for generating warning information when the holding portion comes loose from the wall and falls down.

In the adhesion-type holding structure mounted onto a wall, the safety mechanism further includes a guiding device for enabling the holding portion to keep an upright posture when the holding portion comes loose from the wall and falls down, a buffer device for reducing a falling speed of the main attaching member that comes loose from the wall and falls down and/or reducing vibration and shaking of the holding portion, and a warning device for generating warning information when the holding portion comes loose from the wall and falls down.

In the adhesion-type holding structure mounted onto a wall, the main attaching member or the backup attaching member further includes a connection portion connected to the adhering portion.

In the adhesion-type holding structure mounted onto a wall, the connection portion is a base, a connecting bar, a flexible strip, a spring, a soft wire, a chain, or a connecting rod.

In the adhesion-type holding structure mounted onto a wall, the main attaching member further includes a connection portion connected to the holding portion.

In the adhesion-type holding structure mounted onto a wall, the main attaching member and the holding member are insecurely connected.

In the adhesion-type holding structure mounted onto a wall, the adhering portion is a suction cup, an adhesive, an adhered pad, an adhesive strip, an adhesive sheet, a magnet, a hot melt adhesive, or a hook and loop fastener.

In the adhesion-type holding structure mounted onto a wall, the backup attaching member is provided with a main adhered object position for providing an adhering position for the main attaching member.

In the adhesion-type holding structure mounted onto a wall, the main adhered object position is disposed at the adhering portion of the backup attaching member, or the main adhered object position is disposed at a position indicator extending outwards from the backup attaching member.

In the adhesion-type holding structure mounted onto a wall, the holding portion is a hook, a hanger, a box-like object, a ledge, a towel bar, a container, a shelf, or a wall handle.

In the adhesion-type holding structure mounted onto a wall, the replacement device includes:

a connecting member, having a first connection position connected to the main attaching member and a second connection position connected to the backup attaching member.

In the adhesion-type holding structure mounted onto a wall, the connecting member is provided with warning information.

In the adhesion-type holding structure mounted onto a wall, the warning information is hidden when the main attaching member adheres to the wall, and is visualized after the main attaching member comes loose from the wall; a position of the first connection position is lower than a position of the second connection position; when in a normal usage state, the maximum length of the connecting member is greater than the distance between the first connection position and the second connection position; and the connecting member is a flexible strip, a soft wire, a chain, a connecting rod, or a telescopic mechanism.

In the adhesion-type holding structure mounted onto a wall, the replacement device includes:

an abutment portion, connected to the main attaching member and provided with a first connection position; and a receiving portion, connected to the backup attaching member and provided with a second connection position, where a position of the second connection position is lower than a position of the first connection position.

In the adhesion-type holding structure mounted onto a wall, the receiving portion has an accommodation groove capable of receiving the main attaching member.

In the adhesion-type holding structure mounted onto a wall, the guiding device includes a guided portion and a guiding portion that are respectively disposed at the main attaching member and the backup attaching member.

In the adhesion-type holding structure mounted onto a wall, the guided portion and the guiding portion can be fitted with each other and thus can slide relative to each other; and the guiding portion is one or more guiding walls disposed at the backup attaching member, or the guiding portion is a guiding accommodation position disposed at the backup attaching member, and a guiding surface for guiding the falling main attaching member to arrive at the guiding accommodation position.

In the adhesion-type holding structure mounted onto a wall, the guiding device includes a guiding surface that is disposed at the main attaching member or the backup attaching member and is capable of limiting a falling path of the main attaching member.

In the adhesion-type holding structure mounted onto a wall, the guiding device includes a guiding surface, and the guiding surface is an inclined plane or cambered surface.

In the adhesion-type holding structure mounted onto a wall, the buffer device is a cushioning pad, a damping device, or a friction member.

In the adhesion-type holding structure mounted onto a wall, the cushioning pad is connected to the main attaching member or the backup attaching member.

In the adhesion-type holding structure mounted onto a wall, the warning device is a warning information display member capable of displaying warning information, and the warning information is hidden when the main attaching member adheres to the wall, and is visualized after the main attaching member comes loose from the wall.

In the adhesion-type holding structure mounted onto a wall, the warning information display member is connected to the backup attaching member, or the warning information display member is disposed at a shielded position of the main attaching member; and the warning information is hidden when the main attaching member adheres to the wall, and is visualized after the main attaching member comes loose from the wall.

In the adhesion-type holding structure mounted onto a wall, the warning device is an electronic warning device capable of sending a warning signal.

On the basis of the above, the present invention provides a technical solution in which a backup attaching member is additionally provided and a safety mechanism is provided. That is, a construction for implementing this technical solution mainly includes: a main attaching member, having a holding portion for bearing an external object and an adhering portion for adhering to a wall; a backup attaching member, having an adhering portion for adhering to a wall; and a safety mechanism.

The architecture of the concept of the present invention is that: the main attaching member and the backup attaching member are synchronously attached to the wall; there are the holding portion (for bearing an external object) and the safety mechanism (intending to perform replacement safely); a normal usage state is that the main attaching member is connected to the holding portion, so as to bear the external object; when the main attaching member falls, the safety mechanism performs timely replacement, such that the backup attaching member is connected to the holding portion, so as to bear the external object; for pursuing comprehensiveness, the safety mechanism may include: (1) the replacement device; (2) the guiding device; (3) the buffer device; and (4) the warning device. Operations of the four devices are introduced one by one below. The operation of the aforementioned replacement device is to timely enable, when the main attaching member with the holding portion comes loose from the wall and falls down, the backup attaching member to replace the main attaching member to hold the holding portion. The main content of the "replace" may be further divided into: (1) prevent, and (2) connect.

From the perspective of mechanics, prevention means providing a resistance for offsetting an impact force of the falling, that is, prevention is achieved by enabling disappearance of kinetic energy. The manner of prevention may be further classified into "pull to prevent" and "block to prevent" (which are the perspectives of mechanics of the connection type replacement device and the receiving type replacement device described later in the specification).

Based on different points of application, the foregoing resistance may be called a pulling force (pulling resistance) or a blocking force (blocking resistance).

When the prevention is achieved, the formal connection starts. When the connection is not established, the main attaching member is formally used. When the connection is established, the main attaching member has fallen, and the backup attaching member is formally activated.

When the "block to prevent" is used, in the construction, the first connection position located at the main attaching member or the holding portion is higher than the second connection position located at the backup attaching member, and when the lower second connection position is in contact with and is connected to the upper first connection position, the backup attaching member performs blocking to prevent the main attaching member or the holding portion from falling down, that is, the backup attaching member receives the holding portion.

When the "pull to prevent" is used, there is the connecting member connected between the holding portion (the main attaching member) and the backup attaching member; the connecting member and the first connection position of the holding portion (the main attaching member) is lower than the second connection position of the backup attaching member; when the connecting member is tightened or is totally stretched, the upper second connection position of the backup attaching member pulls, via the connecting member, the lower first connection position of the holding portion (the main attaching member), that is, the backup attaching member is connected to the holding portion, and performs pulling to prevent the holding portion from falling down. The operation of the foregoing guiding device is to enable the holding portion to keep an upright posture when the holding portion comes loose from the wall and falls down, and can be further classified into "open type guiding" and "closed trajectory type guiding" in implementation.

Open type guiding: for example, in FIG. 23 and FIG. 26, a flared opening at an opening of an accommodation groove receives an abutment portion falling down from the above and guides the abutment portion into the groove; and for another example, in FIG. 3, a guiding surface receives the holding portion falling down from the above and enables the holding portion to enter a guiding accommodation position (receiving, at a lower position, a component falling down from tan upper position).

Closed trajectory type guiding: for example, in FIG. 20 to FIG. 22, a set formed by a (T-shaped) slider and a (T-shaped) sliding groove, or a set formed by a guide pin and a guide bushing (which keeps, by limiting, the uprightness from the start of falling of the adhering portion to the completeness of the replacement of the main attaching member with the backup attaching member, that is, during a whole process of the replacement). In practice, the selection of the manners depends on a product. For example, if a holding portion is a container with a cover, and a held external object hardly falls, the open type guiding is used, or no guiding device is provided; and for another example, if a holding portion is an object-placing panel, and a held external object easily falls, the closed trajectory type guiding is used. Guiding is a limiting function for limiting the holding portion to be upright by means of abutment or blocking of an appropriate component, that is, the holding portion is limited to be upright in a falling displacement and at an end.

It can be known from the above description that the effects of the guiding device are: (1) limiting the holding portion in the falling displacement of the holding portion to reduce the shaking, skewing, and rotation of the holding portion (that is, enabling the holding portion to fall in an upright manner), and limiting the falling displacement (a minimum sufficient displacement); and (2) enabling the holding portion to keep upright when the holding portion falls to the end, for example, an appropriate guiding accommodation position that is set as the end.

The operation of the foregoing buffer device is to enable: (1) the holding portion to steadily fall in the falling displacement; and (2) a reduction of vibration and shaking when the holding portion falls to the end and stops. In implementation, the buffer device may be a cushioning pad or various types of buffer mechanisms.

The operation of the foregoing warning device is to display and expose the warning information by means of a displacement of a related component when the main attaching member and/or the holding portion falls, so as to remind a user to perform maintenance such as replacing the main attaching member or rearranging, thereby guaranteeing the safety and reliability of the holding portion. An adhesion-type holding structure mounted onto a wall originally accompanies inevitable falling. With regard to that, the present invention provides safe replacement when falling occurs, and further warns a user, such that the user can deal with the situation. Work of a user is added, and the user continuously and timely recovers the construction of the present invention to a normal state. Therefore, guaranteeing of permanent safety is expectable.

In the present invention, the foregoing devices are distinguished from each other, so as to clearly describe some implementation manners of the concept of the present invention. However, such distinguishing is not a strict limitation. For example, components of the replacement device, the guiding device, and the warning device can be shared, that is, a component may synchronously belong to several devices such as the replacement device or the guiding device, or a component synchronously plays several roles such as replacement and warning, and other mixed application situations. Some examples of mixed applications are described below.

In the adhesion-type holding structure mounted onto a wall of the present invention, the main attaching member and the holding portion, or the main attaching member and the backup attaching member may be insecurely connected (e.g. lap or hang), such that when the main attaching member comes loose from the wall, the main attaching member may be enabled to be separated from the holding portion or the backup attaching member and falls to the ground; the replacement device enables the backup attaching member to timely replace the main attaching member to hold the holding portion, thereby preventing the holding portion from falling down; the falling of the main attaching member is enabled to have a warning effect, so as to remind the user to perform maintenance and recover to a normal usage state that the main attaching member holds the holding portion.

In the present invention, there are two "replace" situations of the replacement device: first, the backup attaching member was not formally activated, and is formally used when "replace" is performed (when the main attaching member falls); and second, the backup attaching member was formally activated, and continues the formal usage as well as receives the work of the main attaching member (holding an external object) when "replace" is performed (when the main attaching member falls). Moreover, when the second situation is specifically implemented, an attaching service life of the backup attaching member needs to be longer than an attaching service life of the main attaching member.

The formal activation means that the main attaching member and the holding portion are connected, so as to restrict and limit each other. The main attaching member holds the holding portion, and thus, a falling stroke of the main attaching member is formally implemented (the adhesion of the main attaching member to the wall is impermanent fastening, a process that the main attaching member tends to fall with the time due to a force resulted from holding the holding portion and the external object is called the falling stroke in the present invention, and the whole duration of the falling stroke is the attaching service life).

The formal activation means that the backup attaching member and the holding portion are connected, so as to restrict and limit each other. The backup attaching member holds the holding portion, and thus, a falling stroke of the backup attaching member is formally implemented.

If the backup attaching member is not formally activated, the relationship between the backup attaching member and the holding portion may be that: an external force (from the borne external object) to which the holding portion is subjected is not transferred to the backup attaching member, and the holding portion and the backup attaching member do not interfere with each other; and at this time, the holding portion and the backup attaching member may be connected to each other but do not interfere with each other (e.g. connected by a connecting member that is not tightened or is loose).

The backup attaching member is fastened to the wall by means of the adhering portion made of a material that has an adhesive force and can be stuck to, adhere to, or be absorbed to the wall. Examples of the material include an adhesive, an adhered pad, an adhesive strip, an adhesive sheet, a magnet, a hot melt adhesive, a hook and loop fastener, and the like. If the backup attaching member is not used, the backup attaching member does not fall in a long time. The main attaching member is used, and thus gradually falls. After the main attaching member falls, the attaching service life of the backup attaching member starts to be formally counted, and the backup attaching member starts to gradually tend to fall, such that sufficient safety for guaranteeing not falling is achieved.

The aforementioned "block to prevent" of the replacement device is further described herein: block to prevent means that the position of the first connection position disposed at the main attaching member (or the holding portion) is arranged as a relatively high position (it is not necessary to arrange the main attaching member or the holding portion at a relatively high position, but the first connection position needs to be at a relatively high position); when the main attaching member (the holding portion) is in a usage state, and the backup attaching member is not formally used, the main attaching member (the holding portion) and the backup attaching member are at positions at which the main attaching member (the holding portion) and the backup attaching member are not formally received (equivalent to the connection of "pull to prevent") and do not transfer a force; at this time, the main attaching member (the holding portion) and the backup attaching member do not restrict each other, that is, the main attaching member (the holding portion) and the backup attaching member are separated, and a formal receiving function is not activated; when the main attaching member (the holding portion) falls down and the backup attaching member is attached to the wall, the position of the first connection position falls down to a permitted limit position of the falling, and the first connection position touches the lower second connection position belonging to the backup attaching member; the second connection position abuts against the first connection position, so as to prevent the first connection position from falling down, thereby enabling the main attaching member (the holding portion) to stop falling down; the holding portion that was held by the main attaching member is actually held by the backup attaching member via the transference performed by the two connection positions; the first connection position of the main attaching member (the holding portion) described herein may be a part of the main attaching member (the holding portion), or may be located at a component connected to the main attaching member (the holding portion); the second connection position of the backup attaching member may be a part of the backup attaching member, or may be located at a component connected to the backup attaching member; and the position of the second connection position is lower than the position of the first connection position.

With regard to the aforementioned "pull to prevent" of the replacement device, the main attaching member (the holding portion) and the backup attaching member are connected by means of an appropriate connecting member therebetween. The connecting member is bendable or twistable (e.g. a chain, a connecting band, a flexible object, a connecting rod with a swingable joint, and the like), or may be an appropriate telescopic mechanism, for example, an appropriate telescopic rod that can limit the maximum extended distance, or a connecting rod with a telescopic function. At first, the main attaching member and the backup attaching member are attached to the wall. At the beginning, the length of the connecting member described herein is greater than the distance between the connection position of the main attaching member (the holding portion) and the connection position of the backup attaching member; the connecting member is in a loose, or a twisted and unstretched state, and does not transfer a force; the holding portion (the main attaching member) and the backup attaching member at two ends of the connecting member do not interfere with each other; and a formal connection function is not activated. Accurately, at the beginning, the main attaching member and the backup attaching member are synchronously attached to the wall; the length from a joint, on the connecting member, of the connecting member and the main attaching member (the holding portion) to a joint, on the connecting member, of the connecting member and the backup attaching member is greater than the distance between a joint, on the main attaching member (the holding portion), of the main attaching member (the holding portion) and the connecting member and a joint, on the backup attaching member, of the backup attaching member and the connecting member; and the position of the connection position (the second connection position) on the backup attaching member connected to the connecting member is higher than the position of the connection position (the first connection position) on the main attaching member (the holding portion) connected to the connecting member. At an initial stage, the main attaching member is in a usage state (the holding portion is connected to the main attaching member and is held by the main attaching member, and thus, when the holding portion is in a usage state, the main attaching member is in a usage state); the backup attaching member is attached near the main attaching member and is not used; at this time, the function of connecting the main attaching member (the holding portion) and the backup attaching member to transfer a force is not formally activated; a formal connection is not activated; and at this time, a external force to which the holding portion is subjected is not transferred to the backup attaching member. When the holding portion falls and the backup attaching member does not fall, the main attaching member (the holding portion) falls down, and the position of the connection position (the first connection position) on the main attaching member (the holding portion) connected to the connecting member falls to a permitted falling limit; the originally connecting member that is bent, is not stretched, is twisted, or is not straight is straightened and tightened (e.g. in FIG. 4 and FIG. 5, the connecting member is straightened and tightened; in FIG. 8, the box cover and the connecting member were in a twisted relationship in FIG. 7, and are pulled apart in FIG. 8; and in FIG. 13, the connecting rod is straightened); and a pulling force from the connection position (the second connection position) on the backup attaching member connected to the connecting member is transferred, via the connecting member, to the connection position (the first connection position) on the main attaching member (the holding portion), and is further transferred to the main attaching member, thereby pulling the main attaching member (the holding portion) to prevent the main attaching member (the holding portion) from falling down. At this time, the formal connection (equivalent to the receiving of the block to prevent) function is activated. With regard to the power receiving states, the external force received by the holding portion is transferred, via the connecting member, to the backup attaching member in a form of the pulling force, and the backup attaching member replaces the main attaching member to bear the external force.

When the adhesion-type holding structure mounted onto a wall of the present invention is in normal use, the backup attaching member is not activated (or is only subjected to a small part of the external force and thus is not formally activated), and the main attaching member mainly holds the holding portion to bear the external object. When the main attaching member falls down from the wall, the replacement device prevents the main attaching member from continuing falling down, and enables the backup attaching member to be timely and restrictively connected to/timely and restrictively receive the holding portion to hold the holding portion.

In construction, the falling stroke from the holding portion (the main attaching member) starts to fall to the connection is established shall be designed as an appropriate shortest distance to reduce the generation of the impact force, vibration, and shaking as far as possible, so as to avoid a situation that the connection is established but the borne external object is fallen.

By means of a guiding function of the guiding device, in a falling displacement of the holding portion, the guiding device limits the shaking, skewing, and rotation of the holding portion and further enables the holding portion to assume an upright shape.

"Guiding" is a limiting function for limiting the holding portion to be upright by means of abutment or blocking of an appropriate component, that is, the holding portion is limited to be upright in a falling displacement, and is limited to be upright when falling to an end. The "limiting" manners include that:

1. In a stage that the holding portion starts to fall and is not completely separated from the wall, mutual abutment or limitations between components directly or indirectly connected to the backup attaching member (e.g. in FIG. 1 to FIG. 3, guiding walls at two sides of the main attaching member, or in the figures, side surfaces of a (T-shaped) slider 44 and a (T-shaped) sliding groove 45 that are in contact for fitting) is used for preventing the holding portion from skewing and rotating.

2. In a later stage of the falling stroke of the holding portion, mutual abutment or limitations between a component directly or indirectly connected to the backup attaching member, and the holding portion (or a component connected to the holding portion) is used for enabling the holding portion to tend to be upright or to move towards the wall, for example, the guiding surface 43 or the guiding accommodation position 42 in the figures.

3. In the whole falling stroke, only a small appropriate limitation is made (e.g. in FIG. 12 and FIG. 13, the connecting rod set, used as the connecting member, only limits "torsion").

The guiding device prevents the external object borne by the holding portion from falling from the holding portion, and also functions to enable the main attaching member to temporarily adhere to the wall since the main attaching member is in contact with or leans against the wall in the permitted shaking, so as to enable the main attaching member to temporarily recover a part of function of holding the holding portion.

The guiding device can be classified into "open type guiding" and "closed type guiding", and may appropriately share some elements with the replacement device, that is, the elements have functions of preventing the falling, replacing, as well as guiding. The guiding device guides the holding portion, so as to prevent the borne external object from falling from the holding portion. With regard to using a guiding surface, the guiding device includes a guiding surface connected to the main attaching member or the backup attaching member (if the guiding surface is connected to the holding portion or another element connected to the main attaching member, the guiding surface can be regarded as being connected to the main attaching member, because the element is connected to the main attaching member; also, the guiding surface may be connected to another element connected to the backup attaching member), characterized in that the guiding surface is a downward or downwards-inclined plane or cambered surface and is located around side surfaces of a falling path of the main attaching member. By means of blocking around side directions of the main attaching member by the guiding surface, a path range of the main attaching member is limited or skewing of the main attaching member is prevented. Moreover, the guiding surface may be a downward wall-inclined plane or cambered surface that enables the falling main attaching member to move towards the wall.

With regard to the closed type guiding of the guiding device, constructions for guiding such as a (T-shaped) slider and a (T-shaped) sliding groove, or a guide pin and a guide bushing with the same function are used, so as to enable a trajectory of the holding portion to be in an appropriate range when the holding portion falls down, and enable the holding portion to keep upright, thereby preventing the borne external object from falling from the holding portion.

With regard to the open type guiding of the guiding device, for a particular holding portion and a borne external object whose rotation, skewing degrees, and trajectories of downward displacements are intrinsically in small ranges when the particular holding portion and the held external object fall due to the weight, for example, a small frame or a rack held by a single adhering portion, the guiding function of the guiding device only needs to make a small appropriate limitation to a falling movement to the holding portion (limitation may not be made to a middle section of a downward movement stroke).

If the holding portion assumes an upright posture when falling down to the end, the possibility of falling of the borne external object may be reduced. For this purpose, the guiding device of the present invention includes the guiding accommodation position, characterized in that, the guiding accommodation position is fitted with, at the end of the falling path of the main attaching member, a part of the main attaching member or apart of an object connected to the main attaching member, and when the part of the main attaching member or the part of the object connected to the main attaching member falls into the guiding accommodation position, the main attaching member is made upright.

Further, to make the part of the main attaching member or the part of the object connected to the main attaching member fluently enter the guiding accommodation position, a guiding surface is disposed at an inlet of the guiding accommodation position, characterized in that, the guiding surface is an inclined plane or cambered surface, and the part of the main attaching member or the part of the object connected to the main attaching member may slide into the guiding accommodation position when falling down and being in contact with the guiding surface.

The buffer device provides buffer when the replacement device prevents the falling or when the holding portion falls to the end, so as to reduce vibration and shaking. Vibration or shaking may be generated when the replacement device prevents the holding portion from falling down, which may make the borne external object fall. To avoid the occurrence of such a situation, the safety mechanism is provided with the buffer device, and the buffer device uses an appropriate cushioning pad or buffer mechanism, so as to eliminate the vibration or shaking of the holding portion. The cushioning pad may be of a pad construction capable of absorbing vibration (e.g. foam or various pads with a plurality of vibration-absorbing units), characterized in that, when the main attaching member falls down to the end, the cushioning pad is sandwiched between a contact position connected to the backup attaching member and a contact position connected to the main attaching member that are in contact with each other. Besides, the buffer mechanism may be various applicable damping devices, for example, the damping device is a rotary damping device capable of reducing a falling speed of the main attaching member, thereby achieving an effect of eliminating vibration or shaking of the holding portion.

The warning device displays and exposes the warning information by means of a displacement of a related component when the main attaching member and/or the holding portion falls, so as to remind a user to perform maintenance such as replacing the main attaching member or the adhering portion, or rearranging, thereby guaranteeing the safety and reliability of the holding portion and preventing the borne external object from falling. In implementation, the warning device generates or provides the warning information by means of a displacement of a related component when the falling occurs. The providing manners include: exposing, by means of the displacement, a preset warning symbol, or a warning label with a warning or an instruction that were covered and hidden, or displaying a warning state indicating a failure or a problem by means of the displacement, or obviously exposing a problem. In implementation, a warning form of the warning device may be presented as, for example, a usage pause state (e.g. the state that the suction cup falls shown in FIG. 19). An appropriate connecting member, connecting band, or spring may be used for pulling the main attaching member when the main attaching member comes loose from the wall, such that the main attaching member falls to a place that can be obviously and easily seen, or falls to a place that hinders the usage of the holding portion, thereby presenting the usage pause state.

The warning device may be an electronic warning device. The electronic warning device includes an electronic circuit, a switch of the electronic circuit, and a display generating warning information. The switch of the electronic circuit may be an appropriate circuit switch such as a touch switch and a photoelectric switch, and is disposed at the first or the second connection position of the receiving type replacement device, or is disposed at the first or the second connection position of the connecting member of the connection type replacement device, or is disposed at an appropriate position of the main attaching member, the holding portion, or the backup attaching member. The switch of the electronic circuit is switched on by means of a position change caused by the falling of the main attaching member. The display may be a sound generator such as a loudspeaker and a buzzer capable of generating a warning sound, or may be a light emitting device for generating bright light or flashing light, and may be disposed at a position near the holding structure mounted onto a wall of the present invention or an appropriate position that can be easily noticed by a user.

Although the specification describes the technical thought of the construction of the present invention by distinguishing the four devices, in practical application, functions of some parts of the devices, components, and construction may be partially mixed in application, which is described by using examples: in FIG. 4, a connecting member may function as the replacement device as well as the warning device.

In FIG. 6 to FIG. 9, a warning banner roll box belongs to the warning device, the replacement device, as well as the buffer device.

In FIG. 12 and FIG. 13, a connecting rod type connecting member formed by pivotally connecting a plurality of connecting rods functions as the replacement device as well as the guiding device.

In FIG. 19, a falling suction cup may function as the adhering portion of the main attaching member, as well as the warning device (an adhering surface of the suction cup may be made to be of a warning color, red), and a falling state of the suction cup has an outstanding warning effect.

In FIG. 20 and FIG. 21, an accommodation groove may partially belong to the guiding device, partially belong to the replacement device, and partially belong to the buffer device.

Deeper description is made as follows: in the present invention, in addition to the main attaching member, the backup attaching member is further disposed; in addition to the function that the backup attaching member can replace, when the main attaching member fails and falls, the main attaching member to hold the holding portion, the deeper meaning is to warn a user by using the falling of the main attaching member, so as to enable the user to attach the main attaching member again (the backup attaching member has an enough long safe period of time when the backup attaching member individually holds the holding portion, and the safe period of time is enough for the user to discover the falling of the main attaching member and to perform maintenance operations such as replacing the adhering portion and rearranging), thereby recovering to a normal usage state; and with the participation of the user, it can be expected that an objective of "a permanent guarantee of not falling" can be achieved.

Besides, in practical application, the main attaching member may be simplified, so as to enable the holding portion to be directly connected to the adhering portion of the main attaching member, for example, the adhering portion is a suction cup, the holding portion is a rack or a container connected to the suction cup or directly extending from the suction cup, and the rack or the container is directly held by the adhering portion (that is, the suction cup). For another example, the adhering portion is a sheet-shaped object with two adhesive surfaces, one surface adheres to the wall, the other surface is directly adhesively connected to a rack or a frame-shaped object, and the rack or the frame-shaped object is directly held by the sheet-shaped object with two adhesive surfaces.

In practical application, the backup attaching member may be simplified to be a backup adhering portion, so as to be directly connected to the replacement device. For example, the backup adhering portion is a suction cup, and is directly connected to an accommodation groove of the replacement device; and when the adhering portion of the main attaching member falls from the wall, the accommodation groove receives the falling holding portion, that is, the suction cup (the adhering portion of the backup attaching member) bears the holding portion. Alternatively, the adhering portion of the backup attaching member is a suction cup, and is directly connected to the connecting member of the replacement device; and when the adhering portion of the main attaching member falls from the wall, the connecting member pulls the holding portion, that is, the suction cup (the adhering portion of the backup attaching member) bears the holding portion.

BRIEF DESCRIPTION OF THE DRAWINGS

FIG. 4 is a schematic diagram showing a condition that the main attaching member in FIG. 2 has come loose from the wall and has fallen and warning information has been displayed;

FIG. 5 is a cross-sectional view of the construction disclosed in FIG. 4 at the position B-B;

FIG. 8 is a schematic diagram showing a condition that a main attaching member in FIG. 7 has come loose from a wall and has fallen, and a warning information display member has been exposed;

FIG. 9 is a partially enlarged view showing a condition that a box cover in the construction disclosed in FIG. 6 is opened to expose the warning information display member;

FIG. 33 shows that an upper end-closed T-shaped sliding groove can slide up and down on a T-shaped slider;

FIG. 35 is a cross-sectional view taken along the line L-L of the holding structure in FIG. 34;

FIG. 36 is a cross-sectional view taken along the line L1-L1 of the holding structure in FIG. 34;

DESCRIPTION OF REFERENCE SIGNS

Figures 1, 2:
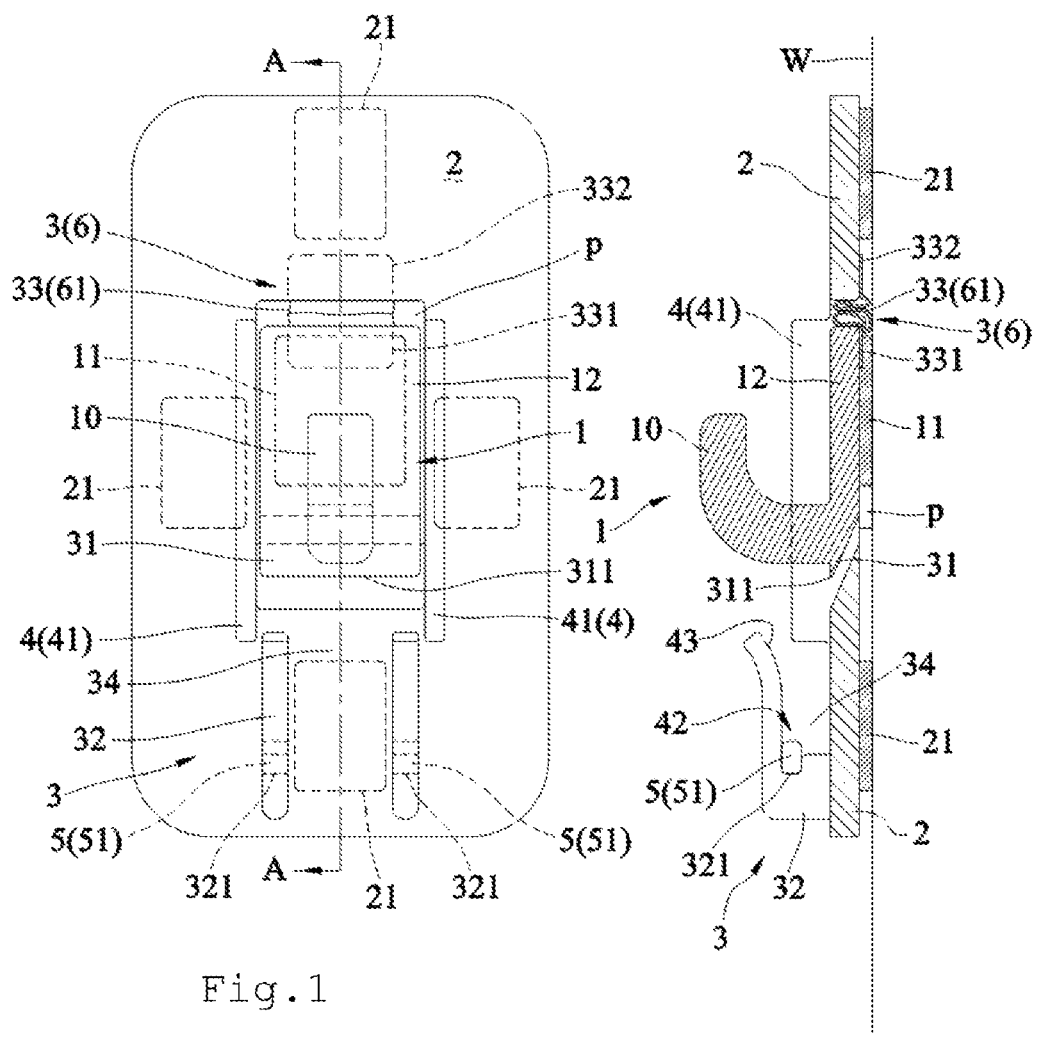
FIG. 1 is a front view of a first embodiment of an adhesion-type holding structure mounted onto a wall according to the present invention.
FIG. 2 is a cross-sectional view of the construction disclosed in FIG. 1 at the position A-A.

Main attaching member 1; holding portion 10; adhering portion 11; connection portion 12; connecting rod 121; rotating shaft 1211; bearing 1212; stopper 1213; backup attaching member 2; adhering portion 21; connection portion 22; box 23; replacement device 3; abutment portion 31; first connection position 311; stopper plate 313; receiving portion 32; second connection position 321; connecting member 33; first connection position 331; second connection position (a rotating shaft of a box cover) 332; connecting member 33; connecting bar 33A; ring-shaped portion 33A1; box cover 33B; box cover 33B; ring 33B1; accommodation groove 34; guiding device 4; guiding wall 41; guiding accommodation position 42; guiding surface 43; (T-shaped) slider 44; (T-shaped) sliding groove 45; buffer device 5; cushioning pad 51; damping device 52; friction member 53; warning device 6; warning information 60; warning information display member 61; balance weight lever 62; wall W; main adhered objected position p;

connection portion 1A; holding portion 1B; base 12; neck portion 122; push plate 123; base portion 1231; connecting rod 13; rotating shaft 131; bearing 132; rotating shaft support 133; connection head 1A1; connecting neck portion 1A11; connecting shaft hole 1A12; connecting member 1A41; connecting rod 1A42; extrusion pad 1A31; end portion 1A311; root portion 1A313; connection block 1A4; connecting rod 1A42; upper groove hole 1A421; short shaft 1A422; short shaft hole 1A423; flat groove 1A43; support frame 1A5; support rib 1A51; support rail 1A52; support pad 1A53; elastic member (tension spring) 1A6; elastic member (tension spring) 1A7; connection portion 22; connection portion 2A; connection head 2A1; extrusion pad 2A31; end portion 2A311; root portion 2A313; safety mechanism 3M; receiving point 310M; replacement device 31M; abutment portion 312M; upper connection position 312MP; receiving portion 313M; lower connection position 313MP; guiding device 32M; sliding groove 321M; head portion 3211M; tail portion 3212M; guiding surface 322M; movement room 323M; telescopic structure 314M; guide rail 3141M; lower end of the guide rail 31411M; upper portion of the guide rail 31412M; front guide pin 3142M; rear auxiliary pin 3143M; position displacement mechanism 14; abutment body 141; connection portion 142; torsion spring 143; abutment plate 1411; abutment front end 1412; abutment surface 14121; baffle 1422; one end 1431 of the torsion spring 143; the other end 1432 of the torsion spring 143;

first connecting member 1AC1; neck portion 1AC11; bearing 1AC1B; bearing hole 1AC1BB; lug 1AC1X; second connecting member 1AC2; shaft 1AC2S; stopper portion 1AC2X; through hole 1AC2H; friction member 1C; friction pad 1CF; elastic component 22E

DETAILED DESCRIPTION OF THE PREFERRED EMBODIMENTS

According to the aforementioned concept architecture, six specific embodiments are first provided. In the six embodiments, there are many common parts, and there are many parts that are of the same technology and the same function but are implemented by using different constructions. First, the common parts are described as follows: as shown in the figures of the embodiments, the adhesion-type holding structure mounted onto a wall includes: a main attaching member 1, including a holding portion 10 for bearing an external object and an adhering portion 11 for adhering to a wall W; a backup attaching member 2, including an adhering portion 21 for adhering to the wall W; and a safety mechanism, including a replacement device 3 disposed between the main attaching member 1 and the backup attaching member 2. With this construction, when the main attaching member 1 and the backup attaching member 2 are synchronously attached to the wall W on positions close to each other, when the main attaching member 1 comes loose from the wall W and falls down, the backup attaching member 2 can prevent, by means of the replacement device 3, the main attaching member 1 from falling down, and can timely replace the main attaching member 1 to hold the holding portion 10.

Further, in the following described embodiments, although the main attaching member 1 and the backup attaching member 2 are used as names, the naming manner is merely used for facilitating the illustration, and is not intended to limit, by means of the names, functions and effects, or structures of the main attaching member 1 and the backup attaching member 2. Therefore, it should be noted that the main attaching member 1 and the backup attaching member 2 may be regarded as a first attaching member and a second attaching member, that is, the main attaching member 1 and the backup attaching member 2 can be implemented by means of attaching members with identical or different structures without being limited by the naming manner.

The main attaching member 1 and the holding portion 10 may be securely connected or in securely connected (e.g. lap or hang).

The main attaching member 1 may further include a connection portion 12 for connecting the holding portion 10 and the adhering portion 11. The connection portion 12 may be, but not limited to, a base, a connecting bar, a flexible stripe, a spring, a soft wire, a chain, or a connecting rod.

The holding portion 10 means a part that has a shape or a structure for holding, supporting, or placing an external object. In implementation, the holding portion 10 may be, but not limited to, a hook, a hanger, a ledge, a box-like object, a towel bar, a container, a shelf, or a wall handle.

The main attaching member 2 may further include a connection portion 22 for connecting the adhering portion 21. The connection portion 22 may be, but not limited to, a base, a connecting bar, a flexible stripe, a spring, a soft wire, a chain, or a connecting rod.

In addition, each of the adhering portions 11, 21 means an adhered object that has an adhesive force for being stuck to, for adhering to, or for being absorbed to the wall W. In implementation, each of the adhering portions 11, 21 may be, but not limited to, a suction cup, an adhesive, an adhered pad, an adhesive strip, an adhesive sheet, a magnet, a hot melt adhesive, or a hook and loop fastener.

The main attaching member 1 of the present invention is connected to the holding portion 10, so as to hold an external object by means of the holding portion 10. However, when the main attaching member 1 falls from the wall W, in order to prevent the connected holding portion 10 from falling to cause an accident, the backup attaching member 2 is further provided, and the safety mechanism including the replacement device 3 is disposed between the main attaching member 1 and the backup attaching member 2. When the main attaching member 1 is normally attached to the wall W, the backup attaching member 2 plays a standby role, and adheres, in an accompanying manner, to a close position of the position of the main attaching member 1 that is directly used. The close position means a position around, such as at a left side of, a right side of, above, and below, the main attaching member 1, or means a surrounding circle that surrounds the main attaching member 1. In this way, when the main attaching member 1 accidentally falls down in a usage process due to a condition that the adhering portion 11 comes loose from the wall W, the backup attaching member 2 immediately plays an alternate and rescue role to replace the main attaching member 1, so as to perform an operation of holding the holding portion 10.

In a process of replacing the main attaching member 1 with the backup attaching member 2, in addition to the replacement device 3 that can be used for actually achieving a task of preventing the main attaching member 1 and the holding portion 10 from falling down, in implementation, the safety mechanism may further include a guiding device 4 that is capable of enabling the holding portion 10 to keep upright when the holding portion 10 comes loose from the wall W and falls down, and is used for keeping the uprightness of the holding portion 10, keep a relatively short falling trajectory, or reduce shaking, thereby preventing an external object borne by the holding portion 10 from falling. Besides, the safety mechanism may further include a buffer device 5 that is capable of reducing a falling speed of the main attaching member 1 when the main attaching member 1 comes loose from the wall W and falls down, and/or reducing vibration and shaking of the holding portion 10, and a warning device 6 that is capable of generating warning information when the holding portion 10 comes loose from the wall W and falls down with the main attaching member 1, so as to remind a user to recover to a normal state and recover to a normal usage state that the main attaching member 1 holds the holding portion 10.

The holding portion 10 is connected to the main attaching member 1, and thus, the backup attaching member 2 not only prevents the main attaching member 1 from falling down, but also prevents the holding portion 10 from falling down. The replacement device 3 may be regarded as being formed by an object extending from the backup attaching member 2 and an object extending from the main attaching member 1 (or the holding portion 10). Besides, the connection manner of the connected constructions is not limited to a secure connection manner, and may be a detachable connection manner, that is, the connected structures can be detached or assembled.

In implementation, the replacement device 3 may be approximately classified into "receiving type replacement device" (as shown in embodiments four, five, and six) or "connection type replacement device" (as shown in embodiments two and three). Embodiment one synchronously has a receiving type replacement device as well as a connection type replacement device.

The receiving type replacement device includes an abutment portion 31 that is connected to the main attaching member 1 and has a first connection position 311, and a receiving portion 32 that is connected to the backup attaching member 2 and has a second connection position 321. When the receiving type replacement device is used, a position of the main attaching member 1 is generally higher than a position of the backup attaching member 2, and in few cases, the position of the backup attaching member 2 is higher than the position of the main attaching member 1 (e.g. in embodiment six). However, a position of the second connection position 321 is always lower than a position of the first connection position 311.

The connection type replacement device includes a connecting member 33. The connecting member 33 has a first connection position 331 connected to the main attaching member 1, and a second connection position 332 connected to the backup attaching member 2.

In implementation, the guiding device 4 includes a guided portion and a guiding portion that are respectively disposed at the main attaching member and the backup attaching member. The guided portion and the guiding portion may be constructions that can be fitted with each other and can slide relative to each other; further, the guiding portion may be one or more guiding walls 41 or guiding surfaces (e.g. inclined planes or cambered surfaces) that are disposed at the main attaching member 1 or the backup attaching member 2 and can limit a falling path of the main attaching member 1 (the holding portion 10); the guiding portion may be a guiding accommodation position 42 disposed at the backup attaching member 2, and a guiding surface 43 (e.g. inclined plane or cambered surface) for guiding the falling main attaching member 1 to arrive at the guiding accommodation position 42; the guiding accommodation position 42 is located at an end of a falling stroke of the guided portion or the abutment portion 31 (the guiding accommodation position 42 is not necessarily located at a lower end of the guiding portion, referring to FIG. 15, an abutment portion 31 below a stopper plate 313 falls to a guiding accommodation position 42 above a receiving portion 32); and when the guided portion, or the abutment portion 31, or a (T-shaped) slider 44 falls to the end of the falling stroke, (a lower end) of the guided portion, or the abutment portion 31, or the (T-shaped) slider 44 falls into, by means of the guiding of the guiding surface 43, the guiding accommodation position 42 with a matched size and is clamped, and the guided portion, or the abutment portion 31, or the (T-shaped) slider 44 is enabled to be upright by means of the uprightness of the guiding accommodation position 42, that is, the holding portion 10 is enabled to be upright.

In implementation, the buffer device 5 may be, but not limited to, a cushioning pad 51, a damping device 52, or a friction member 53. For example, in implementation, when the cushioning pad 51 is used as the buffer device 5, the cushioning pad 51 may be connected to the main attaching member 1 or the backup attaching member 2.

Using the backup attaching member 2 to replace the main attaching member 1 to hold the holding portion 10 is a temporary measure. Therefore, the warning device 6 can generate warning information when the main attaching member 1 and the holding portion 10 come loose from the wall W and fall down, so as to remind a user to perform restoring and to recover to a normal usage state that the main attaching member 1 holds the holding portion 10. In implementation, the warning device 6 is a warning information display member 61 capable of displaying warning information 60, and the warning information 60 is hidden when the main attaching member 1 adheres to the wall W and is visualized after the main attaching member 1 comes loose from the wall W. The warning device 6 may be a warning information display member 61 capable of displaying the warning information, and the warning information 60 is hidden when the main attaching member 1 adheres to the wall W, and is visualized after the main attaching member 1 comes loose from the wall W. In implementation, the warning information display member 61 may be connected to the backup attaching member 2, or disposed at a position shielded by the main attaching member 1. Besides, the warning device 6 may be an electronic warning device capable of sending a warning signal.

Constructions of the embodiments are further specifically described below with reference to the drawings. As shown in FIG. 1 to FIG. 5, FIG. 1 to FIG. 5 show the construction of a first embodiment of an adhesion-type holding structure mounted onto a wall according to the present invention. In the figures of this embodiment, the holding portion 10 is a hook; the adhering portion 11 of the main attaching member 1 is an adhesive strip; the backup attaching member 2 is a thin plate or a cover; and the adhering portion 21 of the backup attaching member 2 is an adhesive strip.

In this embodiment, the backup attaching member 2 is provided with a main adhered object position p for providing an adhering position for the main attaching member 1; the main adhered object position p may be a notch at a side edge of the backup attaching member 2, or a closed hole on the backup attaching member 2 (or an adhered object 21); and in this embodiment, the main adhered object position p shown in the figures is a closed hole located at the center of the backup attaching member 2, and the main attaching member 1 is accommodated in the main adhered object position p and adheres to the wall W. In implementation, the main adhered object position p may be disposed at a position indicator (not shown in the figures) extending outwards from the backup attaching member 2, that is, the position indicator is used for providing and indicating an adhering position of the main attaching member 1 (or the adhering portion 11). Besides, the position indicator may be a closed hole, an unclosed half-hole (a part of a hole), or a frame that can exactly accommodate the main attaching member 1 or the adhering portion 11, and the position indicator is used for framing a right position of the main attaching member 1 or the adhering portion 11. Alternatively, the position indicator may be a positioning edge, and the main attaching member 1 or the adhering portion 11 is located at a right position after adhering (or being absorbed, and the like) along the positioning edge. The position indicator may further be an element with an appropriate indicated shape that is used for indicating a position of the main attaching member 1 or the adhering portion 11. Moreover, the foregoing position may be not located at the middle of the backup attaching member 2 as shown in FIG. 1, and may be located at a peripheral position outside the coverage range of the backup attaching member 2.

In this embodiment, the safety mechanism synchronously has a replacement device 3, a guiding device 4, a buffer device 5, and a warning device 6.

As shown in the figures, the replacement device 3 disclosed in this embodiment synchronously includes a "receiving type replacement device" and a "connection type replacement device".

The receiving type replacement device includes an abutment portion 31 that is connected to the main attaching member 1 and has a first connection position 311, and a receiving portion 32 that is connected to the backup attaching member 2 and has a second connection position 321. A position of the second connection position 321 is lower than a position of the first connection position 311. In this embodiment, the receiving portion 32 connected to the backup attaching member 2 is located exactly below the abutment portion 31 connected to the main attaching member 1, and has an accommodation groove 34 (in the figures of this embodiment, the accommodation groove 34 is drawn as a hook body, and in implementation, the accommodation groove 34 may be made as a groove body) capable of receiving the main attaching member 1; the accommodation groove 34 has a guiding accommodation position 42, and a guiding surface 43 for guiding the falling main attaching member 1 to arrive at the guiding accommodation position 42; and the guiding surface 43 is an inclined plane or cambered surface.

Figure 3:
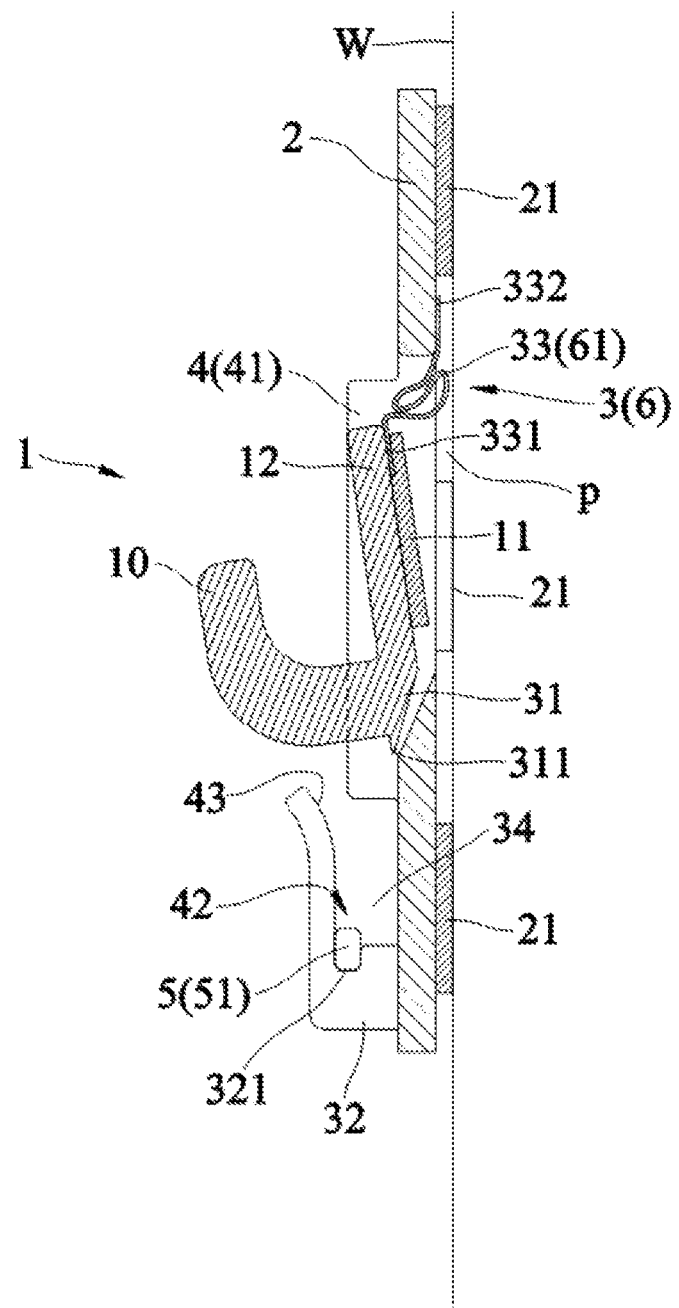
FIG. 3 is a schematic diagram showing a condition that a main attaching member in FIG. 2 starts to come loose from a wall and to fall.

The connection type replacement device includes a connecting member 33. The connecting member 33 has a first connection position 331 connected to the main attaching member 1, and a second connection position 332 connected to the backup attaching member 2. The connecting member 33 may be a flexible stripe as shown in the figures, or may be a soft wire, a chain, a connecting rod, or a telescopic mechanism. Besides, a connection manner of the connection between the connecting member 33 and the main attaching member 1 or the backup attaching member 2 is not limited to secure connection or flexible connection, and may select a connection manner such as sticking, hooking, snap-fitting, lapping, and fitting. In addition, the length of the connecting member 33 is greater than the distance between a connection position of the main attaching member 1 and a connection position of the backup attaching member 2, that is, the maximum length of the connecting member 33 is greater than the distance between the first connection position 331 and the second connection position 332. Therefore, the connecting member 33 is in a loose or twisted state when the backup attaching member 2 is not activated, and the main attaching member 1 and the backup attaching member 2 that are connected by means of the connecting member 33 form a connection relationship that the main attaching member 1 and the backup attaching member 2 are connected to each other but do not restrict and interfere with each other. With such a construction, by means of the abutment portion 31, the receiving portion 32, and the connecting member 33 of the replacement device 3, a protection mechanism with double insurance is provided when the main attaching member 1 accidentally falls down in a usage process due to a condition that the adhering portion 11 comes loose from the wall W, and the backup attaching member 2 replaces the main attaching member 1 to hold the holding portion 10 and hold an external object borne by the holding portion 10 (as shown in FIG. 4 and FIG. 5). When the prevention is completed and a connection is established, the main attaching member 1 is pulled by the connection type replacement device above the main attaching member 1, and is held by the receiving type replacement device below the main attaching member 1. Therefore, the holding portion 10 has relatively good uprightness, so as to guarantee that the external object borne by the holding portion 10 hardly falls. As shown in FIG. 3, when the main attaching member 1 starts to come loose from the wall W, comes completely loose from the wall W, and falls down, as shown in FIG. 3, FIG. 4, and FIG. 5, because there is the guiding surface 43, the falling main attaching member 1 can abut, by means of the abutment portion 31, against the lower receiving portion 32 that provides a receiving function, so as to enable the falling main attaching member 1 (the holding portion 10) to slide into the accommodation groove 34 and to slide downwards into the guiding accommodation position 42, thereby preventing the main attaching member 1 from continuing falling down, and using the backup attaching member 2 to replace the main attaching member 1 to hold the holding portion 10. At the same time, the falling main attaching member 1 (the holding portion 10) is simultaneously pulled by means of the connecting member 33; when the connecting member 33 is straightened and is completely stretched and tightened, the main attaching member 1 can be prevented from continuing falling down; the replacement process enters a connection stage; and the backup attaching member 2 starts to be formally activated, and the backup attaching member 2 is used for replacing the main attaching member 1 to hold the holding portion 10.

Figure 7:
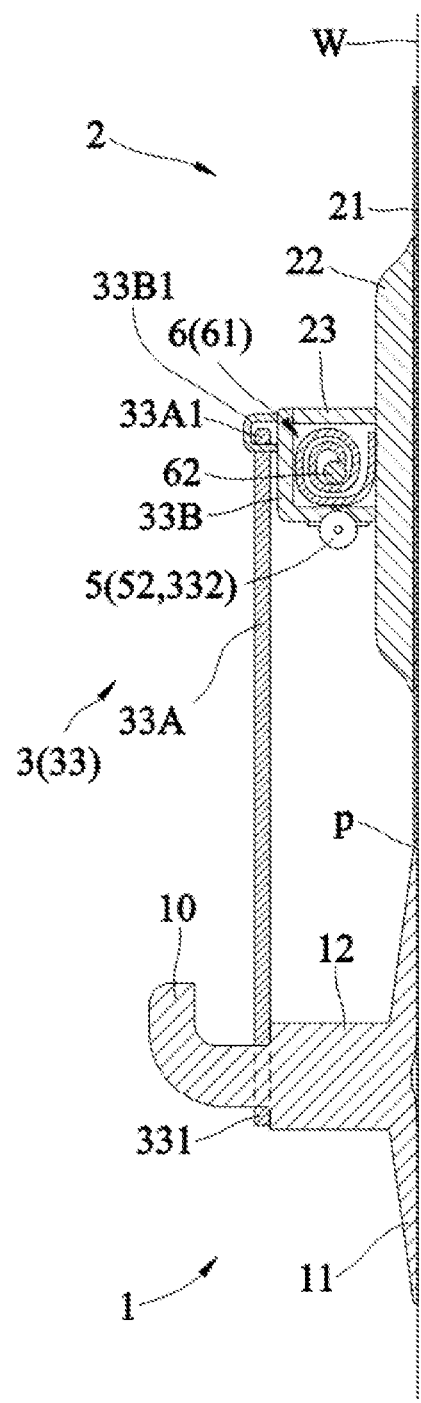
FIG. 7 is a cross-sectional view of the construction disclosed in FIG. 6 at the position C-C.
Figure 10:
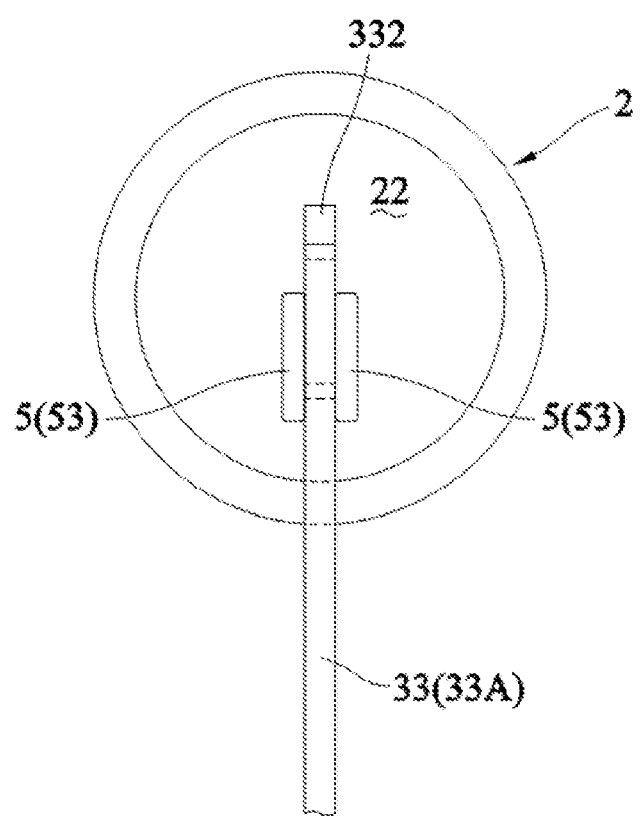
FIG. 10 is a schematic diagram showing a situation that the construction of the second embodiment disclosed in FIG. 6 is partially changed.

The guiding device 4 includes a guided portion and a guiding portion that are respectively disposed at the main attaching member 1 and the backup attaching member 2. In this embodiment, the guided portion is the connection portion 12 (that is, the base) of the main attaching member 1, and the guiding portion is guiding walls 41 that are disposed on the backup attaching member 2 and are located at a left side and a right side of the connection portion 12. In this way, the guiding walls 41 are used for keeping the uprightness of the connection portion 12 and the holding portion 10 in a falling process of the main attaching member 1, thereby preventing the external object borne by the holding portion 10 from falling. In implementation, the guiding portion of the guiding device 4 may be a guiding surface that is connected to the main attaching member 1 or the backup attaching member 2 (in fact, in this embodiment, surfaces, in contact with the guiding walls 41, at a left side and a right side of the main attaching member 1 are guiding surfaces located at the main attaching member 1), and is capable of limiting a falling path of the main attaching member 1 (the holding portion 10), for example, an inclined plane or cambered surface. Besides, the foregoing guiding accommodation position 42 and the guiding surface 43 that guides the falling main attaching member 1 to arrive at the guiding accommodation position 42 belong to the guiding portion of the guiding device 4, and function to enable the holding portion 10 (the guided portion) to keep upright when the holding portion 10 (the guided portion) falls to the end. The buffer device 5 can reduce a falling speed of the main attaching member 1 that comes loose from the wall W and falls down, and/or can reduce vibration or shaking of the holding portion 10. In this embodiment, the buffer device 5 is one or more cushioning pads 51 on the receiving portion 32 connected to the backup attaching member 2 and/or on the abutment portion 31 connected to the main attaching member 1, so as to eliminate the vibration or shaking of the main attaching member 1. The cushioning pads 51 are of pad constructions capable of absorbing vibration (e.g. foam or various pads with vibration-absorbing units). When the main attaching member 1 falls to arrive at the end, the cushioning pads 51 are sandwiched between contact positions 311, 321 of the abutment portion 31 and the receiving portion 32, thereby achieving an effect of eliminating vibration or shaking. In addition, although not shown in the figures of this embodiment, the buffer device 5 may cooperate with the connecting member 33 of the connection type replacement device, for this purpose, the buffer device 5 may be provided with a box cover 33B, a box 23, and a damping device 52 as shown in FIG. 7, or be provided with a friction member as shown in FIG. 10, so as to provide a damping function or a friction function for the connecting member 33, thereby achieving a function of reducing the falling speed of the main attaching member 1.

In this embodiment, the connecting member 33 synchronously functions as the warning information display member 61. As shown in the figures, the connecting member 33 (the warning information display member 61) is provided with warning information 60. The warning information 60 may be, but not limited to, a warning sign and a warning. The warning information 60 is provided on the twisted connecting member 33 (the warning information display member 61), and is hidden in a bend when the main attaching member 1 adheres to the wall W (as shown in FIG. 1). However, after the main attaching member 1 comes loose from the wall W and the connecting member 33 (the warning information display member 61) is straightened and is completely stretched, the warning information 60 is simultaneously visualized (as shown in FIG. 4), and consequently, after the main attaching member 1 comes loose from the wall W, a user can immediately discover, by means of the prompt of the warning information 60, the situation and performs a recovery operation.

It can be known from the foregoing description that in addition to the replacement device 3 disposed between the main attaching member 1 and the backup attaching member 2, the safety mechanism disclosed in this embodiment further includes the guiding device 4, the buffer device 5, and the warning device 6.

FIG. 6 to FIG. 9 show a construction of a second embodiment of the adhesion-type holding structure mounted onto a wall according to the present invention. In the figures of this embodiment, the holding portion 10 is a hook; the adhering portion 11 of the main attaching member 1 is a suction cup; the adhering portion 21 of the backup attaching member 2 is an adhesive sheet; a lower surface of the backup attaching member 2 assuming a disc shape is a circular plane and is connected to and fastened to an upper surface of the adhering portion (the adhesive sheet) 21; a connection portion 22 is a base with a box 23; and the box 23 has a box cover 33B that can be opened.

The backup attaching member 2 adheres to the wall W by means of the adhering portion 21, and the adhering portion 21 is the adhesive sheet.

Figure 6:
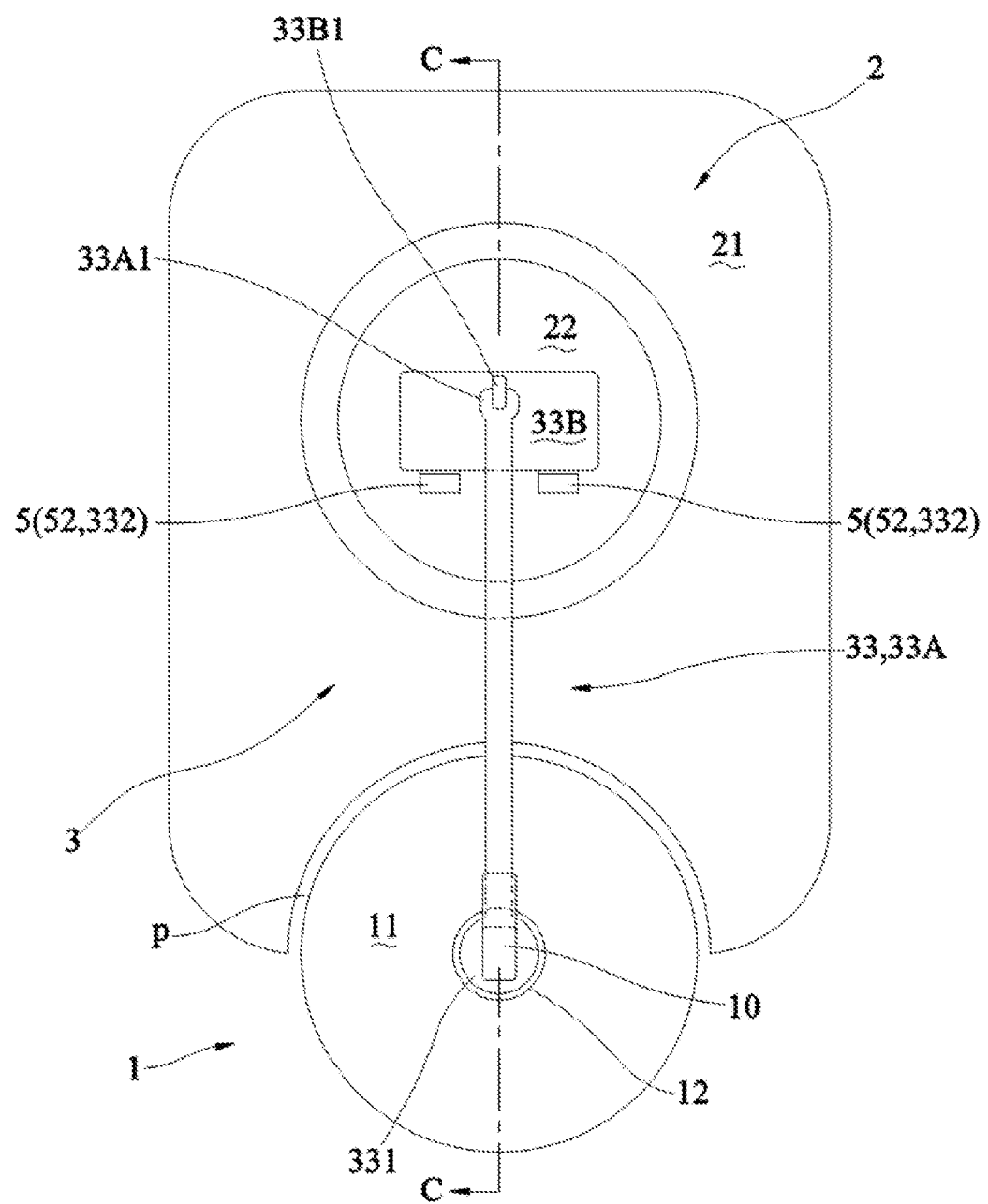
FIG. 6 is a front view of a second embodiment of the adhesion-type holding structure mounted onto a wall according to the present invention.

The adhesive sheet has a main adhered object position p that provides an adhering position for the main attaching member 1. As shown in the figures, the main adhered object position p is a notch at a side edge of the adhering portion 21 (as shown in FIG. 6). Although not shown in the figures of this embodiment, the main adhered object position p may further be a closed hole disposed at the adhering portion 21 to enable the main attaching member 1 to be accommodated at the main adhered object position p and to adhere to the wall W. Besides, the main adhered object position p may further be an indicator that is directly marked on a surface of the adhering portion 21, so as to enable the main attaching member 1 to adhere to a position, indicated by the indicator, on the surface of the adhering portion 21 and to indirectly adhere to the wall W by means of the adhering portion 21.

In this embodiment, the safety mechanism synchronously has a replacement device 3, a buffer device 5, and a warning device 6.

The operation of the replacement device 3 is to timely enable, when the main attaching member 1 with the holding portion 10 comes loose from the wall W and falls down, the backup attaching member 2 to replace the main attaching member 1 to hold the holding portion 10. The "replace" may be divided into two stages, prevent and connect. In this embodiment, the prevent manner is pull to prevent. When the prevention is achieved, the formal connection starts. When the connection is not established, the main attaching member 1 is formally used. When the connection is established, the main attaching member 1 has fallen, and the backup attaching member 2 is formally activated.

As shown in the figures, the replacement device 3 disclosed in this embodiment is a "connection type replacement device". The connection type replacement device includes a connecting member 33. The connecting member 33 includes two parts, a connecting bar 33A and a box cover 33B. A ring-shaped portion 33A1 at an upper end of the connecting bar 33 is fitted with a ring 33B1 of the box cover 33B, so as to open the box cover 33B. The box cover 33B is connected to a box 23 by means of a rotating shaft 332 of the box cover, and the box 23 can be opened and closed (in the figures of this embodiment, a position of the rotating shaft 332 of the box cover 33B is synchronously provided with a rotary damping device).

The connecting member 33 has a first connection position 331 connected to the main attaching member 1, and a second connection position 332 connected to the backup attaching member 2, where the second connection position 332 is the rotating shaft of the box cover 33B. The connecting bar 33A may be a flexible stripe as shown in the figures, or may be a soft wire, a chain, a connecting rod, or a telescopic mechanism. Besides, a connection manner of the connection between the connecting member 33 and the main attaching member 1 or the backup attaching member 2 is not limited to secure connection or flexible connection, and may select a connection manner such as sticking, hooking, snap-fitting, lapping, and fitting. In addition, the total length of the connecting member 33 including two parts, the connecting bar 33A and the box cover 33B, is greater than the distance between a connection position of the main attaching member 1 and a connection position of the backup attaching member 2, that is, the total length of the connecting member 33 is greater than the distance between the first connection position 331 and the second connection position 332 (referring to FIG. 7). In this embodiment, the connecting member 33 is in a loose or twisted state when the backup attaching member 2 is not activated, and the main attaching member 1 and the backup attaching member 2 that are connected by means of the connecting member 33 form a connection relationship that the main attaching member 1 and the backup attaching member 2 are connected to each other but do not restrict and interfere with each other.

With such a construction, by means of the connecting member 33 of the replacement device 3, a protection mechanism is provided when the main attaching member 1 accidentally falls down in a usage process due to a condition that a main attached object 11 comes loose from the wall W and falls down, and the backup attaching member 2 replaces the main attaching member 1 to hold the holding portion 10 and hold an external object borne by the holding portion 10 (as shown in FIG. 8).

As shown in FIG. 8, when the main attaching member 1 starts to come loose from the wall W, comes completely loose from the wall W, and falls down, the falling main attaching member 1 (the holding portion 10) is pulled by the connecting bar 33A connected to the backup attaching member 2; when the connecting bar 33A and the box cover 33B are pulled to form a straight connection relationship shown in FIG. 8, the main attaching member 1 can be prevented from continuing falling down; the replacement process enters a connection stage; and the backup attaching member 2 starts to be formally activated, that is, the backup attaching member 2 replaces the main attaching member 1 to hold the holding portion 10.

The buffer device 5 can reduce a falling speed of the main attaching member 1 that comes loose from the wall W and falls down, and/or reduce vibration or shaking of the holding portion 10. In this embodiment, the buffer device 5 is a damping device 52 disposed at a pivot of the box cover 33B, and thus, in a falling process of the main attaching member 1, the damping device 52 can reduce the falling speed of the main attaching member 1 and achieve an effect of reducing vibration and shaking.

In this embodiment, a warning information display member 61 is disposed in the box 23. The warning information display member 61 is a rolled or folded warning slogan volume whose one end is connected to the box 23, and the other end has a balance weight lever 62. Warning information 60 is provided at a surface of the warning information display member 61. The warning information 60 may be, but not limited to, a warning sign or a warning.

When the main attaching member 1 is normally used and adheres to the wall W, the warning information display member 61 is rolled and is placed in the box 23 (as shown in FIG. 7). However, when the main attaching member 1 comes loose from the wall W and falls down, the connecting bar 33A synchronously opens the box cover 33B, and the box cover 33B is slowly opened by means of the damping device 52, and thus, the main attaching member 1 may fall slowly. After the box cover 33B is opened, the warning information display member 61 originally hidden in the box 23 is pulled downwards by the falling balance weight lever 62 and is unfolded, so as to display the warning information 60 on the surface of the warning information display member 61 (as shown in FIG. 8), and consequently, after the main attaching member 1 comes loose from the wall W, a user can immediately discover, by means of the prompt of the warning information 60, the situation and performs a recovery operation.

In addition, although not shown in the figures of this embodiment, the warning device 6 may be an electronic warning device (not shown in the figures) that is disposed in the box 23 or another appropriate position, and is capable of sending a warning signal. When the box cover 33B is opened by the connecting bar 33A, the electronic warning device may be synchronously activated to send a warning signal such as a warning sound and/or warning light, and consequently, after the main attaching member 1 comes loose from the wall W, the user can immediately discover, by means of the prompt of the warning signal, the situation and performs a recovery operation.

Figure 11:
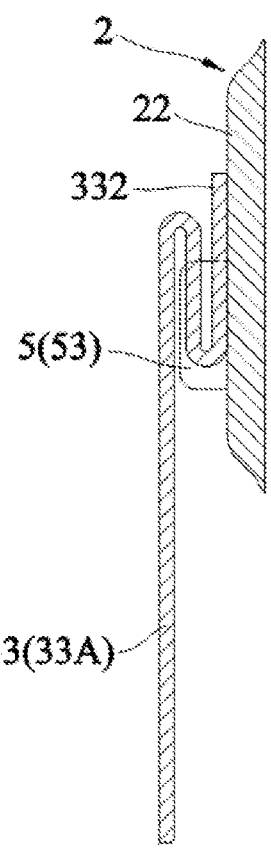
FIG. 11 is a side view of the structure disclosed in FIG. 10.

FIG. 10 and FIG. 11 are schematic diagrams showing situations that the construction of the second embodiment is partially changed. As shown in the figures, the connecting member 33 is a flexible stripe and has a second connection position 332 connected to the backup attaching member 2. Moreover, in the figures, another buffer device 5 is synchronously displayed. The buffer device 5 is two friction members 53 that are disposed at the backup attaching member 2 and are separately close to a left side and a right side of the connecting member 33. The friction members 53 are used for providing a friction function for the falling connecting member 33, thereby achieving functions of reducing a falling speed of the main attaching member 1 and reducing vibration and shaking.

It can be known from the foregoing description that in addition to the replacement device 3 disposed between the main attaching member 1 and the backup attaching member 2, the safety mechanism disclosed in this embodiment further includes the buffer device 5 and the warning device 6. In implementation, certainly, a guiding device 4 applicable to other embodiments may further be provided.

Figure 12:
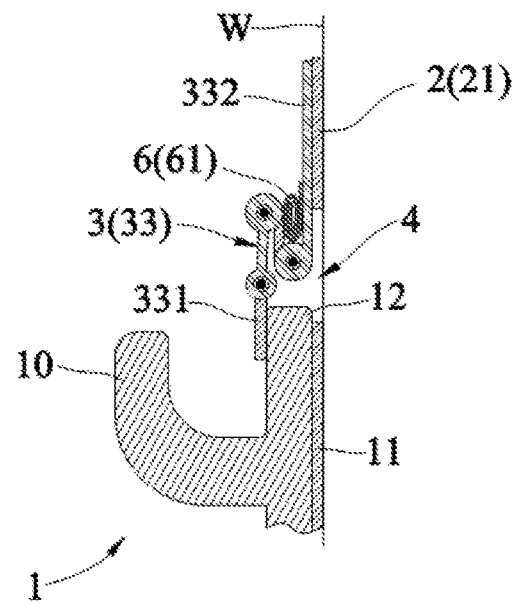
FIG. 12 is a side view of a third embodiment of the adhesion-type holding structure mounted onto a wall according to the present invention.
Figures 13, 14:
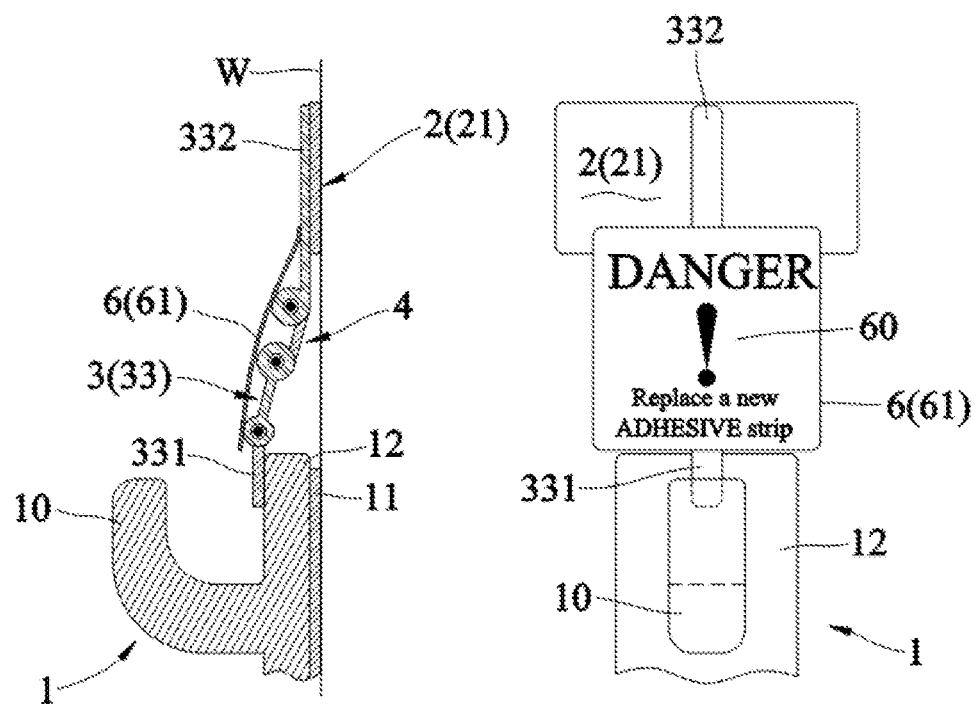
FIG. 13 is a schematic diagram showing a condition that a main attaching member in FIG. 12 has come loose from a wall and has fallen, and a warning information display member has been exposed.
FIG. 14 is a front view of the structure disclosed in FIG. 13.

FIG. 12 to FIG. 14 show the construction of a third embodiment of the adhesion-type holding structure mounted onto a wall according to the present invention. In the figures of this embodiment, the holding portion 10 is a hook; the adhering portion 11 of the main attaching member 1 is an adhesive strip; and the backup attaching member 2 is simplified to the adhering portion 21.

This embodiment is of a relatively simple construction. Although the safety mechanism has the replacement device 3, a guiding device 4, and a warning device 6, the replacement device 3 and the guiding device 4 are merged. The replacement device 3 pulls, by means of a construction of a connecting rod set, the holding portion 10 when the holding portion 10 falls down, so as to perform a connection function. The guiding device 4 also achieves a part of guiding effect by using features of connecting rods, pivotally connected by means of rotating shafts, that the connecting rods can hardly be twisted along longitudinal directions thereof (referring to FIG. 13, the connecting rod set is straightened and hardly makes a twisting movement by using a vertical direction as an axis) and can hardly make a swinging movement on a plane parallel to the wall W. Although the guiding device 4 does not have an effect of enabling the holding portion 10 to keep strictly limited upright, the guiding device 4 still has a part of the guiding function, and thus, the guiding device 4 can be applied to scenarios that held objects hardly fall, for example, the holding portion 10 is a deeply recessed container or a long and sharp hook, because the guiding device 4 is simple.

As shown in the figures, the replacement device 3 disclosed in this embodiment is a "connection type replacement device". The connecting member 33 is a bendable multi-sectional connecting rod. One end of the connecting member 33 is connected to a connection portion 12 of the main attaching member 1, and the other end is directly connected to a surface of the adhering portion 21 as the simplified backup attaching member 2. The connecting member 33 is a connecting rod set formed by pivotally connecting a plurality of connecting rods. The length of the connecting member 33 after the connecting member 33 is completely stretched is greater than the distance between a first connection position 331 and a second connection position 332 in FIG. 12. Therefore, the connecting member 33 assumes a bent shape when the backup attaching member 2 is not activated.

As shown in FIG. 13, when the main attaching member 1 comes completely loose from the wall W and falls down, the falling main attaching member 1 (the holding portion 10) is pulled by the connecting member 33 connected to the backup attaching member 2; when the connecting member 33 is straightened and is completely stretched and tightened, the main attaching member 1 can be prevented from continuing falling down; the replacement process enters a connection stage; and the backup attaching member 2 starts to be formally activated, that is, the backup attaching member 2 replaces the main attaching member 1 to hold the holding portion 10.

In this embodiment three, the connecting member 33 is provided with a warning information display member 61. The warning information display member 61 is a rolled or folded warning slogan volume whose one end is connected to the connecting member 33. Warning information 60 is provided at a surface of the warning information display member 61. The warning information 60 may be, but not limited to, a warning sign and a warning. When the main attaching member 1 adheres to the wall W, the warning information 60 on the warning information display member 61 is clamped in the folded connecting rod by a rolled surface, and thus is hidden (as shown in FIG. 12). However, after the main attaching member 1 comes loose from the wall W and the connecting member 33 is pulled and is completely stretched, the warning information display member 61 synchronously falls and is unfolded, so as to display the warning information 60 on the surface (as shown in FIG. 13 and FIG. 14), and consequently, after the main attaching member 1 comes loose from the wall W, a user can immediately discover, by means of the prompt of the warning information 60, the situation and performs a recovery operation.

FIG. 15 to FIG. 19 show a construction of a fourth embodiment of the adhesion-type holding structure mounted onto a wall according to the present invention. In the figures of this embodiment, the holding portion 10 is a hook; the adhering portion 11 of the main attaching member 1 is a suction cup; the adhering portion 21 of the backup attaching member 2 is an adhesive sheet; a lower surface of the backup attaching member 2 assuming a disc shape is a circular plane and is connected to and fastened to an upper surface of the adhering portion (the adhesive sheet) 21.

Figure 15:
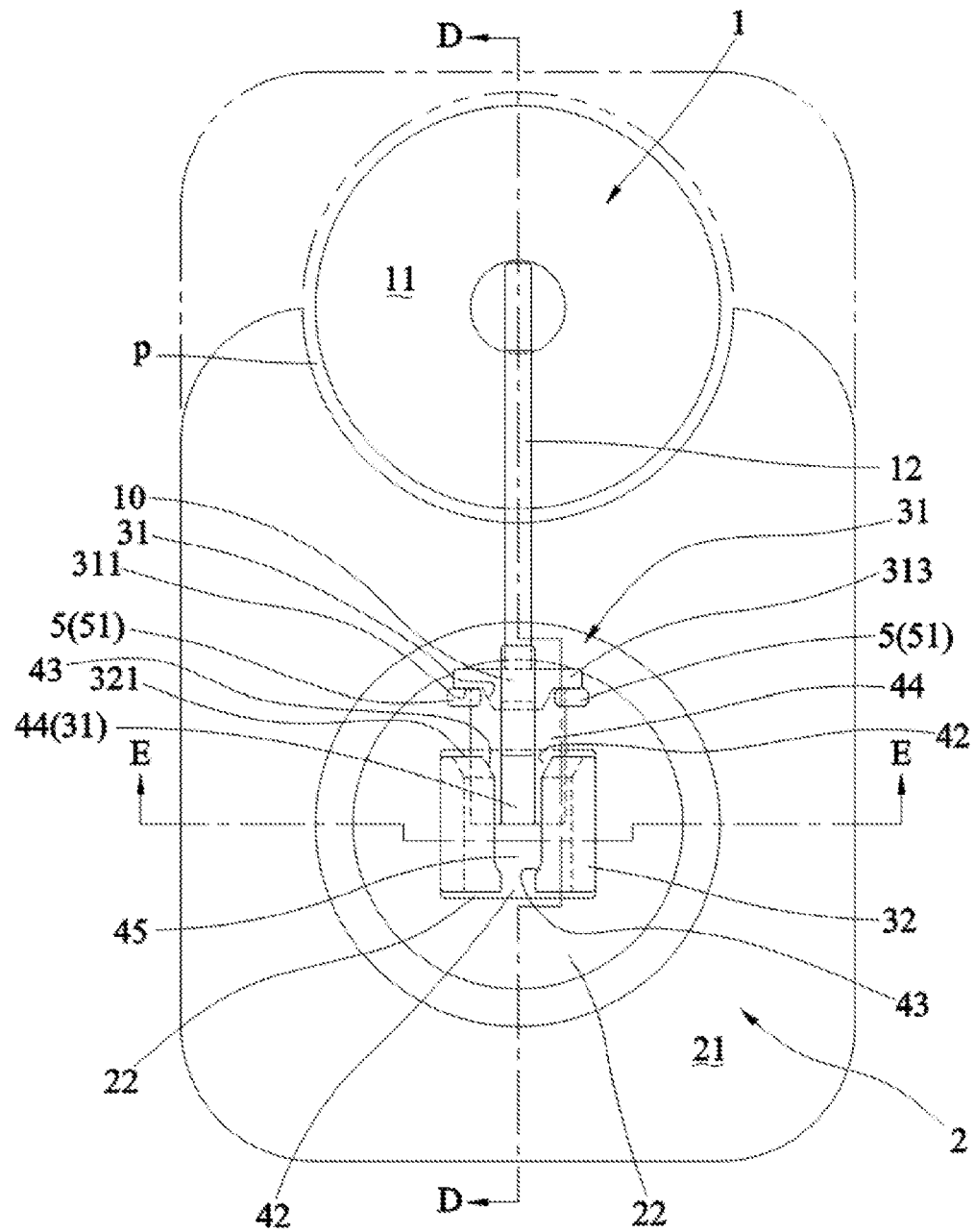
FIG. 15 is a front view of a fourth embodiment of the adhesion-type holding structure mounted onto a wall according to the present invention.

The backup attaching member 2 adheres to the wall W by means of the adhering portion 21. The adhering portion 21 is the adhesive sheet. The adhesive sheet has a main adhered object position p that provides an adhering position for the main attaching member 1. As shown in the figures, the main adhered object position p is a notch at a side edge of the adhering portion 21 (as shown in FIG. 15), or may be a closed hole (as shown in a connection line between two points in the figures) disposed at the adhering portion 21 to enable the main attaching member 1 to be accommodated at the main adhered object position p and to adhere to the wall W. Besides, the main adhered object position p may further be an indicator that is directly marked on a surface of the adhering portion (the adhesive sheet) 21, so as to enable the main attaching member 1 to adhere to a position, indicated by the indicator, on the surface of the adhering portion (the adhesive sheet) 21 and to indirectly adhere to the wall W by means of the adhering portion 21.

This embodiment is of a construction that is relatively sophisticated and is of relatively high safety. The safety mechanism synchronously has the replacement device 3, a guiding device 4, and a buffer device 5. The replacement device 3 is approximately an assembled body of a (T-shaped) slider and a (T-shaped) sliding groove, and is capable of limiting the holding portion 10 to be vertically lifted in an upright state. In implementation, a lifting distance is limited to an appropriate small distance, so as to reduce impact and vibration. A good cushioning pad is provided, so as to further reduce vibration. Therefore, the safety mechanism is a stable and safe safety mechanism. In scenarios that held external objects easily fall, for example, a holding portion is a dish-shaped object, a shelf, or the like, the construction of this embodiment may be used.

The operation of the replacement device 3 is to timely enable, when the main attaching member 1 with the holding portion 10 comes loose from the wall W and falls down, the backup attaching member 2 to replace the main attaching member 1 to hold the holding portion 10. The "replace" may be divided into two stages, prevent and connect. This embodiment uses block to prevent. When the prevention is achieved, the operation of the replacement device 3 is completed, and the formal connection is established. When the connection is not established, the main attaching member 1 is formally used. When the connection is established, the main attaching member 1 has fallen, and the backup attaching member 2 is formally activated.

As shown in the figures, the replacement device 3 disclosed in this embodiment is a "receiving type replacement device". The receiving type replacement device includes an abutment portion 31 that is connected to the main attaching member 1 and has a first connection position 311 (located at a lower surface of a stopper plate 313 of the abutment portion 31), and a receiving portion 32 that is connected to the backup attaching member 2 and has a second connection position 321 (in FIG. 15 to FIG. 19, the second connection position 321 is located at the top of the receiving portion 32 connected to the backup attaching member 2, or be located at an upper end of a (T-shaped) sliding groove 45). A position of the second connection position 321 is lower than a position of the first connection position 311. In this embodiment, the receiving portion 32 connected to the backup attaching member 2 is exactly located at a position below the abutment portion 31 connected to the main attaching member 1.

In this embodiment, an accommodation groove 34 is a (T-shaped) sliding groove. The accommodation groove 34 has a guiding accommodation position 42 (the guiding accommodation position 42 can exactly accommodate a lower end of a (T-shaped) slider 44), and a guiding surface 43 for guiding the falling main attaching member 1 to arrive at the guiding accommodation position 42. The guiding surface 43 is an inclined plane or cambered surface. With such a construction, by means of the abutment portion 31 and the receiving portion 32 of the replacement device 3, a protection mechanism for insurance is provided when the main attaching member 1 accidentally falls down in a usage process due to a condition that the adhering portion 11 comes loose from the wall W and falls down (as shown in FIG. 18), and the backup attaching member 2 replaces the main attaching member 1 to hold the holding portion 10 and hold an external object borne by the holding portion 10 (as shown in FIG. 19).

Figure 16:
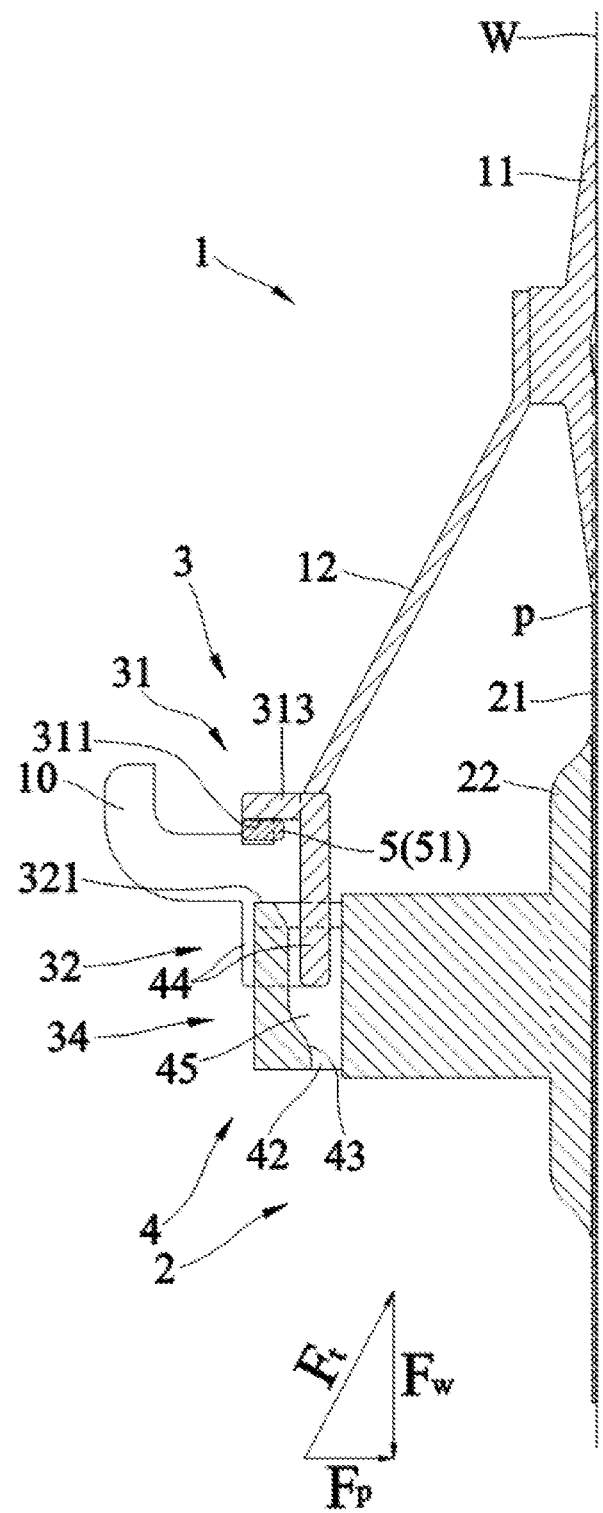
FIG. 16 is a cross-sectional view of the construction disclosed in FIG. 15 at the position D-D.
Figure 17:
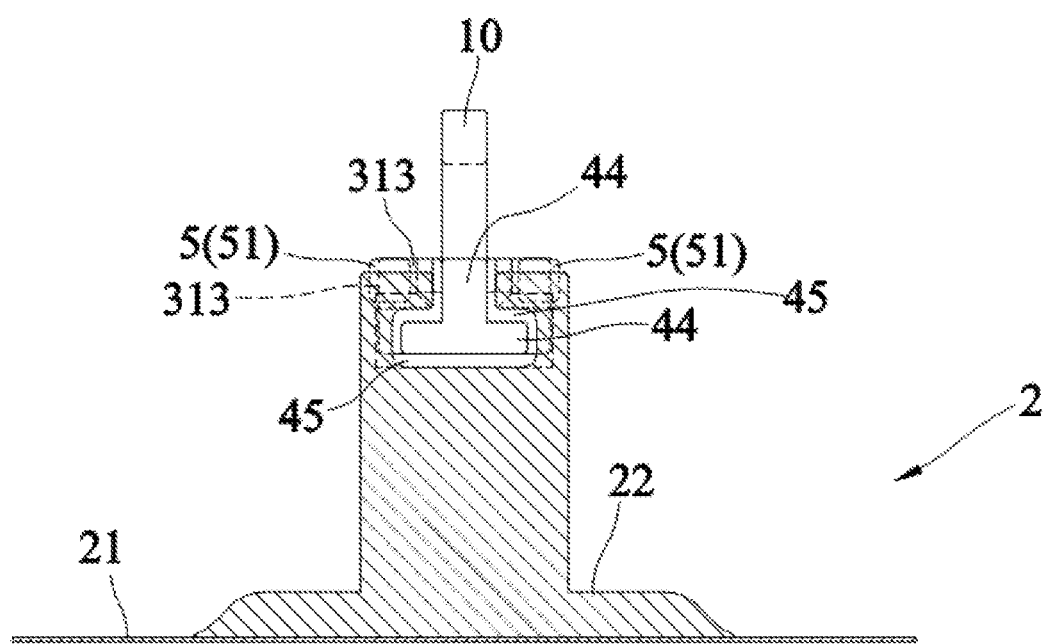
FIG. 17 is a cross-sectional view of the construction disclosed in FIG. 15 at the position E-E.

As shown in FIG. 16, positions of the main attaching member 1, the holding portion 10, and the backup attaching member 2 assume a triangle; the holding portion 10 is connected to the main attaching member via a connection portion 12; the holding portion 10 is flexibly connected to the main attaching member 1, that is, the connection portion 12 allows the holding portion 10 and the main attaching member 1 to move relative to each other; and the holding portion is connected to the backup attaching member 2 via the replacement device 3. Therefore, a resultant force Fp of a downward weight Fw from the holding portion 10 and a pulling force Ft from the main attaching member 1 (transferred by a connecting band 12, that is, the tension of the connecting band 12) presses the backup attaching member 2 towards the wall W (referring to the triangle figure showing the formation of the resultant force below FIG. 16, an arrow of Fp points to the wall W). Therefore, when the main attaching member 1 is attached to the wall W, the weight that an external object applies to the holding portion 10 is converted into a force for pressing the backup attaching member towards the wall W, and consequently, when the main attaching member is used and is subjected to a force, the backup attaching member 2 does not bear the weight of the external object and is tightly pressed against the wall W, and the backup attaching member 2 is in a state of not being activated. After the main attaching member 1 falls, the backup attaching member 2 starts to be used.

Therefore, a disc part of the backup attaching member 2 in the figures can be changed to an existing suction cup; a backup attached object (an adhesive sheet) 31 is canceled; and the suction cup directly adheres to the wall W. In this way, when the main attaching member 1 is used, the suction cup is pressed against the wall W and is in a state of not being activated. The suction cup is guaranteed to be effective and does not start to be used, such that a whole attaching service life can be reserved for individually supporting the holding portion 10. When the main attaching member 1 falls, the suction cup starts to be used. After the suction cup is used for a period of time and air is leaked back into the suction cup, the suction cup fails, and the whole construction falls. Therefore, there is a period of safety time long enough for a user to discover a dangerous situation and to recover to a normal state that the main attaching member 1 holds the holding portion 10.

Figure 18:
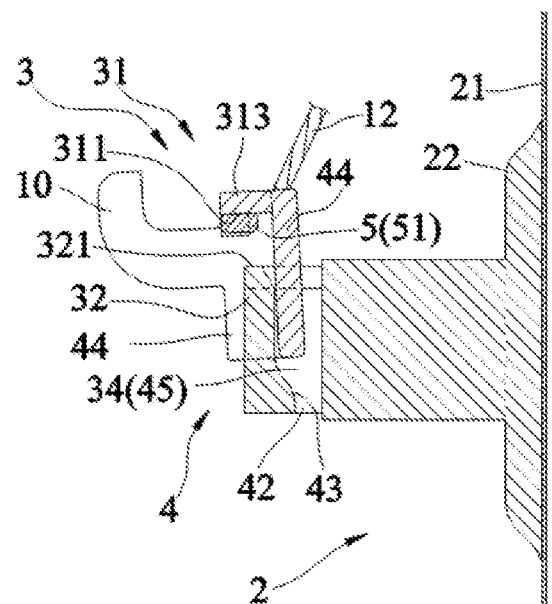
FIG. 18 is a schematic diagram showing a condition that a main attaching member in FIG. 16 starts to come loose from a wall and to fall.
Figure 19:
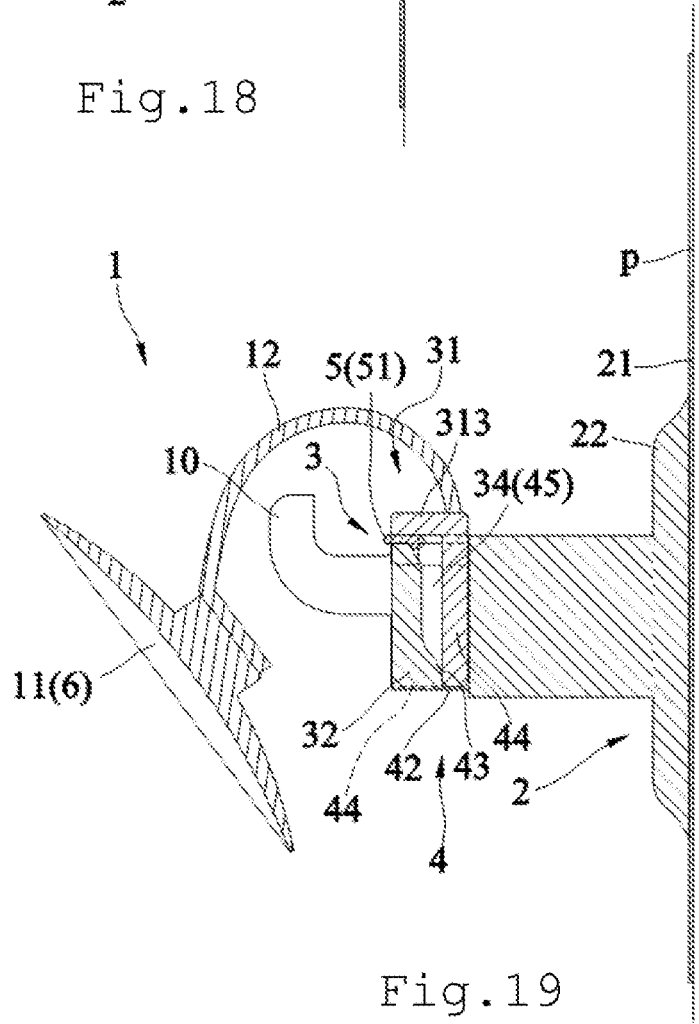
FIG. 19 is a schematic diagram showing a condition that the main attaching member in FIG. 16 has come loose from the wall and has fallen.

As shown in FIG. 18, when the main attaching member 1 starts to come loose from the wall W, comes completely loose from the wall W, and falls down, as shown in FIG. 19, the falling holding portion 10 is guided by the guiding surface 43 to arrive at the guiding accommodation position 42 via a lower end of the (T-shaped) slider 44 of the abutment portion 31 connected to the holding portion 10, so as to enable the holding portion 10 to be upright. At the same time, the second connection position 321 at an upper end of the receiving portion 32 blocks the first connection position 311 above the abutment portion 31 (the cushioning pad 51 is sandwiched between the two connection positions), so as to prevent the holding portion 10 from continuing falling down, and to enable the backup attaching member 2 to replace the main attaching member 1 to hold the holding portion 10.

The guiding device 4 includes a guided portion and a guiding portion that are respectively disposed at the main attaching member 1 and the backup attaching member 2. The guided portion is the (T-shaped) slider 44 disposed below the abutment portion 31, and the guiding portion the (T-shaped) sliding groove 45 disposed at the receiving portion 32. The (T-shaped) slider 44 and the (T-shaped) sliding groove 45 can be fitted with each other and can slide relative to each other. In this way, the (T-shaped) sliding groove 45 can be used for limiting a falling path of the (T-shaped) slider 44, so as to keep the uprightness of the holding portion 10 during a falling process of the main attaching member 1. The distance between the first connection position 311 of the stopper plate 313 of the abutment portion 31 and the second connection position 321 at the upper end of the receiving portion 32 is arranged to be relatively short, and thus, a falling stroke is relatively short, thereby reducing vibration and preventing an external object borne by the holding portion 10 from falling. The foregoing guiding accommodation position 42 and the guiding surface 43 that guides the falling main attaching member 1 to arrive at the guiding accommodation position 42 belong to the guiding device 4, and function to enable the holding portion 10 to keep upright when the holding portion 10 falls to an end.

The buffer device 5 can reduce vibration or shaking of the holding portion 10 when the main attaching member 1 comes loose from the wall W and falls down. In this embodiment, the buffer device 5 is one or more cushioning pads 51 that are on the receiving portion 32 connected to the backup attaching member 2 and/or on the abutment portion 31 connected to the main attaching member 1, so as to eliminate the vibration or shaking of the main attaching member 1. The cushioning pads 51 are of pad constructions that can absorb vibration (e.g. foam or various pads with vibration-absorbing units). When the main attaching member 1 falls to the end, the cushioning pads 51 are sandwiched between contact positions of the abutment portion 31 and the receiving portion 32, thereby achieving an effect of eliminating vibration or shaking.

In this embodiment, the abutment portion 31 has the stopper plate 313, and the cushioning pad 51 is joined to a lower edge of the stopper plate 313. When the main attaching member 1 comes loose from the wall W and falls down, the holding portion 10 falling with the main attaching member 1 can abut, by means of the stopper plate 313, against the top of the receiving portion 32, thereby preventing the holding portion 10 and the whole main attaching member 1 from continuing falling down. In addition, the cushioning pad 51 disposed at the lower edge of the stopper plate 313 is used for providing and achieve a contact buffer function.

In this embodiment, the main attaching member 1 also functions as a warning information display member. As shown in FIG. 19, after the main attaching member 1 comes loose from the wall W and falls down, the connection portion 12 formed by a spring plate returns to a free state, so as to enable the falling suction cup (the adhering portion 11) to fall at a place that can be obviously and easily seen, which is also a place that hinders the usage of the holding portion 10, thereby clearly and explicitly sending out information of a warning and a usage pause. Therefore, after the main attaching member 1 comes loose from the wall W, a user can immediately discover, by means of the prompt of the warning information, the situation and performs a recovery operation.

Figure 20:
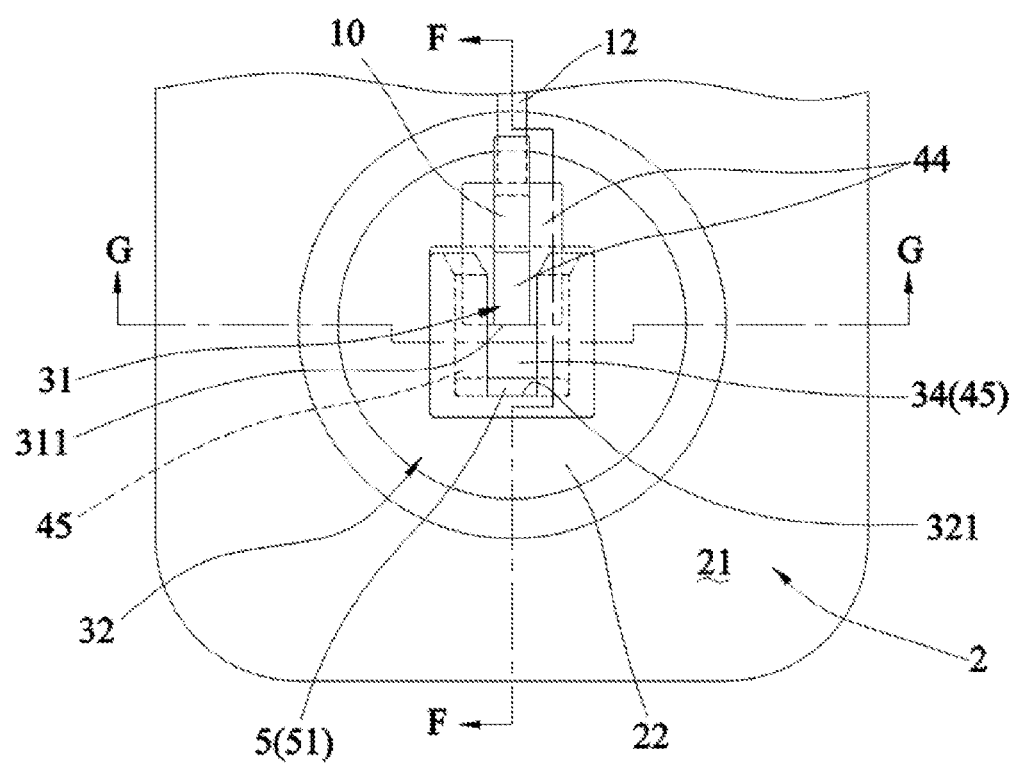
FIG. 20 is a schematic diagram showing a condition that the construction of the fourth embodiment disclosed in FIG. 15 is partially changed.
Figure 21:
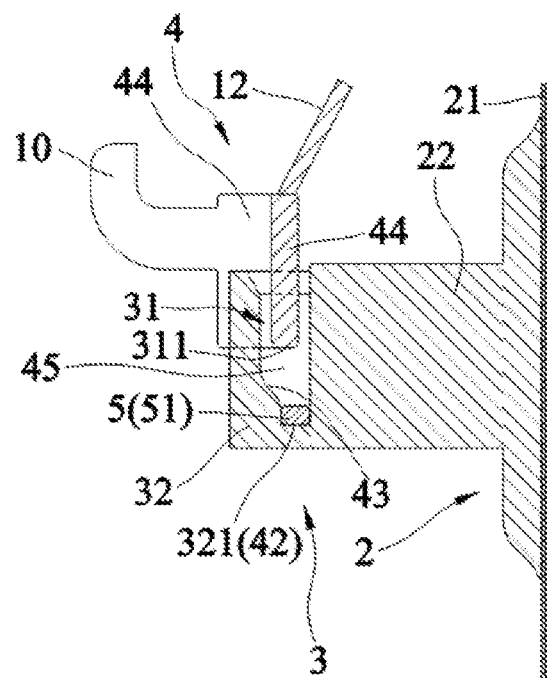
FIG. 21 is a cross-sectional view of the construction disclosed in FIG. 20 at the position F-F.
Figure 22:
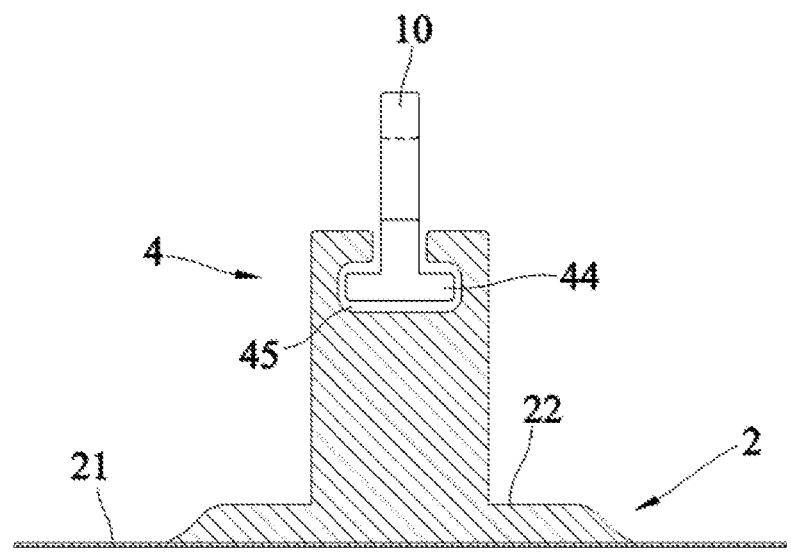
FIG. 22 is a cross-sectional view of the construction disclosed in FIG. 20 at the position G-G.

FIG. 20 to FIG. 22 are schematic diagrams showing situations after parts of the construction of the fourth embodiment are changed. As shown in the figures, although the abutment portion 31 does not have a construction of the stopper plate 313 shown in FIG. 15, the (T-shaped) sliding groove 45 has the bottom with a function the same as the function of the stopper plate 313, and the cushioning pad 51 is disposed at the bottom of the (T-shaped) sliding groove 45 of the receiving portion 32. With this construction, when the main attaching member 1 comes loose from the wall W and falls down, the holding portion 10 falling with the main attaching member 1 can abut, by means of the (T-shaped) slider 44, against the bottom of the (T-shaped) sliding groove 45 of the receiving portion 32, and when the first connection position 311 presses the cushioning pad 51 tightly onto the second connection position 321, the holding portion 10 and the whole main attaching member 1 are prevented from continuing falling down. In addition, the cushioning pad 51 disposed at the bottom of the (T-shaped) sliding groove 45 is used for providing and achieving a contact buffer function.

It can be known from the foregoing description that in addition to the replacement device 3 disposed between the main attaching member 1 and the backup attaching member 2, the safety mechanism disclosed in this embodiment further includes the guiding device 4, the buffer device 5, and the warning device 6.

FIG. 23 to FIG. 27 show a construction of a fifth embodiment of the adhesion-type holding structure mounted onto a wall according to the present invention. In the figures of this embodiment, the holding portion 10 is a hook; the adhering portion 11 of the main attaching member 1 is a suction cup; the adhering portion 21 of the backup attaching member 2 is an adhesive sheet; a lower surface of the backup attaching member 2 assuming a disc shape is a circular plane and is connected to and fastened to an upper surface of the adhering portion (the adhesive sheet) 21.

Figure 23:
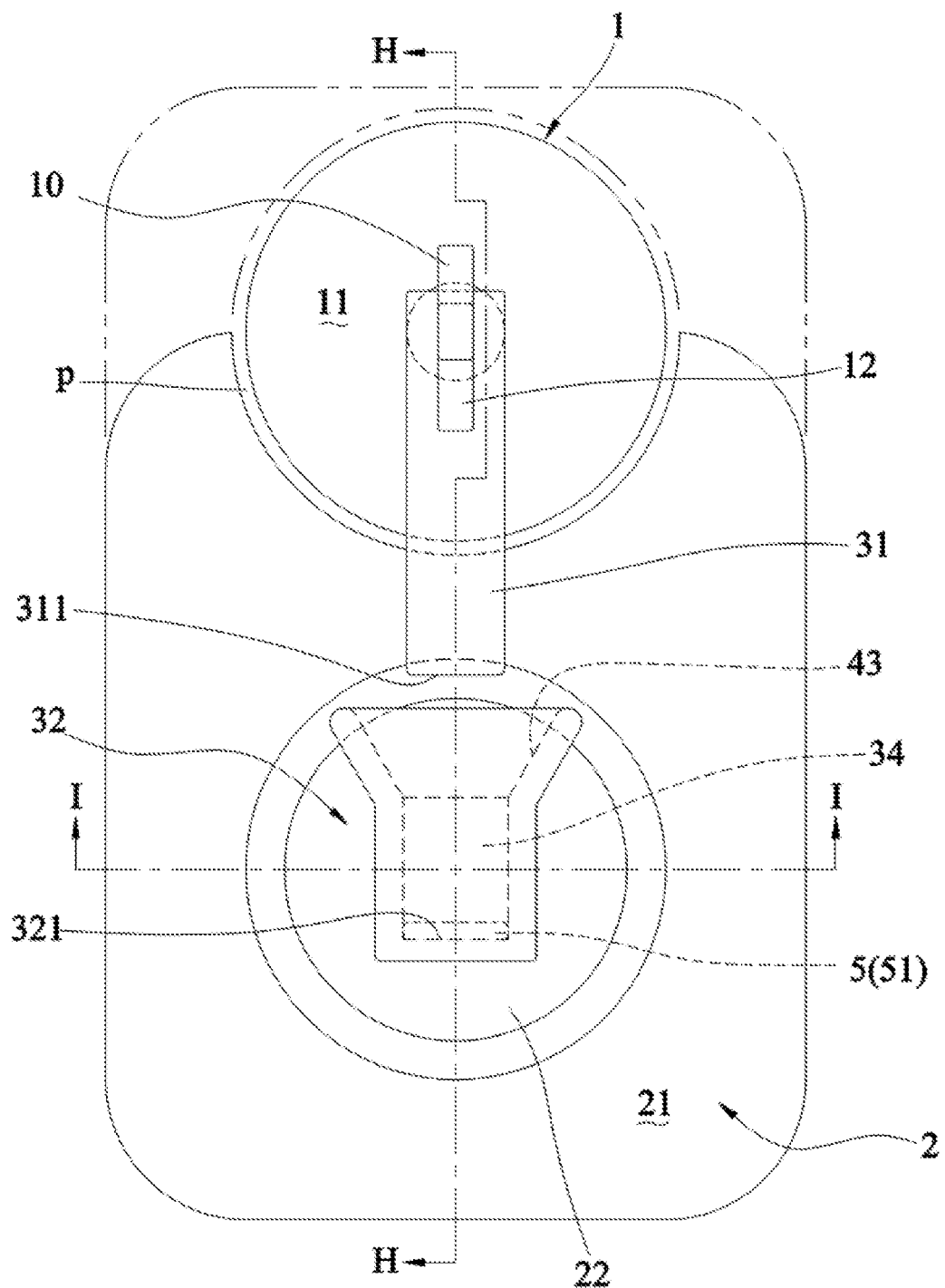
FIG. 23 is a front view of a fifth embodiment of the adhesion-type holding structure mounted onto a wall according to the present invention.
Figures 24, 25:
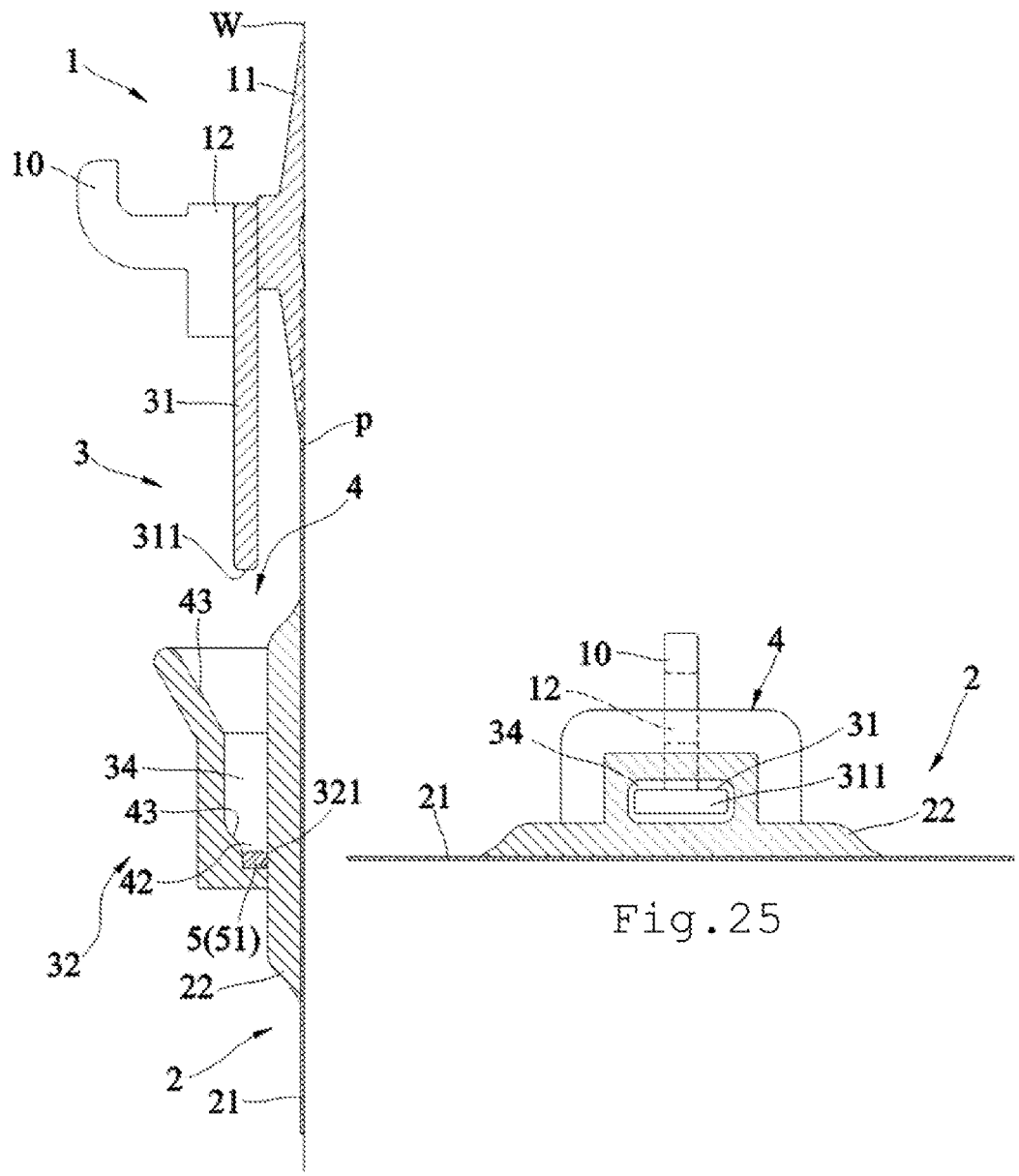
FIG. 24 is a cross-sectional view of the construction disclosed in FIG. 23 at the position H-H.
FIG. 25 is a cross-sectional view of the construction disclosed in FIG. 23 at the position I-I.

The backup attaching member 2 adheres to the wall W by means of the adhering portion 21. The adhering portion 21 is the adhesive sheet. The adhesive sheet has a main adhered object position p that provides an adhering position for the main attaching member 1. As shown in the figures, the main adhered object position p is a notch at a side edge of the adhering portion 21 (as shown in FIG. 23), or may be a closed hole (as shown in a connection line between two points in the figures) disposed at the adhering portion 21 to enable the main attaching member 1 to be accommodated at the main adhered object position p and to adhere to the wall W. Besides, the main adhered object position p may further be an indicator that is directly marked on a surface of the adhering portion 21, so as to enable the main attaching member 1 to adhere to a position, indicated by the indicator, on the surface of the adhering portion 21 and to indirectly adhere to the wall W by means of the adhering portion 21.

In this embodiment, the safety mechanism synchronously has the replacement device 3, the guiding device 4, and the buffer device 5. The construction of this embodiment differs from the partially changed constructions of embodiment 4 (as shown in FIG. 20 to FIG. 22) mainly in that: in this embodiment, in a normal usage state, a guided portion is not fitted into a guiding portion, and is distantly above the guiding portion; and when the main attaching member 1 falls, the guided portion has along falling stroke before being in contact with the guiding portion and being accommodated in the guiding portion.

As shown in the figures, the replacement device 3 disclosed in this embodiment is a "receiving type replacement device". The receiving type replacement device includes an abutment portion 31 that is connected to the main attaching member 1 and has a first connection position 311, and a receiving portion 32 that is connected to the backup attaching member 2 and has a second connection position 321. A position of the second connection position 321 is lower than a position of the first connection position 311. In this embodiment, the receiving portion 32 connected to the backup attaching member 2 is located exactly below the abutment portion 31 connected to the main attaching member 1, and has an accommodation groove 34 capable of receiving the main attaching member 1; the accommodation groove 34 has a guiding accommodation position 42, and a guiding surface 43 for guiding the falling main attaching member 1 to arrive at the guiding accommodation position 42, such that the abutment portion 31 assumes an upright state when completely falling into the guiding accommodation position 42, so as to enable the holding portion 10 to assume an upright state; and the guiding surface 43 is an inclined plane or cambered surface.

Figure 26:
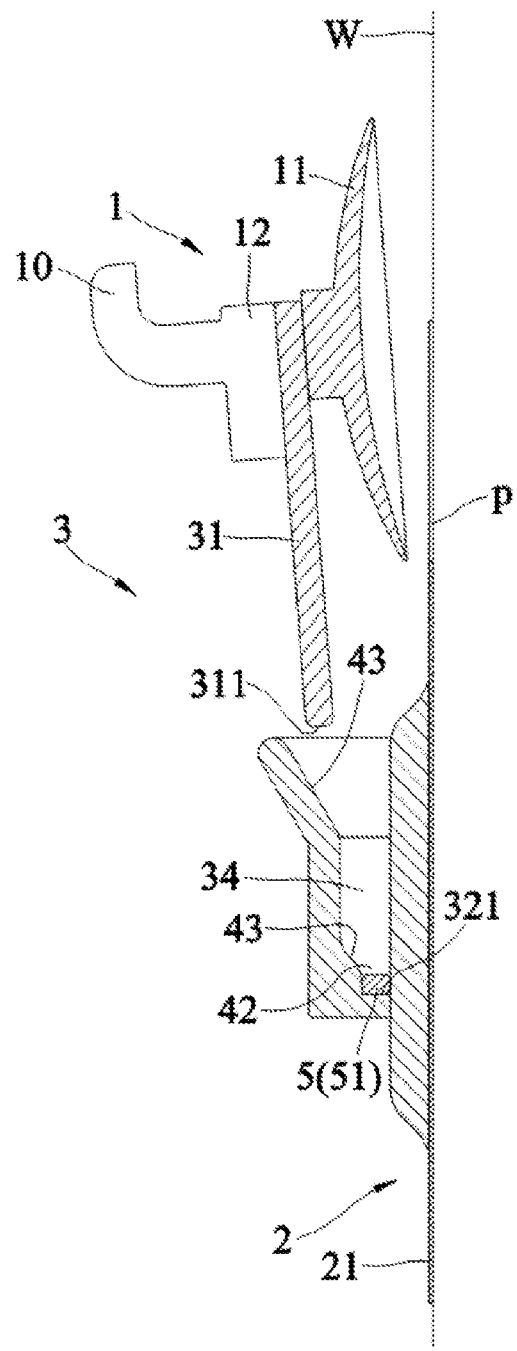
FIG. 26 is a schematic diagram showing a condition that a main attaching member in FIG. 24 starts to come loose from a wall and to fall.
Figure 27:
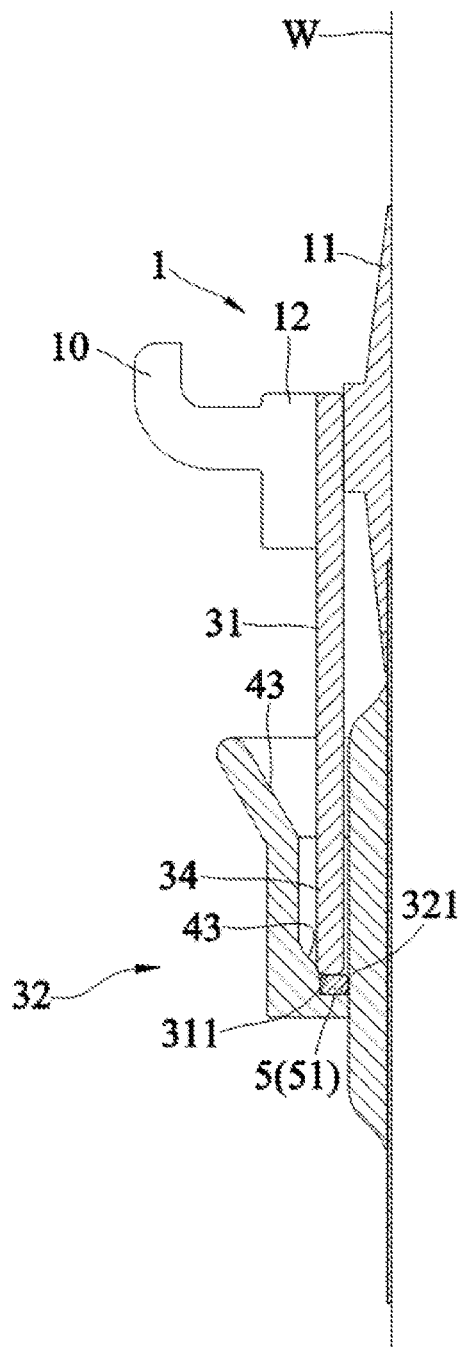
FIG. 27 is a schematic diagram showing a condition that the main attaching member in FIG. 24 has come loose from the wall and has fallen to an end.

With such a construction, by means of the abutment portion 31, the receiving portion 32, and a connecting member 33 of the replacement device 3, a protection mechanism for insurance is provided when the main attaching member 1 accidentally falls down in a usage process due to a condition that the adhering portion 11 comes loose from the wall W and falls down (as shown in FIG. 26), and the backup attaching member 2 replaces the main attaching member 1 to hold the holding portion 10 and hold an external object borne by the holding portion 10 (as shown in FIG. 27).

The guiding device 4 includes a guided portion and a guiding portion that are respectively disposed at the main attaching member 1 and the backup attaching member 2; the guided portion is the abutment portion 31; and the guiding portion includes a guiding accommodation position 42 disposed in an accommodation groove 34 of the receiving portion 32, and a guiding surface 43 for guiding the abutment portion 31 of the falling main attaching member 1 to arrive at the guiding accommodation position 41. In this way, in implementation, the guiding surface of the guiding device 4 may be a guiding surface that is connected to the main attaching member 1 or the backup attaching member 2, and is capable of limiting a falling path of the main attaching member 1 (the holding portion 10), for example, an inclined plane or cambered surface. It can be known from the figures that the guiding accommodation position 42, and the guiding surface 43 that guides the falling main attaching member 1 to arrive at the guiding accommodation position 42 belong to the guiding portion of the guiding device 4, and function to enable the holding portion 10 (the guided portion) to keep upright when the holding portion 10 (the guided portion) falls to an end.

In this embodiment, the buffer device 5 is one or more cushioning pads 51 that are on the receiving portion 32 connected to the backup attaching member 2 and/or on the abutment portion 31 connected to the main attaching member 1, so as to eliminate the vibration or shaking of the main attaching member 1. The cushioning pads 51 are of pad constructions that can absorb vibration (e.g. foam or various pads with vibration-absorbing units). When the main attaching member 1 falls to the end, the cushioning pads 51 are sandwiched between contact positions of the abutment portion 31 and the receiving portion 32, thereby achieving an effect of eliminating vibration or shaking.

It can be known from the foregoing description that in addition to the replacement device 3 disposed between the main attaching member 1 and the backup attaching member 2, the safety mechanism disclosed in this embodiment further includes the guiding device 4 and the buffer device 5. In implementation, certainly, a warning device 6 applicable to other embodiments may further be provided.

Figure 28:
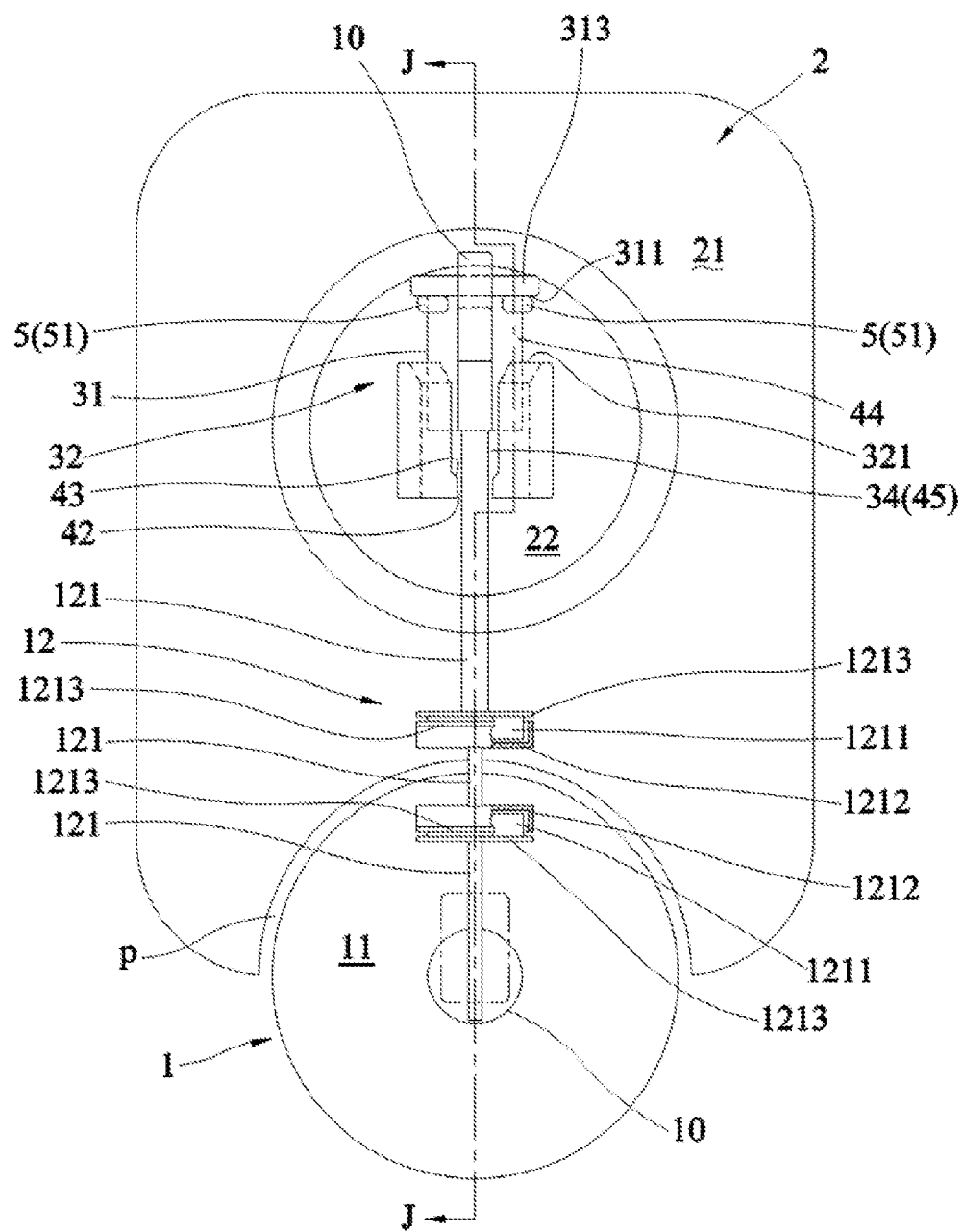
FIG. 28 is a front view of a sixth embodiment of the adhesion-type holding structure mounted onto a wall according to the present invention.
Figure 29:
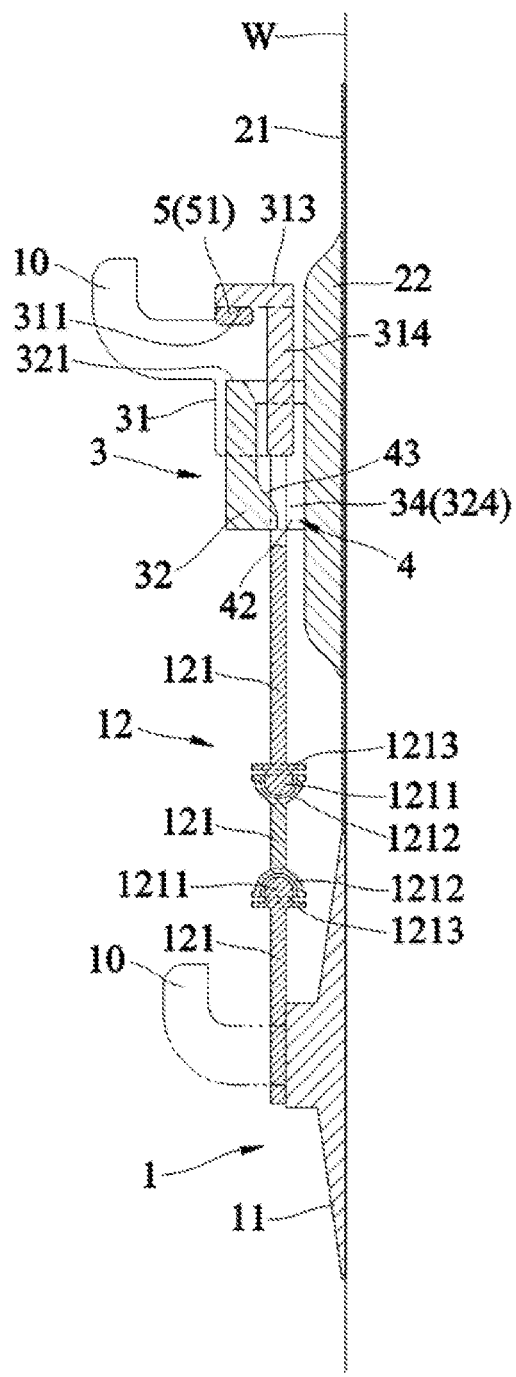
FIG. 29 is a cross-sectional view of the construction disclosed in FIG. 28 at the position J-J.
Figure 30:
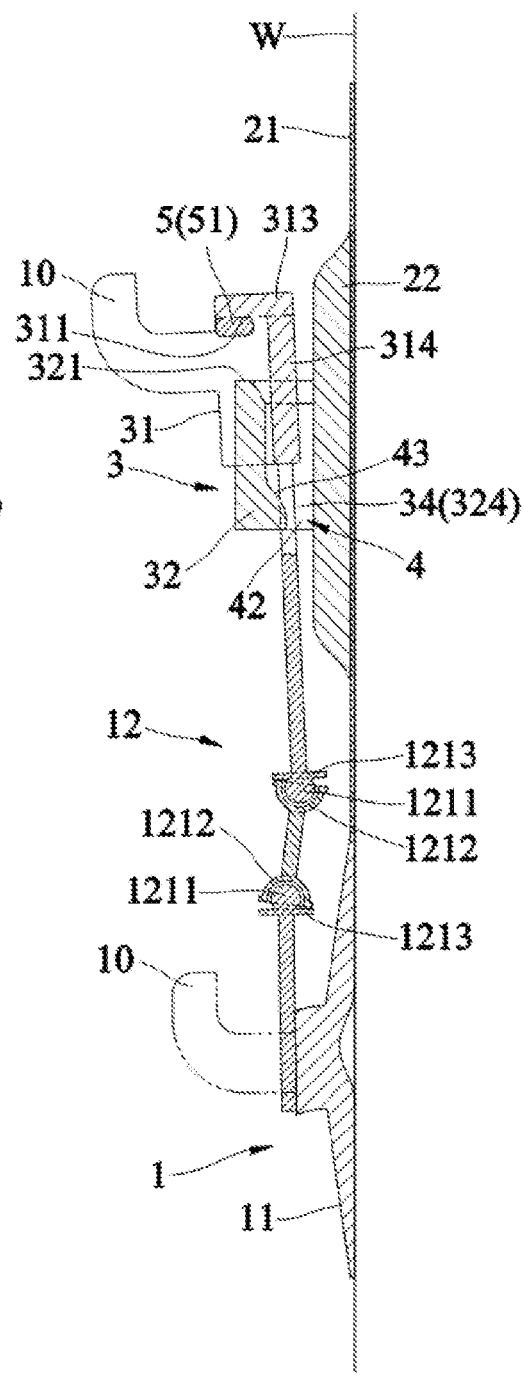
FIG. 30 is a schematic diagram showing a condition that a main attaching member in FIG. 29 starts to come loose from a wall and to fall.

FIG. 28 to FIG. 30 show a construction of a sixth embodiment of the adhesion-type holding structure mounted onto a wall according to the present invention. In the figures of this embodiment, the holding portion 10 is a hook; the adhering portion 11 of the main attaching member 1 is a suction cup; the adhering portion 21 of the backup attaching member 2 is an adhesive sheet; a lower surface of the backup attaching member 2 assuming a disc shape is a circular plane and is connected to and fastened to an upper surface of the adhering portion (the adhesive sheet) 21. In implementation, the holding portion 10 may be directly connected to the adhering portion 11 (as shown in a connection line between two points in the figures).

As shown in the figures, a connection portion 12 of this embodiment is a connecting rod set formed by pivotally connecting one or more sections of connecting rods 121; a bearing 1212 matched with each rotating shaft 1211 is sleeved outside each rotating shaft 1211 for the pivotal connection; the rotating shafts 1211 can rotate in the bearings 1212, such that two adjacent sections of connecting rods 121 can make swinging movements relative to each other; a protruded stopper 1213 is disposed at each bearing 1212 or each connecting rod 121; when the adjacent connecting rods 121 swing to permitted maximum amplitudes, the stoppers 1213 abut against each other, so as to prevent the connecting rods 121 from swinging to amplitudes exceeding the permitted swinging amplitudes; therefore, when the holding portion 10 is subjected to a weight of an external object and presses the connecting rod set downwards, and when the adhering portion (the suction cup) 11 of the main attaching member 1 is subjected to a force, starts to gradually come loose from the wall W (referring to and comparing the suction cups shown in FIG. 29 and FIG. 30), and is not completely come loose from the wall W, the connecting rod set can swing to enable the uppermost connecting rod 121 (as shown in FIG. 30) to remain vertical, so as to enable the backup attaching member 2 to be not subjected to a force for pulling the backup attaching member 2 away from the wall; when the main attaching member 1 comes loose from the wall W and falls, the backup attaching member 2 starts to be activated, so as to reserve a whole attaching service life of the backup attaching member 2 to be used after the main attaching member 1 falls; and thus, the time for the backup attaching member 2 to hold the holding portion 10 may be relatively long, which is enough for waiting for a user to recover to a normal state, and thus, the construction of the present embodiment has relatively high safety.

The backup attaching member 2 adheres to the wall W by means of the adhering portion 21. The adhering portion 21 is the adhesive sheet. The adhesive sheet has a main adhered object position p that provides an adhering position for the main attaching member 1. As shown in the figures, the main adhered object position p is a notch at a side edge of the adhering portion 21 (as shown in FIG. 28), or may be a closed hole disposed at the adhering portion 21 to enable the main attaching member 1 to be accommodated at the main adhered object position p and to adhere to the wall W. Besides, the main adhered object position p may further be an indicator that is directly marked on a surface of the adhering portion 21, so as to enable the main attaching member 1 to adhere to a position, indicated by the indicator, on the surface of the adhering portion 21 and to indirectly adhere to the wall W by means of the adhering portion 21.

In this embodiment, the safety mechanism synchronously has the replacement device 3, a guiding device 4, and a buffer device 5. As shown in the figures, the replacement device 3 disclosed in this embodiment is a "receiving type replacement device".

The receiving type replacement device includes an abutment portion 31 that is connected to the main attaching member 1 and has a first connection position 311 (located at a lower surface of a stopper plate 313 of the abutment portion 31), and a receiving portion 32 that is connected to the backup attaching member 2 and has a second connection position 321. A position of the second connection position 321 (located at a top surface of the receiving portion 32) is lower than a position of the first connection position 311. In this embodiment, the receiving portion 32 connected to the backup attaching member 2 is exactly located at a position below the abutment portion 31 connected to the main attaching member 1.

In this embodiment, an accommodation groove 34 is a (T-shaped) sliding groove. The accommodation groove 34 has a guiding accommodation position 42 (the guiding accommodation position 42 can exactly accommodate a lower end of a (T-shaped) slider 44), and a guiding surface 43 for guiding the falling main attaching member 1 to arrive at the guiding accommodation position 42. The guiding surface 43 is an inclined plane or cambered surface. With such a construction, by means of the abutment portion 31, the receiving portion 32, and a connecting member 33 of the replacement device 3, a protection mechanism for insurance is provided when the main attaching member 1 accidentally falls down in a usage process due to a condition that the adhering portion 11 comes loose from the wall W and falls down (as shown in FIG. 30), and the backup attaching member 2 replaces the main attaching member 1 to hold the holding portion 10 and hold an external object borne by the holding portion 10.

As shown in FIG. 30, when the main attaching member 1 starts to come loose from the wall W, comes completely loose from the wall W, and falls down, the falling main attaching member 1 is connected to the stopper plate 313 via the connecting rod set 12 and the (T-shaped) slider 44, that is, the falling main attaching member 1 can abut, by means of the stopper plate 313 of the abutment portion 31, against an upper surface of the receiving portion 32 that is located below the abutment portion 31 and provides a receiving function, thereby preventing the main attaching member 1 from continuing falling down (at this time, the first connection position 311 at a lower surface of the stopper plate 313 moves downwards and presses, via a cushioning pad 51, onto the second connection position 321 at a top surface of the receiving portion 32), and enabling the backup attaching member 2 to replace the main attaching member 1 to hold the holding portion 10.

The guiding device 4 includes a guided portion and a guiding portion that are respectively disposed at the main attaching member 1 and the backup attaching member 2. The guided portion is the (T-shaped) slider 44 disposed at the abutment portion 31, and the guiding portion is the (T-shaped) sliding groove 45 disposed at the receiving portion 32. The (T-shaped) slider 44 and the (T-shaped) sliding groove 45 can be fitted with each other and can slide relative to each other. In this way, a falling path of the (T-shaped) slider 44 is strictly limited by means of the (T-shaped) sliding groove 45, so as to keep the uprightness of the holding portion 10 during a falling process of the main attaching member 1, reduce shaking, and prevent an external object borne by the holding portion 10 from falling. In implementation, the guiding surface of the guiding device 4 may be a guiding surface that is connected to the main attaching member 1 or the backup attaching member 2, and is capable of limiting a falling path of the main attaching member 1 (the holding portion 10), for example, an inclined plane or cambered surface. Besides, the foregoing guiding accommodation position 42 and the guiding surface 43 that guides the falling main attaching member 1 to arrive at the guiding accommodation position 42 belong to the guiding portion of the guiding device 4, and function to enable the holding portion 10 (the guided portion) to keep upright when the holding portion 10 (the guided portion) falls to the end.

The buffer device 5 can reduce vibration or shaking of the holding portion 10 when the main attaching member 1 comes loose from the wall W and falls down. In this embodiment, the buffer device 5 is one or more cushioning pads 51 that are on the receiving portion 32 connected to the backup attaching member 2 and/or on the abutment portion 31 connected to the main attaching member 1, so as to eliminate the vibration or shaking of the main attaching member 1. The cushioning pads 51 are of pad constructions that can absorb vibration (e.g. foam or various pads with vibration-absorbing units). When the main attaching member 1 falls to the end, the cushioning pads 51 are sandwiched between contact positions of the abutment portion 31 and the receiving portion 32, thereby achieving an effect of eliminating vibration or shaking.

In this embodiment, the abutment portion 31 has the stopper plate 313, and the cushioning pad 51 is joined to a lower edge of the stopper plate 313. When the main attaching member 1 comes loose from the wall W and falls down, the holding portion 10 falling with the main attaching member 1 can abut, by means of the stopper plate 313, against the top of the receiving portion 32, thereby preventing the holding portion 10 and the whole main attaching member 1 from continuing falling down. In addition, the cushioning pad 51 disposed at the lower edge of the stopper plate 313 is used for providing and achieve a contact buffer function.

It can be known from the foregoing description that in addition to the replacement device 3 disposed between the main attaching member 1 and the backup attaching member 2, the safety mechanism disclosed in this embodiment further includes the guiding device 4 and the buffer device 5. In implementation, certainly, a warning device 6 applicable to other embodiments may further be provided.

Further, the foregoing embodiments show constructions that can satisfy the purpose of not falling of the present invention by means of the architecture of the invention concept of the present invention. The embodiments provide many partial constructions that can be used as references of practical applications. In practical application, a person skilled in the art can capture shared parts of the embodiments to form a complete and available adhesion-type holding structure mounted onto a wall that can guarantee not falling.

The foregoing embodiments provide an adhesion-type holding structure mounted onto a wall, mainly characterized in that: one or more backup attaching members 2 are additionally provided near a main attaching member 1 including a holding portion 10 for bearing an external object; a safety mechanism is synchronously provided; the safety mechanism mainly includes a replacement device 3 disposed between the main attaching member 1 and the backup attaching member 2; when the main attaching member 1 unexpectedly falls down in a usage process due to a condition that an adhering portion 11 comes loose from a wall, the backup attaching member 2 can immediately play an alternate and rescue role to replace the main attaching member 1, so as to perform an operation of holding the holding portion 10.

Besides, the safety mechanism may be further provided with a guiding device 4, a buffer device 5, and a warning device 6. The guiding device 4 is capable of limiting a falling process of the main attaching member 1 and is used for keeping uprightness of the holding portion, keep a relatively short falling trajectory, and reduce vibration, thereby preventing the borne external object from falling. The buffer device 5 is capable of reducing a falling speed of the main attaching member 1 and reducing vibration and shaking. The warning device 6 is capable of prompting and reminding a user to recover to a normal state and recover to a normal usage state that the main attaching member 1 holds the holding portion 10.

The following further provides seven specific embodiments, that is, the seventh embodiment to the thirteenth embodiment, according to the aforementioned architecture of the concept of the present invention, and describes the seven specific embodiments with reference to FIG. 31 to FIG. 53.

Further, in the embodiments described below and the foregoing embodiments, a main attaching member is a primary attaching member for attaching when an adhesion-type holding structure mounted onto a wall is in a normal usage state; and a backup attaching member is an attaching member for auxiliary attaching that is standby, is not used, or is only partially used when the adhesion-type holding structure mounted onto a wall is in the normal usage state, and the backup attaching member bears all the attaching task when a first attaching member, as the main attaching member, falls. However, a naming manner of the main attaching member and the backup attaching member is merely used for facilitating the illustration, and is not intended to limit, by means of the names, functions and effects, or structures of the main attaching member and the backup attaching member. Therefore, it should be noted that the main attaching member and the backup attaching member may be regarded as a first attaching member and a second attaching member, that is, the main attaching member and the backup attaching member can be implemented by means of attaching members with identical or different structures without being limited by the naming manner.

In the seven embodiments below, there are many common parts, and there are many parts that are of the same technology and the same function but are implemented by using different constructions. First, the common parts are described as follows: as shown in the figures of the embodiments, the adhesion-type holding structure mounted onto a wall includes: a main attaching member 1, a backup attaching member 2, and a safety mechanism 3M. The main attaching member 1 includes a holding portion 1B for bearing an external object and an adhering portion 11 for adhering to a wall W. The backup attaching member 2 includes an adhering portion 21 for adhering to the wall W. The safety mechanism 3M includes a replacement device 31M disposed between the main attaching member 1 and the backup attaching member 2. With such a construction, when the main attaching member 1 and the backup attaching member 2 are attached to the wall W on positions close to each other, there are at least the following two types of implementation manners.

Type (A): when the main attaching member 1 comes loose from the wall W and falls down, the backup attaching member 2 can prevent, by means of the replacement device 31M, the main attaching member 1 from falling down, and can timely replace the main attaching member 1 to hold the holding portion 1B.

Type (B): the backup attaching member 2 is originally connected to the holding portion 1B, but the replacement device 31M enables the backup attaching member 2 to be not formally activated and to be pressed against the wall; a holding function is performed by the main attaching member 1; and after the main attaching member 1 falls, the backup attaching member 2 is released to replace the main attaching member 1 to hold the holding portion 1B.

The main attaching member 1 and the holding portion 1B may be securely connected or insecurely connected (e.g. lap or hang).

In some embodiments, the main attaching member 1 may further include a connection portion 12 for connecting the holding portion 1B or the adhering portion 11. The connection portion 12 may be, but not limited to, a base, a connecting bar, a flexible stripe, a spring, a soft wire, a chain, a connecting rod, or a connecting member that is swingable because the connecting member has a hinge or a rotating shaft.

In some embodiments, the holding portion 1B means a part that has a shape or a structure for holding, supporting, or placing an external object. In implementation, the holding portion 1B may be, but not limited to, a hook, a hanger, a ledge, a box-like object, a towel bar, a container, a shelf, or a wall handle.

In some embodiments, the backup attaching member 2 may further include a connection portion 22 for connecting the adhering portion 21 or the holding portion 1B. The connection portion 22 may be, but not limited to, a base, a connecting bar, a flexible stripe, a spring, a soft wire, a chain, a connecting rod, or a connecting member that is swingable because the connecting member has a hinge or a rotating shaft.

In some embodiments, besides, each of the adhering portions 11, 21 means an adhered object that has an adhesive force for being stuck to, for adhering to, or for being absorbed to the wall W. In implementation, each of the adhering portions 11, 21 may be, but not limited to, a suction cup, an adhesive, an adhered pad, an adhesive strip, an adhesive sheet, a magnet, a hot melt adhesive, or a hook and loop fastener.

In some embodiment, the main attaching member 1 of the present invention is connected to the holding portion 1B, so as to hold an external object by means of the holding portion 1B. However, when the main attaching member 1 falls from the wall W, in order to prevent the connected holding portion 1B from falling to cause an accident, the backup attaching member 2 is further provided, and the safety mechanism 3M including the replacement device 31M is disposed between the main attaching member 1 and the backup attaching member 2. When the main attaching member 1 is normally attached to the wall W, the backup attaching member 2 plays a standby role, and adheres to a close position of the position of the main attaching member 1 that is directly used. The close position means a position around, such as at a left side of, a right side of, above, and below, the main attaching member 1, or means a surrounding circle that surrounds the main attaching member 1. In this way, when the main attaching member 1 accidentally falls down in a usage process due to a condition that the adhering portion 11 comes loose from the wall W, the backup attaching member 2 immediately plays an alternate and rescue role to replace the main attaching member 1, so as to perform an operation of holding the holding portion 1B.

In some embodiments, in a process of replacing the main attaching member 1 with the backup attaching member 2, in addition to the replacement device 31M that is used for actually achieving a task of preventing the main attaching member 1 and the holding portion 1B from falling down, in implementation, the safety mechanism 3M may further include a guiding device that is capable of enabling the holding portion 1B to keep upright when the holding portion 1B comes loose from the wall W and falls down, and is used for keeping the uprightness of the holding portion 1B, keep a relatively short falling trajectory, or reduce shaking, thereby preventing an external object borne by the holding portion 1B from falling. Besides, the safety mechanism 3M further includes a buffer device that is capable of reducing a falling speed of the main attaching member 1 that comes loose from the wall W and falls down, and/or reducing vibration and shaking of the holding portion 1B, and a warning device that is capable of generating warning information when the holding portion 1B comes loose from the wall W and falls down with the main attaching member 1, so as to prompt and remind a user to recover to a normal state and recover to a normal usage state that the main attaching member 1 holds the holding portion 1B.

The holding portion 1B is connected to the main attaching member 1, and thus, the backup attaching member 2 not only prevents the main attaching member 1 from falling down, but also prevents the holding portion 1B from falling down. The replacement device 31M may be regarded as being formed by an object extending from the backup attaching member 2 and an object extending from the main attaching member 1 (or the holding portion 1B). Besides, the connection manner of the connected constructions is not limited to a secure connection manner, and may be a detachable connection manner, that is, the connected structures can be detached or assembled.

In implementation, the replacement device 31M can be approximately classified into "receiving type replacement device" (shown in the seventh embodiment), "connection type replacement device", and "press-release type replacement device" (shown in the eleventh embodiment and the thirteenth embodiment). The eighth embodiment has a receiving type replacement device as well as a connection type replacement device. The fourth embodiment, the ninth embodiment, and the tenth embodiment have a receiving type replacement device as well as a press-release replacement device.

In some embodiments, the receiving type replacement device 31M includes an abutment portion that is connected to the main attaching member 1 and has an upper connection position, and a receiving portion that is connected to the backup attaching member 2 and has a lower connection position. When the receiving type replacement device is used, a position of the main attaching member 1 is generally higher than a position of the backup attaching member 2. In few cases, the position of the backup attaching member 2 is higher than the position of the main attaching member 1 (e.g. in embodiment eight). A position of the lower connection position is lower than a position of the upper connection position.

In some embodiments, the connection type replacement device includes a connecting member. The connecting member has a lower connection position connected to the main attaching member 1, and an upper connection position connected to the backup attaching member 2.

In some embodiments, in the press-release replacement device, the holding portion 1B is originally connected to the backup attaching member 2 (or be regarded as that the upper connection position and the lower connection position are connected), but the backup attaching member 2 is pressed against the wall by using a positional relationship among the main attaching member 1, the holding portion 1B, and the backup attaching member 2, and thus remains in a state of not being formally activated; and after the main attaching member 1 falls, it is restored to a state that the backup attaching member 2 holds the holding portion 1B.

In some embodiments, in the press-release replacement device, the holding portion 1B is originally connected to the backup attaching member 2 (or be regarded as that the upper connection position and the lower connection position are connected), but the backup attaching member 2 is pressed against the wall by means of an elastic structure when the main attaching member 1 is attached, and thus remains in a state of not being formally activated; and after the main attaching member 1 falls, it is restored to a state that the backup attaching member 2 holds the holding portion 1B.

Besides, in the aforementioned first embodiment to the sixth embodiment, it is mentioned that the position of the second connection position 321 is lower than the position of the first connection position 311, and thus, the first connection position 311 may be regarded as the upper connection position and the second connection position 321 may be regarded as the lower connection position; and in some cases, the position of the first connection position 331 is lower than the position of the second connection position 332, and thus, the first connection position 331 may be regarded as the lower connection position, and the second connection position 332 may be regarded as the upper connection position.

In implementation, the guiding device includes a guided portion and a guiding portion that are respectively disposed at the main attaching member and the backup attaching member. The guided portion and the guiding portion may be constructions that can be fitted with each other and can slide relative to each other; further, the guiding portion may be one or more guiding walls or guiding surfaces (e.g. inclined planes or cambered surfaces) that are disposed at the main attaching member 1 or the backup attaching member 2 and can limit a falling path of the main attaching member 1 (the holding portion 1B); the guiding portion may be a guiding accommodation position disposed at the backup attaching member 2, and a guiding surface (e.g. inclined plane or cambered surface) for guiding the falling main attaching member 1 to arrive at the guiding accommodation position; the guiding accommodation position is located at an end of a falling stroke of the guided portion or the abutment portion (the guiding accommodation position is not necessarily located at a lower end of the guiding portion, referring to FIG. 15, an abutment portion 31 below a stopper plate 313 falls to a guiding accommodation position above a receiving portion 32); and when the guided portion, or the abutment portion 31, or a (T-shaped) slider falls to the end of the falling stroke, (a lower end) of the guided portion, or the abutment portion 31, or the (T-shaped) slider falls into, by means of the guiding of the guiding surface, the guiding accommodation position with a matched size and is clamped, and the guided portion, or the abutment portion 31, or the (T-shaped) slider 44 is enabled to be upright by means of the uprightness of the guiding accommodation position, that is, the holding portion 1B is enabled to be upright.

In implementation, the buffer device may be, but not limited to, a cushioning pad, a damping device, or a friction member. For example, in implementation, when the cushioning pad is used as the buffer device, the cushioning pad may be connected to the main attaching member 1 or the backup attaching member 2.

Using the backup attaching member 2 to replace the main attaching member 1 to hold the holding portion 1B is a temporary measure. Therefore, the warning device can generate warning information when the main attaching member 1 and the holding portion 1B come loose from the wall W and fall down, so as to prompt and remind a user to perform recovering and to recover to a normal usage state that the main attaching member 1 holds the holding portion 1B. In implementation, the warning device is a warning information display member capable of displaying warning information, and the warning information is hidden when the main attaching member 1 adheres to the wall W and is visualized after the main attaching member 1 comes loose from the wall W. The warning device is a warning information display member capable of displaying the warning information, and the warning information is hidden when the main attaching member 1 adheres to the wall W, and is visualized after the main attaching member 1 comes loose from the wall W. In implementation, the warning information display member may be connected to the backup attaching member 2, or be disposed at a position shielded by the main attaching member 1. Besides, the warning device may be an electronic warning device capable of sending a warning signal.

In some embodiments, the holding structure further includes a contact portion for being in contact with a wall; the holding portion is connected to the contact portion, such that a force to which the holding portion is subjected when the holding portion bears an external object is transferred to the contact portion, so as to press the contact portion against the wall.

In one embodiment, the holding structure further includes a support frame, and the contact portion is connected to the holding portion by means of the support frame.

In one embodiment, if the lateral distance between a position on the wall against which the contact portion abuts and an outer bearing edge of the holding portion is da, the lateral distance between an estimated force receiving central position of the holding portion when the holding portion bears an external object to the wall is d1, and the longitudinal distance between the position on the wall against which the contact portion abuts and an attaching center of the main attaching member is d2, da, d1, and d2 satisfy the relationship of $0.2 \leq d1/d2 \leq 3$, where $d1 \leq da$.

In one embodiment, the replacement device includes an elastic portion; the elastic portion is disposed between the adhering portion of the main attaching member and the adhering portion of the backup attaching member; and when the adhering portion of the main attaching member is attached to the wall, an elastic force of the elastic portion presses the adhering portion of the backup attaching member towards the wall by means of the adhering portion of the main attaching member that is attached to the wall.

In one embodiment, the replacement device includes an elastic portion; the elastic portion is connected between the adhering portion of the backup attaching member and the holding portion of the main attaching member; when the adhering portion of the main attaching member is attached to the wall, an elastic force of the elastic portion presses, via the holding portion of the main attaching member, the adhering portion of the backup attaching member towards the wall by means of the adhering portion of the main attaching member that is attached to the wall; the replacement device has a receiving point connected to the holding portion; the holding structure is in a state of adhering to the wall; when the adhering portion of the main attaching member adheres to the wall, the receiving point of the replacement device is located at a first position; and when the adhering portion of the main attaching member falls from the wall, the receiving point of the replacement device is located at a second position lower than the first position.

In one embodiment, the holding structure further includes a position displacement mechanism; the position displacement mechanism is connected to the adhering portion of the main attaching member or the adhering portion of the backup attaching member, so as to have an abutment member for abutting against the wall; and when the adhesion-type holding structure mounted onto a wall is to adhere to the wall, the position displacement mechanism may increase, by means of a displacement generated when the abutment member is pressed towards the wall, the distance between the adhering portion of the main attaching member and the adhering portion of the backup attaching member, so as to enable the adhesion-type holding structure mounted onto a wall to adhere to the wall.

In one embodiment, the main attaching member further includes a connection portion connected between the adhering portion of the main attaching member and the holding portion; and when the main attaching member adheres to the wall and the backup attaching member adheres to the wall at a position below the main attaching member, the holding portion is located below the connection portion of the main attaching member, and the holding portion transfers, by means of the connection portion of the main attaching member and the replacement device, a force to which the holding portion is subjected when the holding portion bears an external object, to the backup attaching member, so as to press the backup attaching member towards the wall.

In one embodiment, the connection portion of the main attaching member further includes a friction member; the connection portion of the main attaching member extends downwards to provide the friction member that can be in contact with the wall; and when the main attaching member adheres to the wall, the friction member prevents the main attaching member from falling down.

In some embodiments, the safety mechanism may include at least one of: (1) a replacement device; (2) a guiding device; (3) a buffer device; and (4) a warning device. With regard to the replacement device, description is further made below.

The operation of the aforementioned replacement device is to timely enable, when the main attaching member connected to the holding portion comes loose from the wall and falls down, the backup attaching member to replace the main attaching member to hold the holding portion. The "replace" means that the load of the holding portion is originally held by the main attaching member, and the backup attaching member plays an auxiliary and standby role; and the backup attaching member replaces the main attaching member to hold the load of the holding portion after the main attaching member falls. Description is made by classifying the "replace" into two types, (A) prevent to connect and (B) press-release. With regard to the type (A), a replacement process can be divided into prevent and connect. The manner for prevent may further be classified into "pull to prevent" and "block to prevent". Both of "pull to prevent" and "block to prevent" relate to preventing by using a resistance. Based on different points of application, the foregoing resistance may be called a pulling force (pulling resistance) or a blocking force (blocking resistance).

When the prevention is achieved, the formal connection starts. When the connection is not established, the main attaching member is formally used. When the connection is established, the main attaching member has fallen, and the backup attaching member is formally used.

When the "block to prevent" is used, in the construction, the upper connection position located at the main attaching member or the holding portion is above the lower connection position located at the backup attaching member, and when the lower connection position at a lower position is in contact with and is connected to the upper connection position at an upper position, the backup attaching member performs blocking to prevent the main attaching member or the holding portion from falling down, that is, the backup attaching member receives the holding portion.

When the "pull to prevent" is used, there is the connecting member connected between the holding portion (the main attaching member) and the backup attaching member; the connecting member and the lower connection position of the holding portion (the main attaching member) are lower than the upper connection position of the backup attaching member; when the connecting member is (subjected to a tensile force) tightened or is totally stretched, the upper connection position of the backup attaching member at an upper position pulls, via the connecting member, the lower connection position of the holding portion (the main attaching member) at a lower position, that is, the backup attaching member is connected to the holding portion, and performs pulling to prevent the holding portion from falling down.

In the type (B), "press-release type replace" (reference may be made to embodiment four (FIG. 16) and embodiments nine to twelve (FIGS. 38, 42, 44, 45, 49, and 51)), the holding portion is originally connected to the backup attaching member (which may be flexible connection), but the main attaching member gets a task of holding the holding portion when the main attaching member is attached, so as to use (I) a positional relationship to press-release the backup attaching member, or (II) an elastic structure to press-release the backup attaching member. The type I is that: the holding portion and the backup attaching member attached to the wall are below the main attaching member; a position of the holding portion extends outwards from the wall and exceeds the main attaching member and the backup attaching member; the holding portion is connected to the main attaching member, and thus, when the main attaching member is attached, the main attaching member and the holding portion together clamp the backup attaching member onto the wall, and the backup attaching member is in a state of not being formally used and is pressed against the wall (it can be regarded as that the upper connection position and the lower connection position are originally connected, but the backup attaching member is pressed against the wall and thus does not perform a bearing task); and when the main attaching member falls, the backup attaching member that is pressed against the wall and is connected to the holding portion is released, and the backup attaching member holds the holding portion. The type II is that: the elastic structure is used for pressing, when the main attaching member 1 is attached, the backup attaching member 2 against the wall and the backup attaching member is in a state of not being formally used (it can be regarded as that the upper connection position and the lower connection position are originally connected to form an integral part, but the backup attaching member is pressed against the wall and thus does not perform a bearing task), and the backup attaching member 2 holds the holding portion 1B after the main attaching member 1 falls.

The foregoing type I and type II may synchronously exist in a device, or the (A) prevent to connect type construction is further added, for example, embodiment four includes the type I and the block to prevent construction.

The following describes some implementation manners of the present invention by providing seven specific embodiments, that is, the seventh embodiment to the thirteenth embodiment. Therefore, various variations may be made to these embodiments, and consequently, the variations still fall within the scope of the present invention. The specific embodiments described in this specification are not intended to or shall not be construed as limiting conditions.

The Seventh Embodiment

Figure 31:
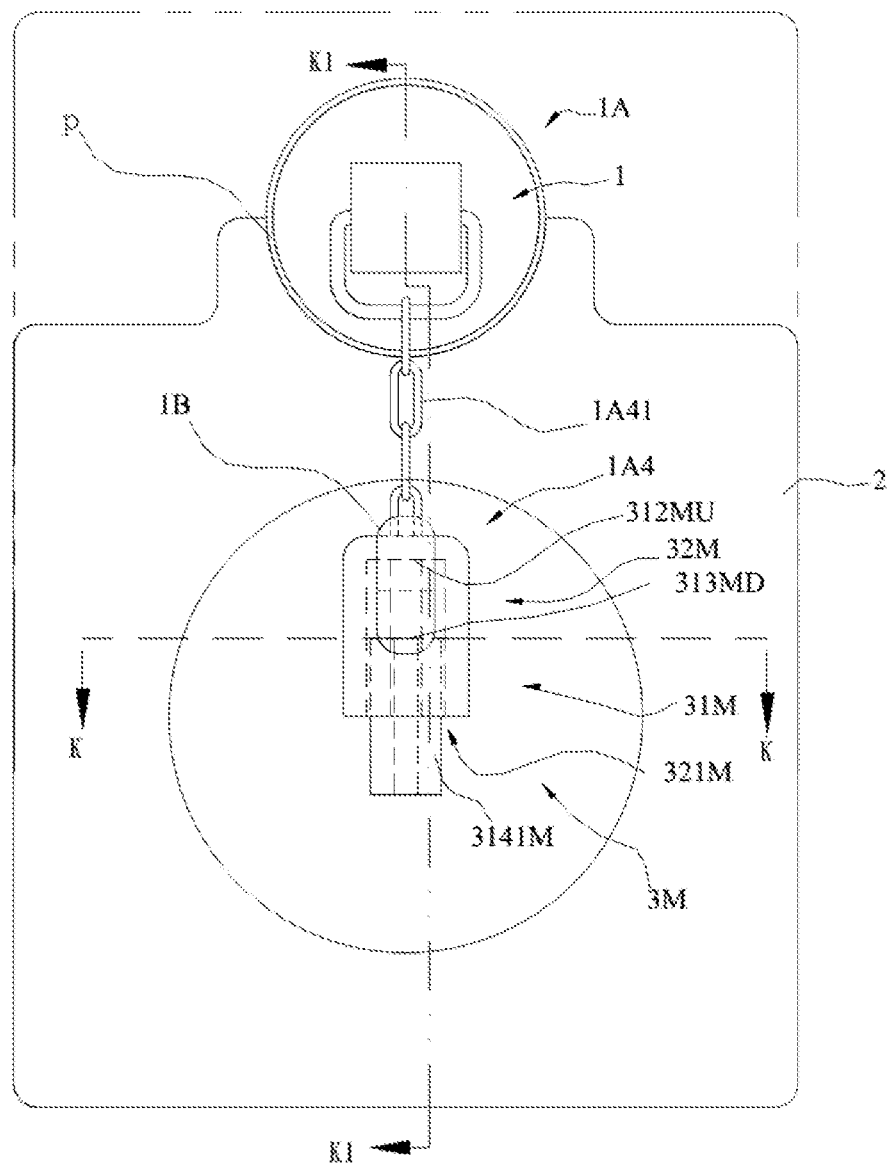
FIG. 31 is a front view of a seventh embodiment of the adhesion-type holding structure mounted onto a wall according to the present invention.
Figure 32:
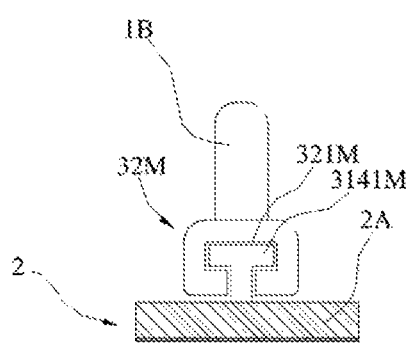
FIG. 32 is a cross-sectional view taken along the line K-K of the holding structure in FIG. 31.
Figure 33:
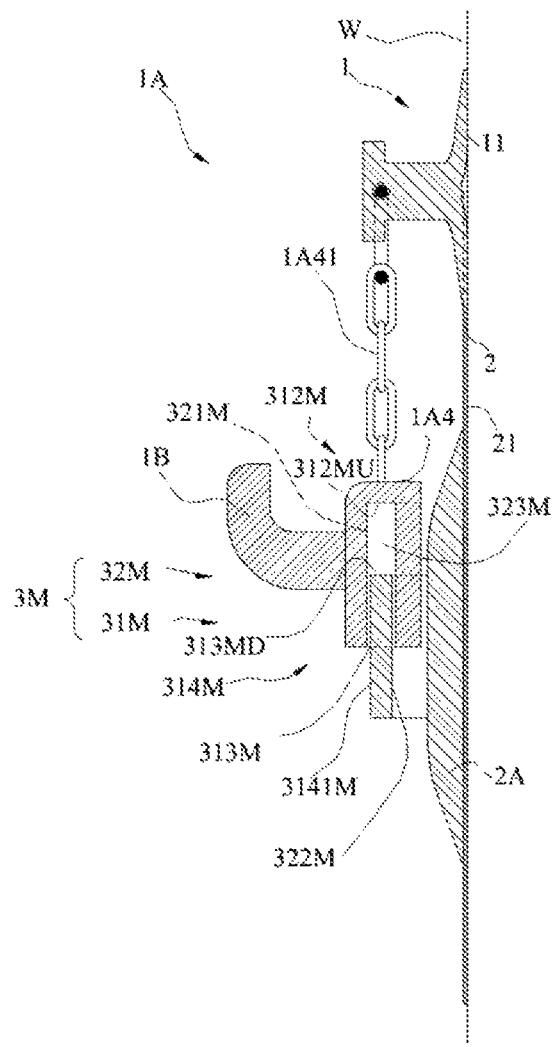
FIG. 33 is a cross-sectional view taken along the line K1-K1 of the holding structure in FIG. 31.

FIG. 31 to FIG. 33 show a construction of the seventh embodiment of the adhesion-type holding structure mounted onto a wall according to the present invention. In the figures of this embodiment, a holding portion 1B is a hook, and an adhering portion 11 of a main attaching member 1 is a suction cup. An adhering portion 21 of a backup attaching member 2 is an adhesive sheet; a lower surface of the backup attaching member 2 assuming a disc shape is a circular plane and is connected to and fastened to an upper surface of the adhering portion (the adhesive sheet) 21.

The backup attaching member 2 adheres to the wall W by means of the adhering portion 21, and the adhering portion 21 is the adhesive sheet. The adhesive sheet is provided with a main adhered object position p that provides an adhering position for the main attaching member 1. As shown in the figures, the main adhered object position p is a notch at a side edge of the adhering portion 21 (as shown in FIG. 31), or may be a closed hole (as shown in a connection line between two points in FIG. 31) disposed at the adhering portion 21 to enable the main attaching member 1 to be accommodated at the main adhered object position p and to adhere to the wall W. Besides, the main adhered object position p may further be an indicator that is directly marked on a surface of the adhering portion (the adhesive sheet) 21, so as to enable the main attaching member 1 to adhere to a position, indicated by the indicator, on the surface of the adhering portion (the adhesive sheet) 21 and to indirectly adhere to the wall W by means of the adhering portion 21.

In this embodiment, a safety mechanism 3M includes a replacement device 31M and a guiding device 32M; the replacement device 31M has a telescopic construction 314M; the telescopic construction 314M is approximately an assembled body of a slider 3141M and a (T-shaped) sliding groove 321M, and is capable of limiting the holding portion 1B to be vertically lifted in an upright state. In implementation, a lifting distance may be limited to an appropriate small distance, so as to reduce impact and vibration. A good cushioning pad is provided, so as to further reduce vibration (the good cushioning pad may be disposed at the abutment portion 312M or the receiving portion 313M). Therefore, the safety mechanism 3M is a stable and safe safety mechanism. In scenarios that held external objects easily fall, for example, a holding portion is a dish-shaped object, a shelf, or the like, the construction of this embodiment may be used.

The operation of the replacement device 31M is to timely enable, when the main attaching member 1 with the holding portion 1B comes loose from the wall W and falls down, the backup attaching member 2 to replace the main attaching member 1 to hold the holding portion 1B. The "replace" may be divided into two stages, prevent and connect. This embodiment uses block to prevent. When the prevention is achieved, the operation of the replacement device 31M is completed, and the formal connection is established. When the connection is not established, the main attaching member 1 is formally used. When the connection is established, the main attaching member 1 has fallen, and the backup attaching member 2 is formally activated.

As shown in FIG. 31 to FIG. 33, the replacement device 31M disclosed in this embodiment is a "receiving type replacement device". The receiving type replacement device 31M includes the abutment portion 312M that is connected to the main attaching member 1 and has an upper connection position 312MU (which is located at an upper part of the interior of a connection block 1A4 of a connection portion 1A and faces a surface of a guide rail 3141M in FIG. 33), and the receiving portion 313M that is connected to the backup attaching member 2 and has a lower connection position 313MD (an upper end of the (T-shaped) guide rail 3141M in FIG. 33), where a position of the lower connection position 313MD is lower than a position of the upper connection position 312MU, and the backup attaching member 2 is below the main attaching member 1. When the main attaching member 1 is fastened to the wall, a telescopic construction 314M is stretched, and the upper connection position 312MU and the lower connection position 313MD are separated, as shown in FIG. 33. When the main attaching member 1 falls, the telescopic construction 314M is retracted; a sliding groove 321M falls; the abutment portion 312M abuts against the receiving portion 313M; the upper connection position and the lower connection position are connected; and at this time, the holding portion 1B is held by the backup attaching member 2.

The guiding device 32M includes a guided portion and a guiding portion that are respectively disposed at the main attaching member 1 and the backup attaching member 2; the guided portion is the connection block 1A4 at which the sliding groove 321M is located; the guiding portion is the guide rail 3141M that is connected to the backup attaching member 2; and in this way, the guide rail can limit a falling path of the connection block 1A4 at which the sliding groove 321M is located, so as to keep the uprightness of the holding portion 1B in a falling process of the main attaching member 1. Further, the distance between the upper connection position 312MU of the connection block 1A4 of the abutment portion 312M and the lower connection position at the upper end of the receiving portion 313M is arranged to be relatively short, such that a falling stroke is relatively short, thereby reducing vibration and preventing an external object borne by the holding portion 1B from falling.

In this embodiment, the main attaching member 1 also functions as a warning information display member. After the main attaching member 1 comes loose from the wall W and falls, the connection portion 1A formed by a connecting member 1A41 (e.g. a chain, a connection ring, or a connecting member that is swingable because the connecting member has a hinge or a rotating shaft) and the connection block 1A4 is restored to a free state, so as to enable a falling suction cup (the adhering portion 11) to fall at a place that can be obviously and easily seen, which is also a place that hinders the usage of the holding portion 1B, thereby clearly and explicitly sending out information of a warning and a usage pause. Therefore, a user can immediately discover the situation and performs a recovery operation.

The Eighth Embodiment

Figure 34:
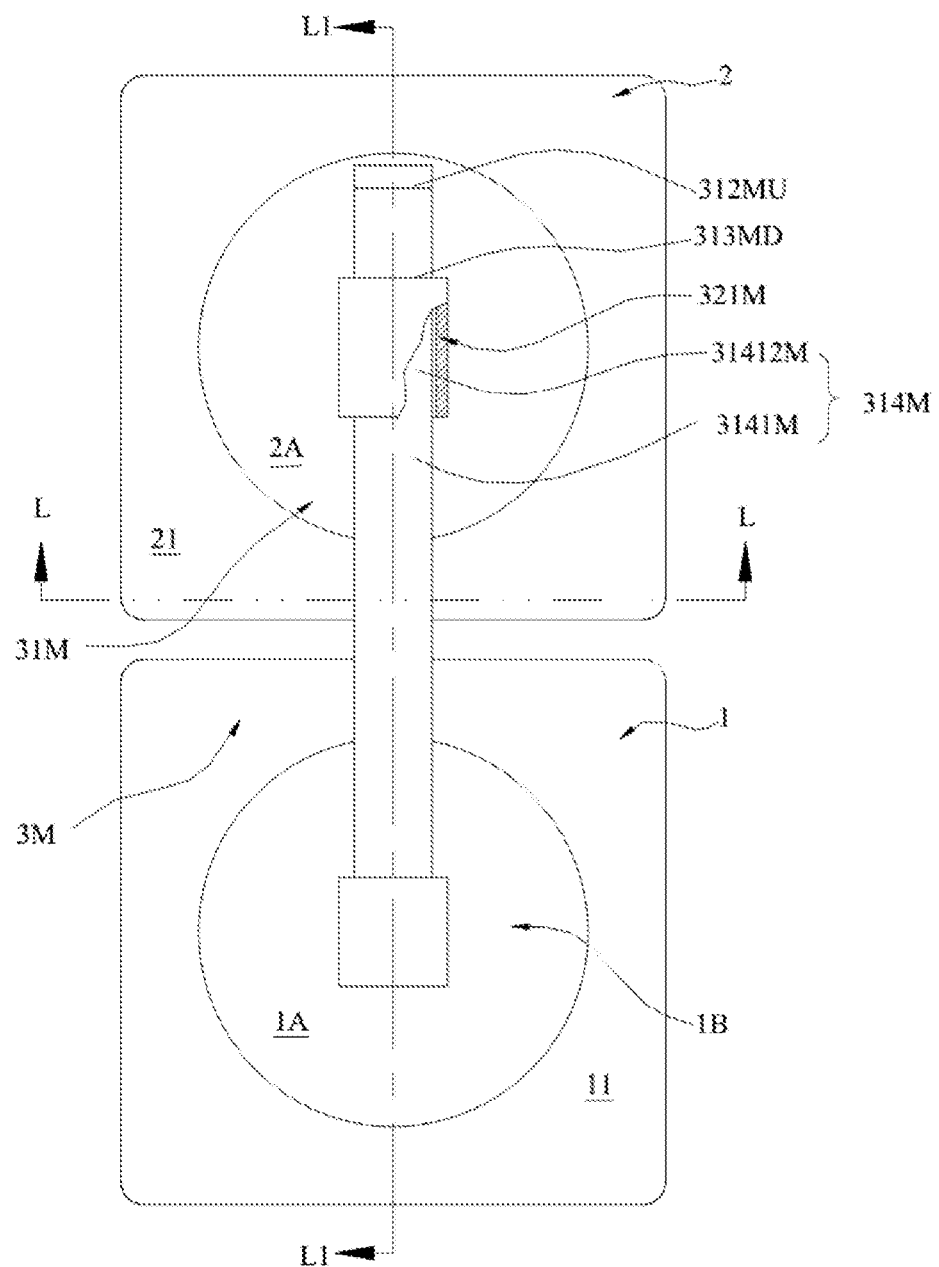
FIG. 34 is a front view of an eighth embodiment of the adhesion-type holding structure mounted onto a wall according to the present invention.

FIG. 34 to FIG. 36 show a construction of the eighth embodiment of the adhesion-type holding structure mounted onto a wall according to the present invention. In the figures of this embodiment, a backup attaching member 2 is at an upper position, and a main attaching member 1 is at a lower position; a holding portion 1B is a suction cup head of an adhesive sheet type suction cup; an adhering portion 11 of the main attaching member 1 is an adhesive sheet; and an adhering portion 21 of the backup attaching member 2 is also an adhesive sheet. The main attaching member 1 further includes a disc-shaped connection portion (base) 1A, and the backup attaching member 2 further includes a disc-shaped connection portion (base) 2A.

The replacement device 31M disclosed in this embodiment is a "receiving type replacement device". As shown in FIG. 34, a guide rail 3141M is a flat and long guide rail that is slightly flexible and bendable; a lower end 31411M of the guide rail is connected to the connection portion (base) 1A of the main attaching member 1, and an upper portion 31412M of the guide rail 3141M penetrates through a groove hole of a sliding groove 321M (which may be regarded as a guiding groove for guiding) and then is connected to an abutment portion 312M; an upper end of the guiding groove is a receiving portion 313M; as shown in FIG. 34 and FIG. 35, the abutment portion is greater than the groove hole of the guiding groove, and thus is blocked at the receiving portion and is unable to pass through the guiding groove; the length of the guide rail 3141M is greater than the distance between the receiving portion 313M and the lower end 31411M of the guide rail, and thus, the guide rail has a section of moving space for longitudinal stretching and retraction. In this embodiment, an upper connection position 312MU is located at the abutment portion 312M (which is connected to the main attaching member 1 at a lower position), and a lower connection position 313MD is located at the receiving portion 313M (which is connected to the backup attaching member 2 at an upper position). When the main attaching member 1 falls from the wall, the guide rail and the abutment portion 312M at the upper end of the guide rail fall, so as to be in contact with the receiving portion 313M; and the upper connection position 312MU and the lower connection position 313MD are connected, so as to enable the backup attaching member 2 and the holding portion 1B to be connected, such that the backup attaching member 2 replaces the main attaching member 1 to hold the holding portion.

In the construction of this embodiment, a safety mechanism 3M includes a replacement device 31M and a guiding device 32M that cooperate with each other. When the main attaching member 1 connected to the holding portion 1B falls down, a stopper construction of the replacement device 31M and a guiding construction of the guiding device 32M are used for limiting the main attaching member 1 and the holding portion 1B, such that the main attaching member 1 and the holding portion 1B cannot swing parallel to the wall, and can merely slightly swing up and down and fall at a direction away from the wall; and the swinging and falling at the direction away from the wall are blocked by the replacement device 31M and thus are prevented, thereby achieving a safe effect.

In this embodiment, the replacement device 31M includes the guide rail 3141M, the abutment portion 312M at the top of the guide rail 3141M, and the receiving portion 313M above the sliding groove 321M. When the main attaching member 1 falls, the abutment portion 312M falls to be clamped on the receiving portion 313M; the upper connection position and the lower connection position are connected, and the guide rail and the main attaching member 1 are received; and the backup attaching member 2 starts to be formally activated and replaces the main attaching member 1 to hold the holding portion 1B.

In this embodiment, the guiding device 32M includes the guide rail 3141M and the sliding groove 321M, and has a guiding function to a particular extent, as described earlier. Such type of guiding device may be provided or selected on some appropriate products.

In this embodiment, the safety mechanism 3M may be designed to have a warning information display function. For example, in FIG. 34, an icon, a word, or a color may be printed on a part of the upper portion 31412M of the guide rail shielded by the sliding groove 321M, and after the main attaching member 1 falls, the originally shielded upper portion 31412M of the guide rail is exposed because the upper portion 31412M of the guide rail slides downwards with the guide rail, so as to display the warning information, such that a user can perform a recovery operation after discovering the warning information. In addition, when the main attaching member 1 gradually comes loose from the wall due to an external object held by the main attaching member 1, the guide rail pulls, because the guide rail is bendable and elastic, the lower end 31411M of the guide rail to generate a displacement along a horizontal direction away from the wall, and such type of displacement along the horizontal direction does not pull the backup attaching member 2. After the main attaching member 1 falls, the backup attaching member 2 starts to be used. Therefore, a whole attaching service life of the backup attaching member 2 may be used as a warning period of time.

Besides, in another example, the main attaching member 1 in FIG. 34 may be changed to a suction cup.

The Ninth Embodiment

FIG. 37 to FIG. 40 show a construction of the ninth embodiment of the adhesion-type holding structure mounted onto a wall according to the present invention. In the figures of this embodiment, a holding portion 1B is drawn as a hook, and both of an adhering portion 11 of a main attaching member 1 and an adhering portion 21 of a backup attaching member 2 are drawn as suction cups. A main structural difference between this embodiment and the aforementioned seventh embodiment is: a joint mechanism among the holding portion 1B, the main attaching member 1, and the backup attaching member 2.

Figure 38:
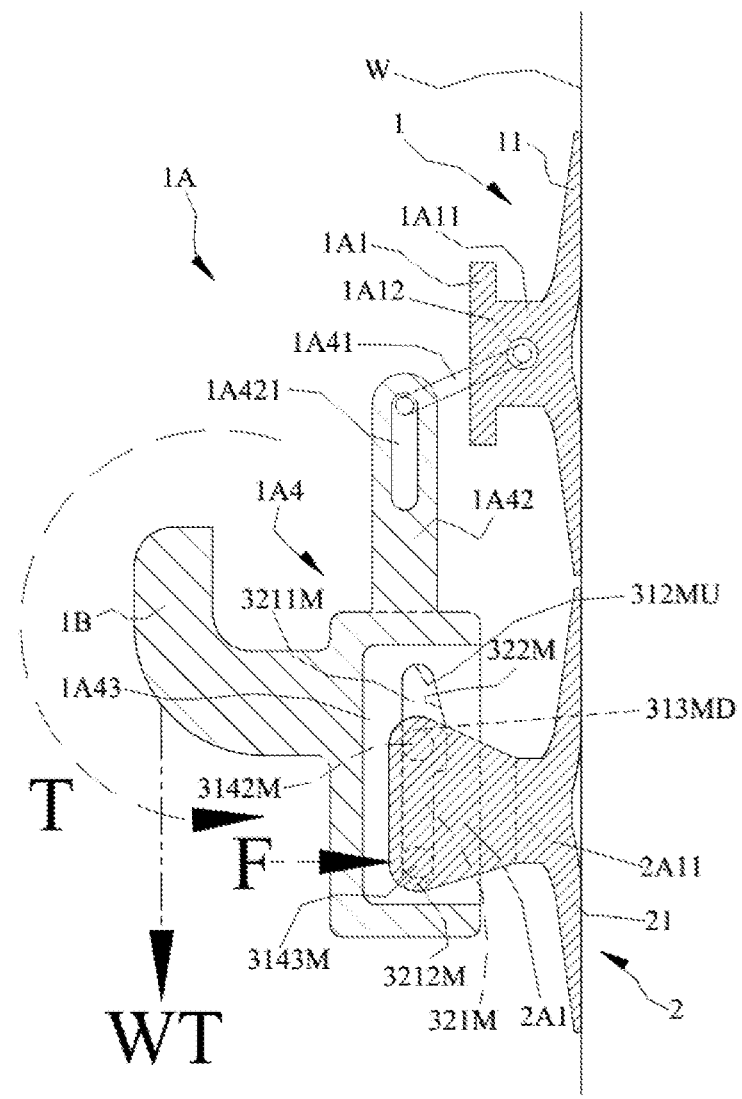
FIG. 38 is a cross-sectional view taken along the line M-M of the holding structure in FIG. 37.

As shown in FIG. 38, a connection portion 1A of the main attaching member 1 includes: a connection head 1A1, a connecting neck portion 1A11 connected between the connection head and the adhering portion 11 of the main attaching member, a connecting shaft hole 1A12 located at the connecting neck portion, a connecting member 1A41 (as shown in the figure, a square connecting ring is used as an example), a connecting rod 1A42, and a connection block 1A4, where the connecting member 1A41 penetrates through the connecting shaft hole 1A12 on the connecting neck portion 1A11 and can rotate in the connecting shaft hole 1A12; the other side of the connecting member 1A41 penetrates through a long groove 1A421 on the connecting rod 1A42 and thus is connected to the connecting rod, so as to move up and down in the long groove; and the connecting rod 1A42 and the connection block 1A4 are securely connected.

A connection portion 2A of the backup attaching member 2 includes: a slightly inclined trapezoid-shaped plate-type connection head 2A1 through which a front guide pin 3142M and a rear auxiliary pin 3143M horizontally penetrate, a connecting neck portion 2A11 located between the connection head and the adhering portion 21 of the backup attaching member, and a connection block 1A4 connected to the connecting rod 1A42 and the holding portion 1B, where a flat groove 1A43 and a sliding groove 321M (a special-shaped groove is used as an example herein) crossing with the flat groove are located at the middle of the connection block, and in this way, when the front guide pin 3142M and the rear auxiliary pin 3143M slid up and down in the sliding groove 321M, the connection head 2A1 synchronously slides up and down in the flat groove 1A43 without inclination.

The connection head 2A1 is connected to the adhering portion 21 of the backup attaching member 2 by means of the square connecting neck portion 2A11, and the connection block 1A4 is securely connected to the holding portion 1B. In this way, when the adhering portion 21 is fastened to the wall, it is limited that the holding portion 1B does not incline when the holding portion 1B is lifted.

In this embodiment, the replacement device 31M includes the connection portion 1A of the main attaching member and the connection portion 2A of the backup attaching member; when the main attaching member 1 first gradually comes away from the wall in a period of time from getting close to fall to starting to fall, at this time, there is a relatively wide movement room 323M at the middle of the sliding groove 321M, so as to allow the front guide pin 3142M to move in the movement room 323M, such that when the holding portion 1B is slightly inclined caused by a leftward movement of the main attaching member 1 (referring to FIG. 39), the holding portion 1B is unlikely to turn the backup attaching member 2 counterclockwise and to apply a force to the backup attaching member 2, thereby preventing, before the main attaching member falls, the backup attaching member from being subjected to a force for falling from the wall, reserving a whole attaching service life of the backup attaching member, and formally activating the backup attaching member after the main attaching member falls.

Figures 39, 40:
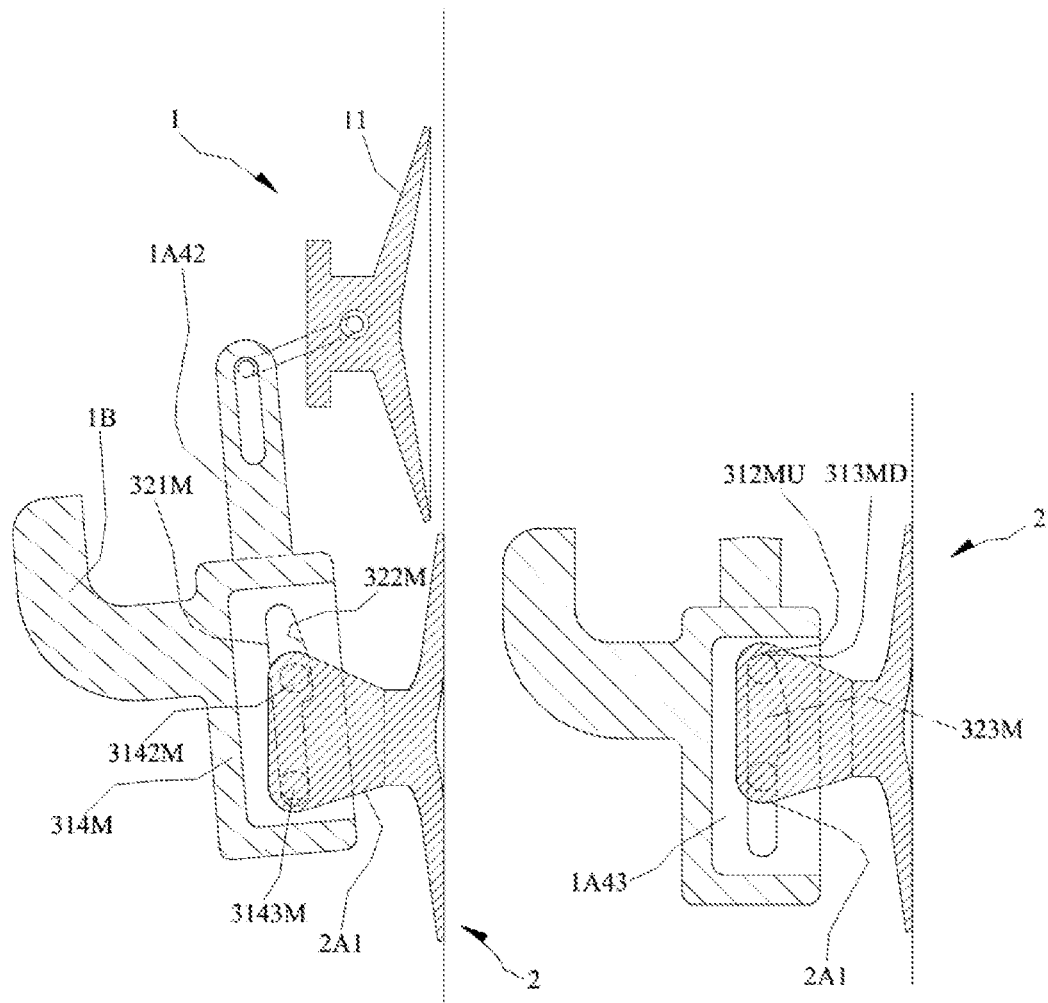
FIG. 39 is a schematic diagram showing a condition that a main attaching member in FIG. 37 starts to come loose from a wall and to fall.
FIG. 40 is a partial schematic diagram showing a condition that the main attaching member in FIG. 37 has come loose from the wall and has fallen to an end.

With regard to the receiving type replacement device 31M, an upper portion of a head portion 3211M in the sliding groove 321M (which can be regarded as a guiding groove performing a guiding function) belongs to the abutment portion (for example, the abutment portion may include the connection block 1A4); a top surface in the sliding groove 321M is an upper connection position 312MU, the front guide pin 3142M belongs to the receiving portion (for example, the receiving portion may include the connection head 2A1 and the front guide pin 3142M); an upper surface of the front guide pin 3142M is a lower connection position 313MD; a position of the lower connection position 313MD is lower than a position of the upper connection position 312MU; when the main attaching member 1 connected to the holding portion 1B comes loose from the wall W and falls, the sliding groove 321M in the connection block 1A4 firstly inclines leftwards (as shown in FIG. 39) and then falls, and the abutment portion falls with the sliding groove 321M until the receiving portion blocks the abutment portion and prevents the abutment portion from falling; the upper connection position 312MU and the lower connection position 313MD are connected, before which the main attaching member 1 is formally used; and when the connection is established, the main attaching member 1 has fallen, and the backup attaching member 2 is formally activated to replace the main attaching member 1 to hold the holding portion 1B and hold an external object supported by the holding portion 1B.

With such a construction, by means of the abutment portion and the receiving portion of the replacement device 31M, a protection mechanism for insurance is provided when the main attaching member 1 accidentally falls down in a usage process due to a condition that the adhering portion 11 comes loose from the wall W and falls down, and the backup attaching member 2 replaces the main attaching member 1 to hold the holding portion 1B and hold an external object supported by the holding portion 1B.

In this embodiment, the replacement device also includes a press-release type replacement device. Description is made by using FIG. 38: when the main attaching member 1 is attached to the wall W, the leftward-extending holding portion 1B is subjected to a downward weight WT of an external object, so as to form counterclockwise torque T; the torque T generates a pulling force for pulling the connecting member 1A41 towards the left, and a pressure F for pressing the front guide pin 3142M and the rear auxiliary pin 3143M towards the right (mainly the rear auxiliary pin); the pressure F pressing towards the wall may tightly press the suction cup 2 against the wall; before the main attaching member 1 falls, the suction cup 2 does not bear the weight of the external object and is tightly pressed against the wall W, and the suction cup 2 may keep in a state of not being activated if the pressure is enough; when the main attaching member 1 falls, the backup attaching member 2 is released and subsequently starts to be used, so as to reserve an overall attaching service life of the backup attaching member 2 and to use the overall attaching service life after the main attaching member 1 falls; and in this way, the backup attaching member 2 can hold the holding portion 1B for a relatively long period of time, which is enough for waiting for a user to recover to a normal state, thereby achieving relatively high safety.

In implementation of this embodiment, a buffer device may be added, for example, the sliding groove 321M is appropriately shortened, so as to enable the distance between the abutment portion and the receiving portion to be relatively short, that is, to enable the upper connection position 312MU to be relatively close to the lower connection position 313MD, such that the holding portion 1B may have a relatively short falling stroke; and a good cushioning pad is further disposed between the abutment portion and the receiving portion, which all function to reduce impact and vibration, and prevent an external object borne by the holding portion 1B from falling, thereby achieving a stable and safe safety mechanism 3M. In this embodiment, the guiding device 32M includes the sliding groove 321M and a guiding surface 322M disposed in the connection block 1A4, and the front guide pin 3142M and the rear auxiliary pin 3143M disposed at the connection head 2A1. The connection block 1A4 provided with the sliding groove 321M and the guiding surface 322M may be regarded as a guided portion, and the connection head 2A1 provided with the front guide pin 3142M and the rear auxiliary pin 3143M may be regarded as a guiding portion. As stated earlier, when the main attaching member 1 falls from the wall, the sliding groove 321M firstly inclines leftwards (as shown in FIG. 39) and then falls. When the inclined guiding surface 322M touches the front guide pin 3142M and continues falling, the front guide pin 3142M enables the sliding groove 321M, together with the connection block 1A4 and the holding portion 1B, to move rightwards, so as to restore the uprightness of the guiding surface 322M.

In this embodiment, the main attaching member 1 also has a function of a warning information display member, and thus can be regarded as belonging to a warning device. When the main attaching member 1 comes loose from the wall W and falls down, the connecting member 1A41 (e.g. the connecting ring) may fall long the groove hole 1A421 on the connecting rod 1A42, so as to enable the adhering portion 11 to fall at a place that can be obviously and easily seen, which is also a place that hinders the usage of the holding portion 1B, thereby clearly and explicitly sending out information of a warning and a usage pause. Therefore, after the main attaching member 1 comes loose from the wall W, a user can immediately discover, by means of the prompt of the warning information, the situation and performs a recovery operation.

Figure 37:
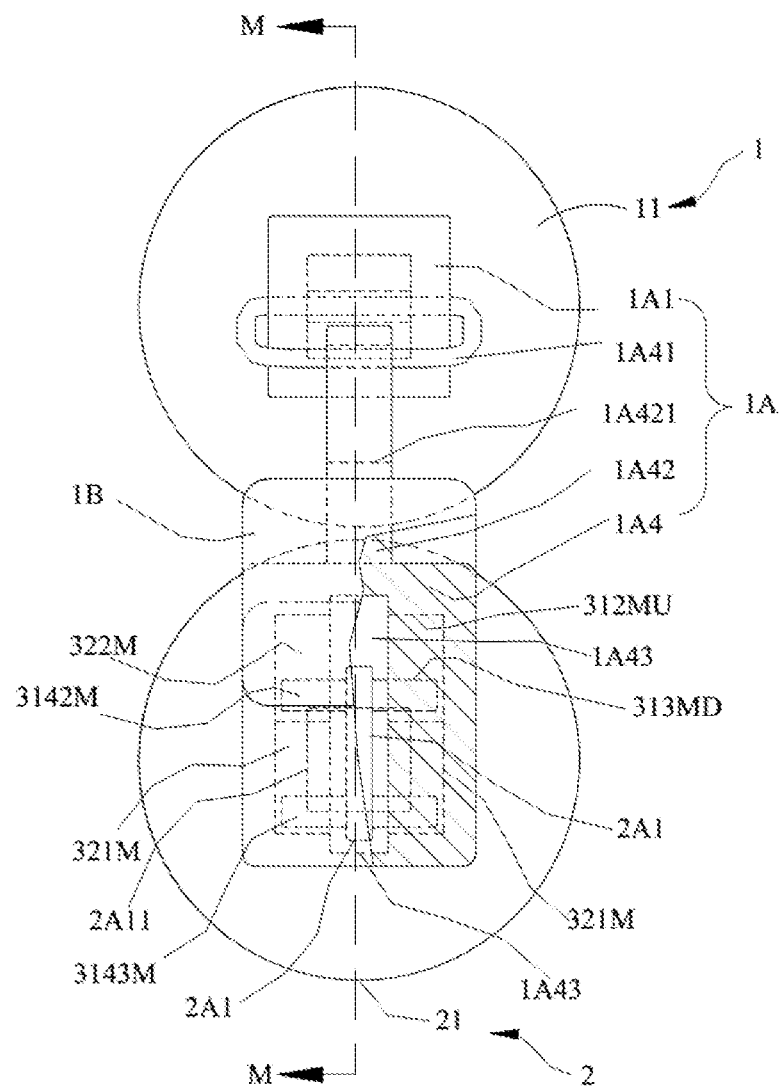
FIG. 37 is a front view of a ninth embodiment of the adhesion-type holding structure mounted onto a wall according to the present invention.

Besides, in other examples, any one of the main attaching member 1 and the backup attaching member 2 in FIG. 37 may be changed to the form according to the aforementioned seventh embodiment.

The Tenth Embodiment

FIG. 41A to FIG. 43 show a construction of the tenth embodiment of the adhesion-type holding structure mounted onto a wall according to the present invention. In the figures of this embodiment, a holding portion 1B of a main attaching member 1, an adhering portion 11, and a backup attaching member 2 are similar to corresponding parts in the ninth embodiment. Structural differences between this embodiment and the ninth embodiment are that: (1) in this embodiment, a connection portion 1A of the main attaching member 1 uses a different construction, so as to achieve a function of warning the falling of the main attaching member, and (2) in this embodiment, a contact portion capable of being in contact with a wall is further included, the holding portion 1B is connected to the contact portion, so as to transfer, to the contact portion, a force to which the holding portion 1B is subjected when the holding portion 1B bears an external object, thereby pressing the contact portion to be in contact with the wall.

Figure 42:
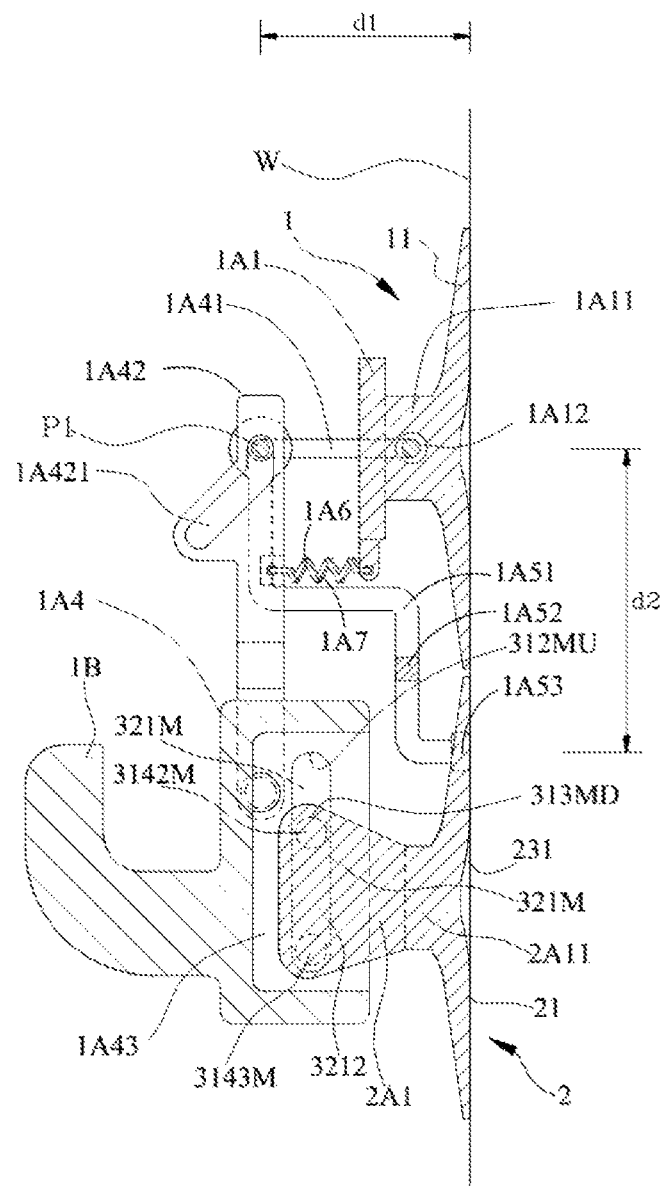
FIG. 42 is a cross-sectional view taken along the line Q-Q of the holding structure in FIG. 41A.

With regard to the contact portion, in an embodiment, the holding structure further includes a support frame; the contact portion is connected to the holding portion 1B by means of the support frame; the support frame is flexible; an elastic member may be further arranged, so as to enable the contact portion to abut against the wall. In addition, when structure simplification and component reduction are taken into consideration, the support frame may be completely securely connected to or partially securely connected to the holding portion 1B or the main attaching member 1. In another embodiment, if the lateral distance between a position of the wall at which the contact portion abuts against and a maximum outer bearing edge of the holding portion is da, the lateral distance between an estimated force receiving central position of the holding portion when the holding portion bears an external object to the wall is d1, and the longitudinal distance between the position of the wall at which the contact portion abuts against (the position of a support pad 1A53) to an attaching center of the main attaching member 1 is d2, da, d1, and d2 satisfy the relationship of $0.2 \leq d1/d2 \leq 3$, where $d1 \leq da$. In the example of FIG. 42, it may be set that d1=da/2. The foregoing maximum outer bearing edge of the holding portion is: an edge of an external object-bearable region of the holding portion that is farthest from the wall is called the maximum outer bearing edge of the holding portion. Besides, the attaching center of the main attaching member 1 is: a central position for providing a bearing force of the main attaching member 1, where the central position is located at a region, adhering to a wall, of the main attaching member 1. In FIG. 42, the attaching center of the main attaching member 1 is a central point of a region, adhering to the wall, of the adhering portion 11 of the main attaching member 1, that is, the center of the adhering portion 11. Generally, an adhering region or adhering manner of an attaching member may be different, and thus, in addition to the central point of the region adhering to the wall, the attaching center may be within the range of the region.

Figure 41A:
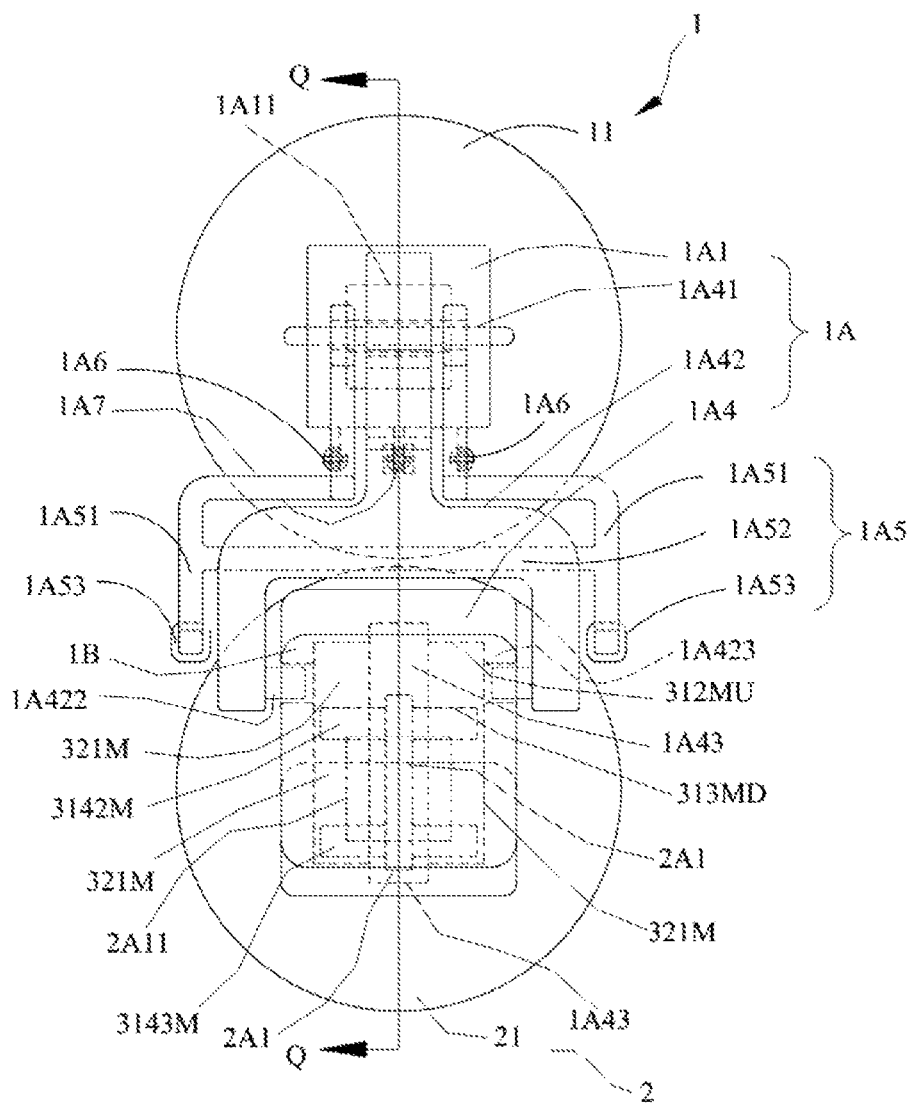
FIG. 41A is a front view of a tenth embodiment of the adhesion-type holding structure mounted onto a wall according to the present invention.
Figure 41B:
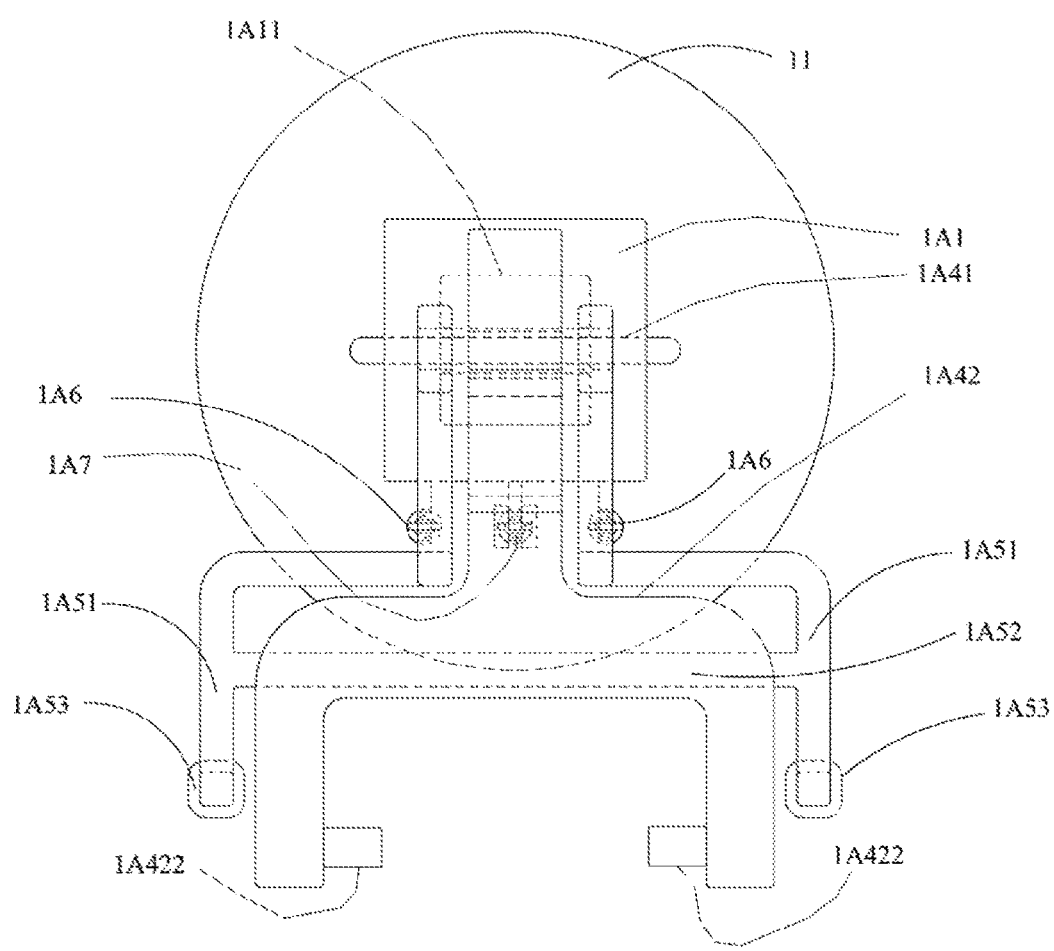
FIG. 41B is an enlarged view of an upper part of the tenth embodiment of the adhesion-type holding structure mounted onto a wall in FIG. 41A.

As shown in FIG. 41A to FIG. 41B, and FIG. 42, in this embodiment, the connection portion 1A of the main attaching member 1 includes a connection head 1A1, a connecting member 1A41 (e.g. a connecting ring), a connecting rod 1A42, and a connection block 1A4, where the connection head 1A1 connected to the adhering portion 11 is connected to the connecting rod 1A42 by means of the connecting member 1A41 (e.g. the connecting ring). The connection head 1A1 includes a connecting neck portion 1A11 connected between the connection head and the adhering portion 11 of the main attaching member, and a connecting shaft hole 1A12 located at the connecting neck portion. In FIG. 41A to FIG. 41B, a square connecting ring is used as an example of the connecting member 1A41. The connecting member 1A41 penetrates through the connecting shaft hole 1A12 on the connecting neck portion 1A11 and thus can rotate in the connecting shaft hole 1A12, the other side of the connecting member 1A41 penetrates through a groove hole (a special-shaped groove) 1A421 on the connecting rod 1A42 to be connected to the connecting rod, and thus can move in the groove hole. The connecting rod 1A42 approximately assumes a Y shape; the connecting rod 1A42 has two cylindrical short shafts 1A422; the short shafts are inserted into short shaft holes 1A423 at two sides of the connection block 1A4, such that the connecting rod 1A42 can swing; as shown in FIG. 42, the groove hole 1A421 has a part that inclines outwards relative to the wall, so as to guide, when the adhering portion 11 falls, the adhering portion 11, the connecting rod 1A42, and the support frame 1A5 to assume folded shapes shown in FIG. 43, thereby achieving a function of warning the falling of the main attaching member.

For example, the support frame includes a support frame body and a contact portion (the position of a support pad 1A53) capable of being in contact with a wall, the support frame body is connected to the main attaching member, and the holding portion can transfer, to the contact portion by means of the support frame, a force to which the holding portion is subjected when the holding portion bears an external object, so as to press the contact portion (the support pad 1A53) to be in contact with the wall. For another example, the support frame body is flexibly connected to the main attaching member, the holding structure further includes an elastic member connected between the main attaching member and the support frame, and the contact portion of the support frame may be enabled, by means of the elastic member, to abut against the wall.

With regard to specific examples of the support frame, referring to FIG. 41A to FIG. 41B and FIG. 42, in this embodiment, the main attaching member 1 further includes a support frame 1A5, and the support frame 1A5 is flexibly connected to the connection portion 1A and is used for abutting against the wall W, so as to apply a normal force to the wall W. The support frame 1A5 includes support ribs 1A51 and a support rail 1A52, and the contact portion of the support frame 1A5 includes the support pads 1A53. The support ribs 1A51 are fitted with the connecting rod 1A42 by means of the connecting member 1A41 (e.g. a connecting ring); the support rail 1A52 connects the two support ribs 1A51, so as to stabilize an overall structure of the support frame 1A5; each of the two support pads 1A53 is disposed at a tail end of each of the support ribs 1A51, and is used for abutting against the wall W.

Further, in order to enable the support frame 1A5 to abut against the wall W, in this embodiment, the main attaching member 1 further includes one or more elastic members 1A6; the elastic members 1A6 are elastic elements capable of generating pulling forces, for example, a tension spring, a torsion spring, or other springs, and are disposed between the connection portion 1A (the connection head 1A1 shown in the figures) and the support frame 1A5; when the elastic members 1A6 are in a first normal usage state, the elastic members 1A6 guarantee that the support pads 1A53 at the tail ends of the support frame can be in contact with the wall W; and in the figures, tension springs are drawn, the tension springs stretch to press the support pads 1A53 towards the wall.

In FIG. 42, when the holding portion 1B is subjected to a weight, an upper end P1 of each of the support ribs 1A51 is pulled downwards, and a normal force is applied to the wall W by means of the support ribs 1A51 and the support pads 1A53, so as to enable the wall W to generate an upward static friction force parallel to the wall for the support pads 1A53, thereby counteracting a part of or even all of the weight to which the holding portion 1B is subjected. In practical application, a substance or a material with an appropriate friction coefficient may be selected to manufacture the support pads 1A53 (e.g. rubber or silica gel), so as to generate the required static friction force. This embodiment is not limited to the support frame and the elastic members in the foregoing examples. In other examples, a support frame 1A5, or an elastic member 1A6, or a connection portion 1A, or various combinations thereof with any size, quantity, or geometrical shape that satisfies the foregoing relationship $0.2 \leq d1/d2 \leq 3$ is provided, or a support frame 1A5, or an elastic member 1A6, or a connection portion 1A is removed from a position between the holding portion 1B and each support pad 1A53 (the contact portion), which can be regarded as examples generated in accordance with this embodiment. For example, the support frame body of the support frame 1A5, that is, the support ribs 1A51 and the support rail 1A52, may be achieved by means of a triangle frame; and right-angle sides of the triangle frame are used as the support pads 1A53, so as to enable the support pads 1A53 to have larger areas that are in contact with the wall W; the support frame 1A5 and the connection portion 1A may be connected by means of a torsion spring instead of a tension spring; and each support rib 1A51 may be designed as a zigzag shape, a folded shape, or a cambered shape. Besides, as long as the holding structure further includes a contact portion capable of being in contact with a wall, any structure capable of connecting the holding portion and the contact portion, transferring, to the contact portion, a force to which the holding portion 1B is subjected when the holding portion 1B bears an external object, and pressing the contact portion to be in contact with the wall may be regarded as an embodiment of the present invention.

Figure 43:
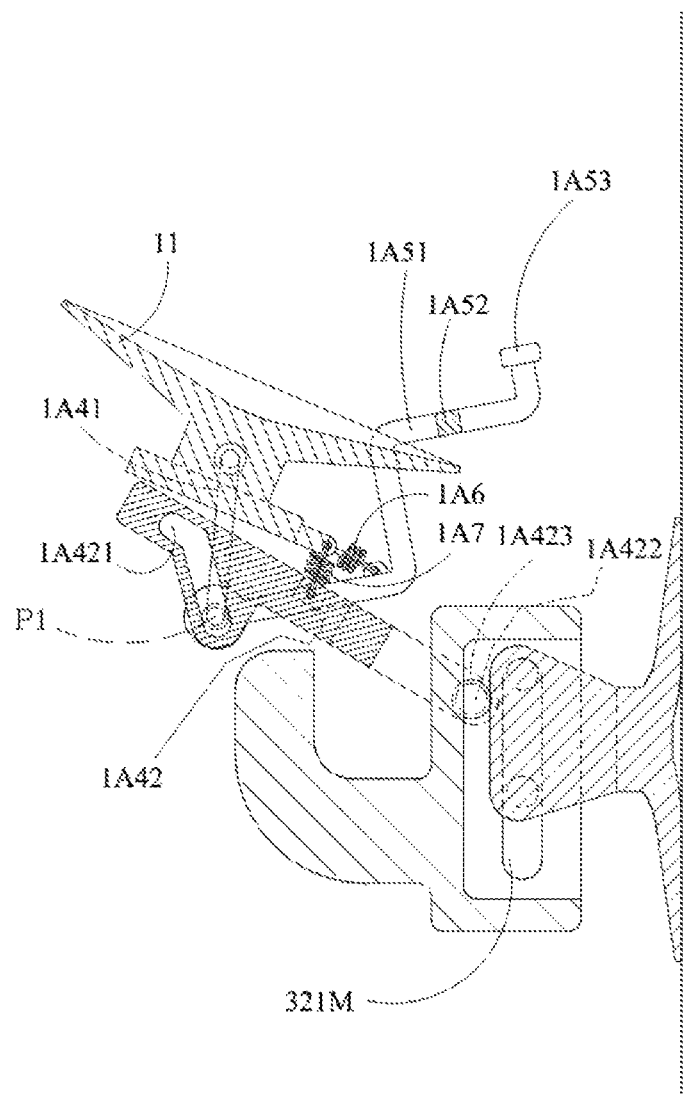
FIG. 43 is a partial schematic diagram showing a condition that a main attaching member in FIG. 41A has come loose from the wall and has fallen.

Further, in this embodiment, the safety mechanism 3M includes a replacement device 31M and a guiding device 32M, which are similar to corresponding parts in the ninth embodiment. This embodiment differs from the ninth embodiment in that the sliding groove 321M of the guiding device 32M is a common-shaped groove. As shown in FIG. 43, when the main attaching member 1 falls, due to relative movements of the guiding portion and the guided portion, the connection block 1A4 slides downwards along the sliding groove 321M, "the guided portion" (that is, the sliding groove 321M) is made upright by "the guiding portion" (that is, the connection head 2A1). In other examples, the sliding groove 321M of this embodiment may be implemented by means of a special-shaped groove.

The same as the ninth embodiment, the replacement device of this embodiment belongs to the receiving type replacement device as well as the press-release type replacement device, and reference is made to the ninth embodiment for description.

Besides, similar to the ninth embodiment, in implementation of this embodiment, a buffer device may be added, for example, the sliding groove 321M is appropriately shortened, so as to enable the distance between an upper connection position 312MU of the abutment portion at an upper portion of the sliding groove 321M and a lower connection position 313MD at a lower end of the receiving portion (the front guide pin 3142M) to be relatively short, that is, to enable the upper connection position to be relatively close to the lower connection position, such that the holding portion 1B may have a relatively short falling stroke; and a good cushioning pad is further disposed between the abutment portion and the receiving portion, which all function to reduce impact and vibration, and prevent an external object borne by the holding portion 1B from falling, thereby achieving a stable and safe safety mechanism 3M.

With regard to the part of a warning device of this embodiment: in FIG. 41A to FIG. 41B, there is a middle elastic member (a tension spring) 1A7 connected between a suction cup head and the connecting rod 1A42, and the elastic member 1A7 and an elastic member (a tension spring) 1A6 are used for folding a suction cup, the connecting rod 1A42, and the support frame 1A5, as shown in FIG. 43. In this embodiment, the main attaching member 1 has a function of a warning information display member. Referring to FIG. 43, after the main attaching member 1 comes loose from the wall W and falls down, by means of the falling of the connecting member 1A41 (e.g. a connecting ring) along an upper groove hole 1A421 of the connecting rod 1A42, and a resilience force of the elastic member 1A6, the main attaching member 1 falls at a place that can be obviously and easily seen, which is also a place that hinders the usage of the holding portion 1B. In this way, information of a warning and a usage pause is clearly and explicitly sent out, such that a user can discover, as soon as possible, a condition that the main attaching member 1 comes loose from the wall 1, and perform a recovery operation.

The following refers to the ninth embodiment, when the main attaching member 1 is attached to the wall W, a weight applied by an external object to the holding portion 1B is converted into a force for pressing the backup attaching member 2 towards the wall W, such that when the main attaching member 1 is subjected to a force in a usage state, the backup attaching member 2 does not bear the weight of the external object and is tightly pressed against the wall W, and thus is in a state of not being activated; and after the main attaching member 1 falls, the backup attaching member 2 starts to be used.

This embodiment is of an idealized construction. In practical application, a similar effect can be achieved when some parts of the construction are reduced, for example, the support ribs 1A51 are securely connected to the connecting member 1A41, or the support ribs 1A51 are directly connected to the connection head 1A1, or the upper groove hole 1A421 is changed to a round shaft hole located at a position P1. Further, in some examples, the support frame 1A5 and the elastic members 1A6, 1A7 in this embodiment may be removed; or the support frame 1A5, the elastic members 1A6, 1A7, and the connection portion 1A in this embodiment are implemented in the ninth embodiment.

Besides, in some examples according to any of the aforementioned embodiments, any one of the adhering portion 11 of the main attaching member 1 and the adhering portion 21 of the backup attaching member 2 may be changed to the form according to the aforementioned seventh embodiment.

The Eleventh Embodiment

Figure 44:
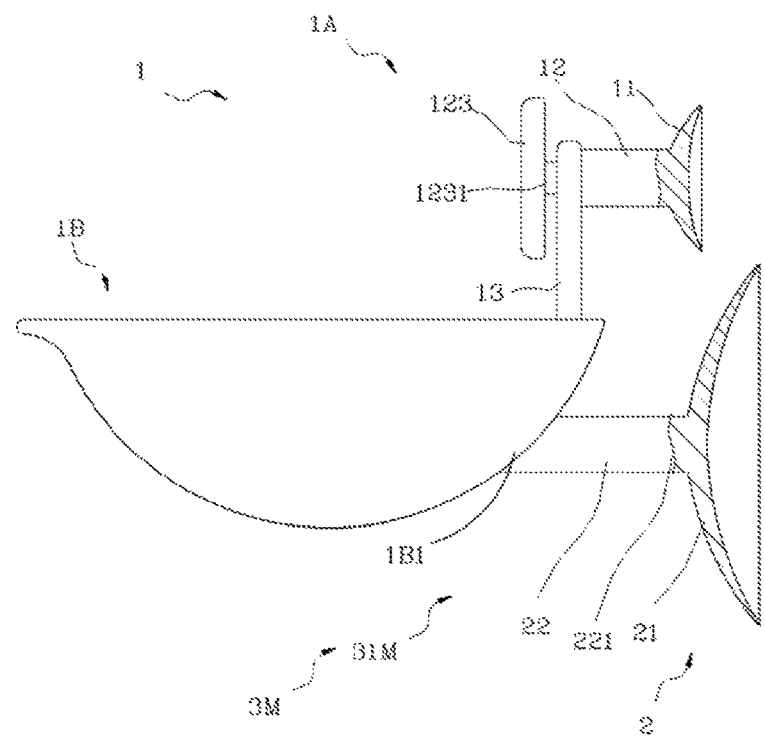
FIG. 44 is a side view of an eleventh embodiment of the adhesion-type holding structure mounted onto a wall according to the present invention.
Figure 45:
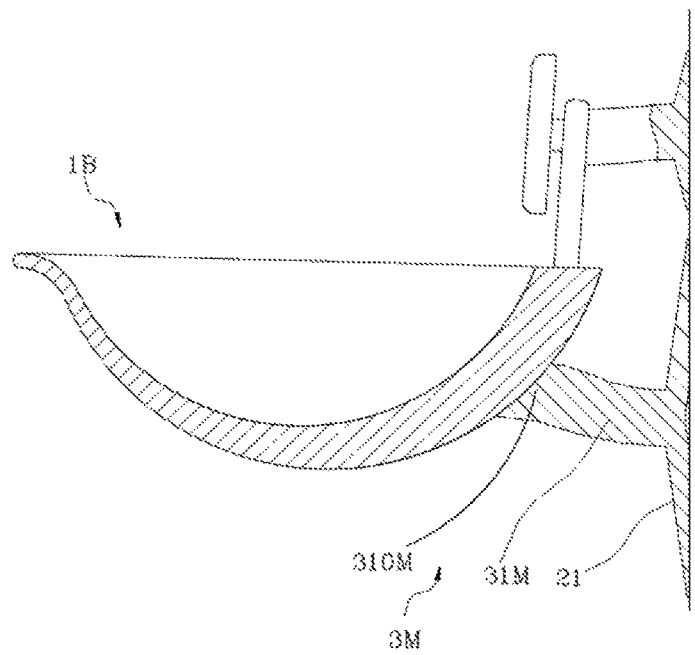
FIG. 45 is a schematic diagram showing a condition that the holding structure of FIG. 44 starts to be formally used.
Figure 46:
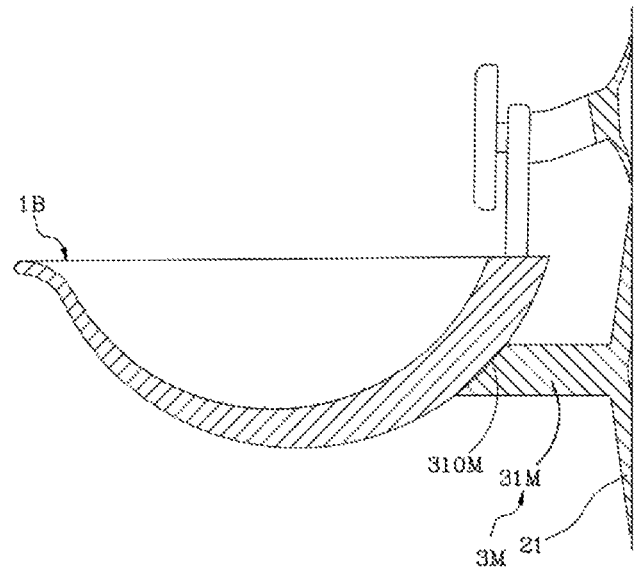
FIG. 46 is a schematic diagram showing a condition that a main attaching member in FIG. 45 starts to come loose from a wall.

FIG. 44 to FIG. 46 show a construction of the eleventh embodiment of the adhesion-type holding structure mounted onto a wall according to the present invention. In the figures of this embodiment, the same as the aforementioned embodiments, a holding structure includes a main attaching member 1, a backup attaching member 2, and a safety mechanism 3M; the main attaching member 1 includes an adhering portion 11, a connection portion 12, and a holding portion 1B; and the backup attaching member 2 includes an adhering portion 21 and a base 22. The safety mechanism 3M includes a replacement device 31M disposed between the main attaching member 1 and the backup attaching member 2, where the backup attaching member 2 has a relatively long falling stroke; and for example, in the figures, the adhering portion 11 located at an upper position is a relatively small suction cup, and the adhering portion 21 located at a lower position is a relatively large suction cup. A definition of the falling stroke is: a displacement of a central point of a suction cup surface from a state that the suction cup is completely attached to the wall to a state that the suction cup falls.

The holding structure of this embodiment differs from the aforementioned embodiments in a "press-release type" replacement device 31M of the safety mechanism 3M. When the main attaching member is attached to a wall, the backup attaching member is pressed against the wall by using an elastic force of an elastic structure of the safety mechanism, such that the backup attaching member is in a state of not being formally activated and is kept effective. After the main attaching member falls, the backup attaching member is released and starts to be used, such that the backup attaching member may use a whole attaching service life thereof to individually hold the holding portion. The elastic structure includes various elastic mechanisms formed by elastically deformable components. An elastically deformable component is disposed between the adhering portion 11 of the main attaching member 1 and the adhering portion 21 of the backup attaching member 2. The elastically deformable component allows structures at two ends (which are not limited to two ends symmetrical with respect to the center, and may be any two different positions on the elastically deformable component) of the elastically deformable component to be stretched, retracted, or turned. The elastically deformable component may be an elastic member or connecting member with elastic rubber or plastics, or a coil spring or other springs, or an elastic telescopic mechanism and/or a bendable mechanism. When the adhering portion 11 of the main attaching member 1 and the adhering portion 21 of the backup attaching member 2 are synchronously attached to the wall, for example, as shown in FIG. 44 and FIG. 45, the elastically deformable component is forced to generate bent or/and stretched/retracted elastic deformation, a resilient force of the elastic deformation (a force for recovering from a deformed state to a free state) can press the adhering portion 21 of the backup attaching member 2 towards the wall.

There are three, for example, types of positions of the elastic mechanism: (1) disposed between the adhering portion 11 of the main attaching member 1 and the holding portion 1B; (2) disposed between the adhering portion 21 of the backup attaching member 2 and the holding portion 1B; or (3) synchronously disposed between the adhering portion 11 of the main attaching member 1 and the holding portion 1B and between the adhering portion 21 of the backup attaching member 2 and the holding portion 1B. FIG. 44 to FIG. 46 show an embodiment of a situation of the foregoing (3).

The replacement device 31M of this embodiment is a "press-release type replacement device", and the operation of the device is to timely enable, when the main attaching member 1 with the holding portion 1B falls from the wall W, the backup attaching member 2 to replace the main attaching member 1 to hold the holding portion 1B. When the main attaching member 1 falls, the elastically deformable component of the replacement device 31M stops pressing the adhering portion 21 of the backup attaching member 2 towards the wall, and at this time, the adhering portion 21 of the backup attaching member 2 replaces the adhering portion 11 of the main attaching member 1 to hold the holding portion 1B.

Referring to FIG. 44 and FIG. 45, the "press-release replacement device" of this embodiment includes a base 12, a connecting rod 13, and a base 22 that are elastically deformable; the holding portion 1B is originally connected, by means of the base 22, to the backup attaching member 2 attached to (sucked to) the wall, but the main attaching member 1 captures, when being attached (sucked), a task of holding the holding portion; when the main attaching member 1 is attached (sucked), the base 12, the connecting rod 13, and the base 22 are elastically deformed to generate elastic forces, so as to press the backup attaching member against the wall, and the backup attaching member is in a state of not being formally activated (it can be regarded as that an upper connection position and a lower connection position are originally connected to form an integral part, but the backup attaching member does not perform a bearing task and is pressed against the wall); after the main attaching member falls, the elastic forces pressing the backup attaching member against the wall disappear, and the backup attaching member is restored to hold the holding portion 1B and starts to use an attaching service life thereof; and in this way, the backup attaching member replaces the holding operation of the main attaching member by means of being released and restored to a usage state.

In the figures, the base 22 connected between the holding portion 1B and the backup attaching member 2 may be further connected to the connecting rod 13, or a material of a connection position that connects the holding portion 1B and the base 22 and belongs to the holding portion, and a material of a connection position that connects the holding portion 1B and the connecting rod 13 and belongs to the holding portion 1B are changed to elastic materials, such that the main attaching member and the backup attaching member are connected by means of elastic components, and the main attaching member presses the backup attaching member against the wall by means of the elastic components; and further, the base 22 in the figures may be changed to a rigid material that is not deformable, and the backup attaching member is pressed against the wall merely by using the elasticity of the base 12 and the connecting rod 13.

In implementation, it is not limited that the main attaching member needs to be located above the backup attaching member, and the number of each type of attaching member is not limited. For example, one backup attaching member is attached to (sucked to) the middle of the wall, and two or more main attaching members (each of which has required structures such as paired bases 12, a connecting rod 13, and a push plate 123) are attached to (sucked to) the wall at positions at the left of, at the right of, or surrounding the backup attaching member. Alternatively, one main attaching member is located at the middle of the wall, and a plurality of backup attaching members surrounds the main attaching member.

The holding portion 1B has a connection position 1B1 connected to the base 22, and the adhering portion 21 of the backup attaching member has a connection position 221 connected to the base 22; in a case in which the backup attaching member 2 is attached to the wall, when the main attaching member changes from a state of being attached to the wall to a state of falling from the wall, the backup attaching member 2 changes from a state of not receiving a bearing task of the main attaching member to a state of receiving the bearing tack of the main attaching member, and thus, the connection position 1B1 has different positions; after the receiving of the bearing task, due to an increase in the downward weight, the position of the connection position 1B1 falls with respect to the connection position 221. Moreover, with regard to the elastically deformable component, the replacement device 31M has a receiving point 310M connected to the holding portion 1B; in a state that the connection is not established and in a state that the connection is established, the replacement device 31M has different shapes, and the receiving point 310M is correspondingly located at different positions, such that two motions including prevention and connection may exist; and in the aforementioned three positions of the elastically deformable component, the motions are first described for scenarios of the position (2) and the position (3). When the main attaching member 1 falls, the elastically deformable component located between the adhering portion 21 of the backup attaching member 2 and the holding portion 1B is not restricted by the pulling from the adhering portion 11, and the original elastic deformation is restored to a free state of the component. Subsequently, the weight of the held external object is transferred from the holding portion 1B to the elastically deformable component, so as to enable the elastically deformable component to be elastically deformed towards a direction reverse to the original deformation direction; at this time, a resistance of the elastically deformable component to the deformation prevents the holding portion 1B from falling; and a larger resistance for prevention accompanies larger deformation until the holding portion 1B stops falling, that is, a prevention motion is achieved. At this time, a force balance state is achieved, that is, the resistance to deformation is equal to the weight of the external object, and the connection motion is completed when the balance state is achieved, that is, the holding portion 1B is completely held, through receiving, by the adhering portion 21 of the backup attaching member 2.

Further, the motions of prevention and connection are described for a scenario of the position (1). Because the adhering portion 21 of the backup attaching member 2 and the holding portion 1B are securely connected, this part is regarded as a rigid body. When the main attaching member 1 falls, the adhering portion 21 of the backup attaching member 2 receives the weight of the external object because the adhering portion 21 is rigidly connected to the holding portion 1B, and replaces the work of the adhering portion 11 of the main attaching member 1. In this way, the two motions including prevention and connection of the replacement are completed synchronously.

In the earlier description, before the prevention motion of the replacement starts, the main attaching member 1 is formally used. When the connection is established, the main attaching member 1 has fallen, and the backup attaching member 2 is formally activated. The aforementioned prevention and connection are continuous motions. The prevention and connection may be sequentially completed in theory, but are instantly completed in practice.

In FIG. 44, the holding structure is in a state of not adhering to the wall, and thus, the replacement device 31M assumes a straight shape.

In FIG. 45, the holding structure is in a state of adhering to the wall, and thus, the replacement device 31M assumes an upwardly bent shape, and the receiving point 310M of the replacement device 31M is at a first position. A position on the wall W to which the adhering portion 11 of the main attaching member 1 adheres is higher than a position on the wall W to which the adhering portion 21 of the backup attaching member 2 adheres, and thus, the replacement device 31M assumes an upwardly bent shape. In addition, the length of the base 12 of the main attaching member 1 may be designed to be less than the length of the replacement device 31M (which may be regarded as the base of the backup attaching member 2), so as to enable the replacement device 31M to be deformed to an upwardly bent shape. The weight borne by the holding portion 1B generates a component force by means of the bent replacement device 31M, so as to press the adhering portion 21 of the backup attaching member 2 against the wall W.

in FIG. 46, the adhering portion 11 of the main attaching member 1 falls from the wall, and at this time, the replacement device 31M restores to the original shape, or may slightly bend or incline downwards, and the receiving point 310M of the replacement device 31M is located at a second positive lower than the first position. At this time, the holding portion 1B is held by the backup attaching member 2.

Besides, in this embodiment, the connection portion 1A of the main attaching member 1 includes the base 12, the push plate 123, a base portion 1231, and the connecting rod 13; the holding portion 1B is a dish-shaped object, a shelf, and the like; and in FIG. 44, a soap dish is used as an example of the holding portion 1B. The connecting rod 13 is connected between the base 12 and the holding portion 1B. The push plate 123 is connected, by means of the base portion 1231, to one end of the connecting rod 13 and assumes a circular plate shape, such that a user presses the push plate 123 to enable the adhering portion 11 of the main attaching member 1 to adhere to the wall W. However, the connection portion 1A and the holding portion 1B may be implemented by using other shapes and manners, and thus, the present invention is not limited thereto.

The Twelfth Embodiment

FIG. 47 to FIG. 51 show a construction of the twelfth embodiment of the adhesion-type holding structure mounted onto a wall according to the present invention. The same as the eleventh embodiment, the holding structure of this embodiment includes a main attaching member 1, a backup attaching member, and a safety mechanism 3M. The holding structure of this embodiment differs from the eleventh embodiment in the construction of a connection portion 1A.

Figure 47:
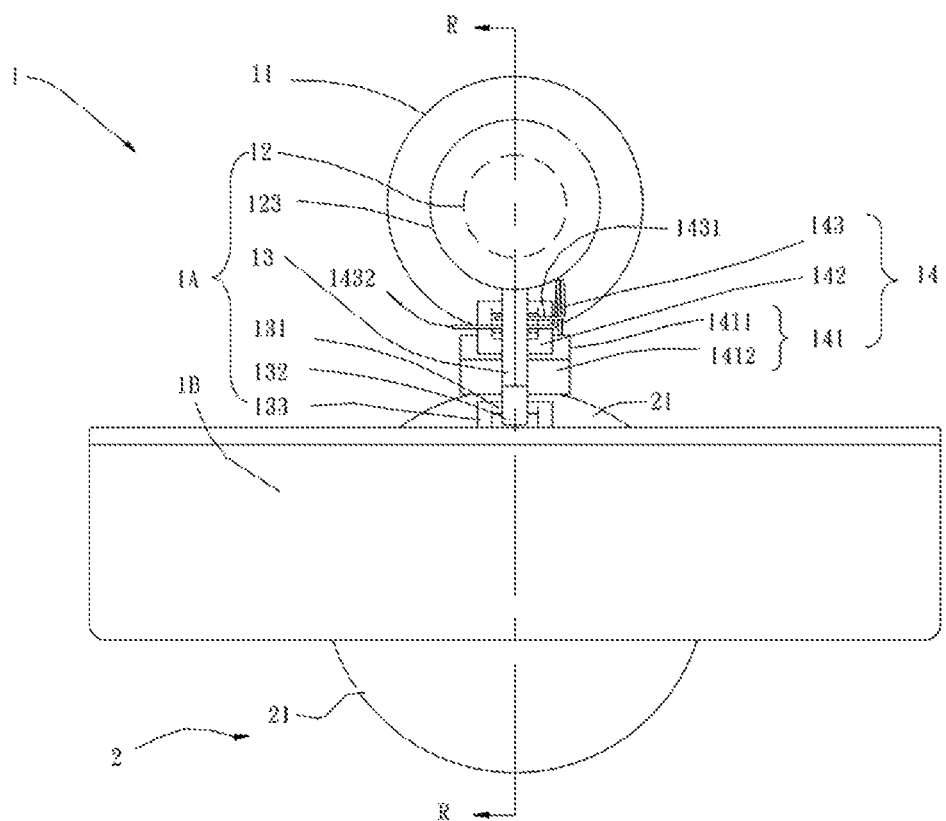
FIG. 47 is a front view of a twelfth embodiment of the adhesion-type holding structure mounted onto a wall according to the present invention.
Figure 48:
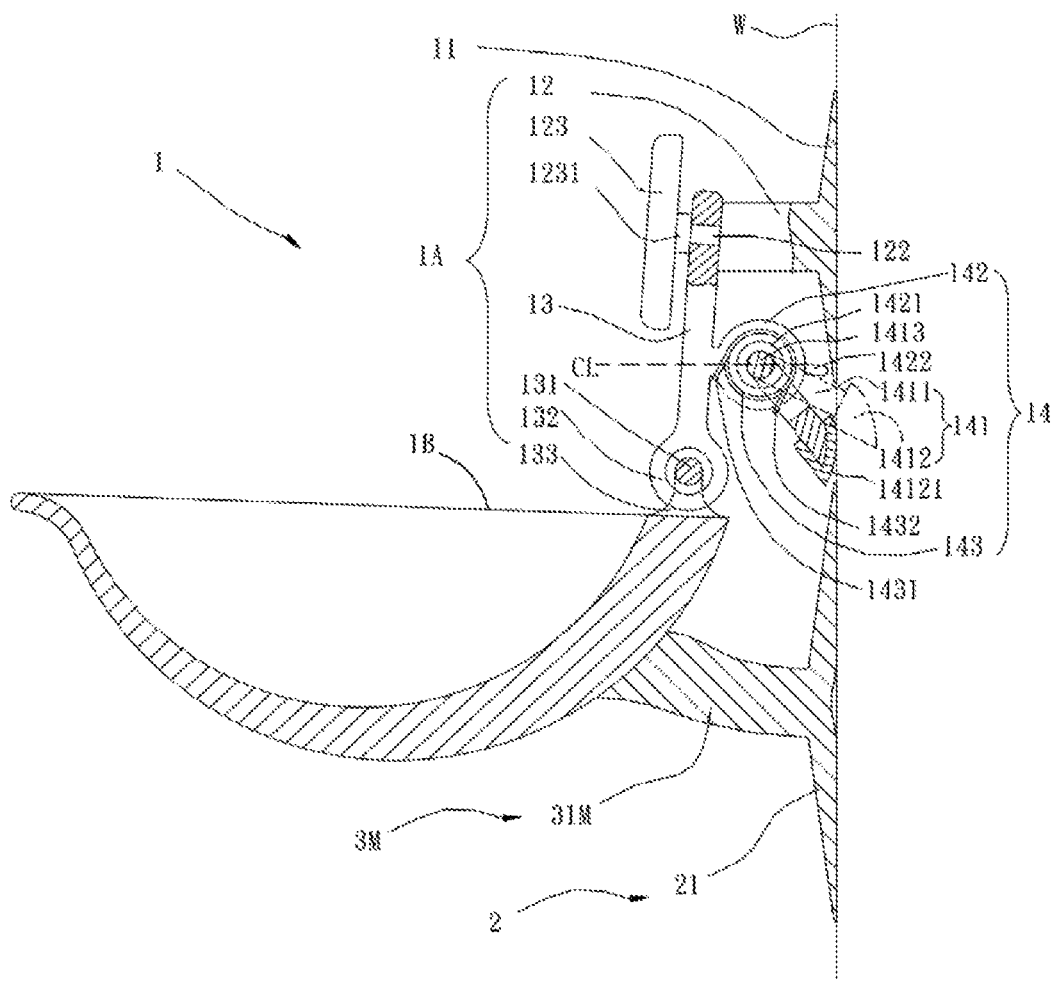
FIG. 48 is a cross-sectional view taken along the line R-R of the holding structure in FIG. 47.
Figure 49:
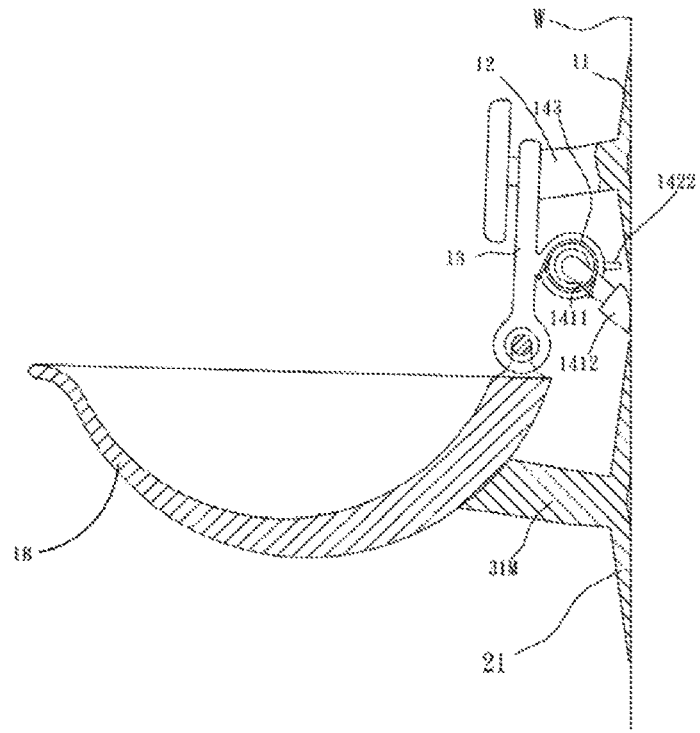
FIG. 49 is a schematic diagram showing a condition that the holding structure of FIG. 47 starts to be formally used.

Referring to FIG. 47 and FIG. 48, FIG. 48 is a cross-sectional view of the holding structure according to this embodiment. In this embodiment, the connection portion 1A is connected to a holding portion 1B by means of a rotating shaft (or a hinge), and also functions to provide warning information. For example, the connection portion 1A includes a base 12, a push plate 123, a base portion 1231, a connecting rod 13, a rotating shaft 131, a bearing 132, and a rotating shaft support 133. In FIG. 48, the main attaching member 1 does not start to be used, and the base (that is, the connection portion) 12 is not subjected to a downward pulling force and thus is not deformed. FIG. 49 is a schematic diagram showing a condition that the holding structure of FIG. 47 starts to be formally used, and at this time, the base (that is, the connection portion) 12 is subjected to a downward pulling force and thus is deformed.

Figure 50:
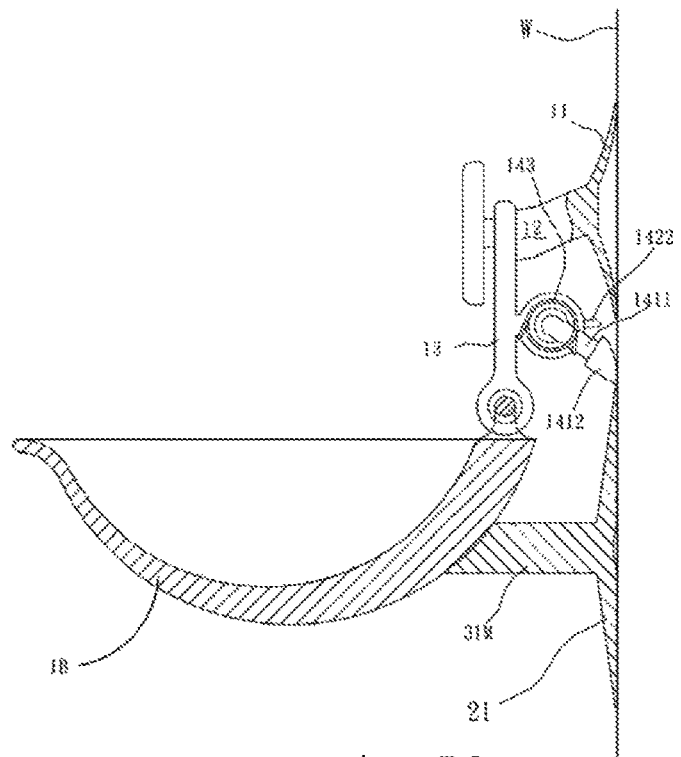
FIG. 50 is a schematic diagram showing a condition that a main attaching member in FIG. 47 starts to come loose from a wall.

A neck portion 122 extending from the base (that is, the connection portion) 12 penetrates through a hole of the connecting rod 13 so as to be securely connected to the connecting rod 13. A base portion 1231 of the circular plate-shaped push plate 123 is connected to the neck portion 122, so as to conveniently press the adhering portion 11 against the wall W. A bearing 132 is provided below the connecting rod 13, the bearing 132 is sleeved on the rotating shaft 131, and the rotating shaft 131 is fastened to the holding portion 1B (e.g. a soap dish) by means of the rotating shaft support 133. The holding portion 1B is further connected to an extended base of the adhering portion 21, where the extended base is regarded as a replacement device 31M of the safety mechanism 3M in this embodiment. Referring to FIG. 48 to FIG. 50, the adhering portions 11 and 21 adhere to the right wall W; the leftwards extended holding portion 1B bears a downward weight, so as to generate counterclockwise torque in the whole holding structure; and the torque separately generates a pulling force for pulling the adhering portion 11 to come loose from the wall, and a pressure for pressing the adhering portion 21 towards the wall.

When the adhering portion 11 of the main attaching member 1 is in a sucked state, the adhering portion 21 of the backup attaching member 2 is pressed against the wall W. If the holding portion 1B does not bear an object, the weight is not large enough to enable the adhering portion 21 to be completely attached to the wall; and a falling stroke of the adhering portion 21 is longer than a falling stroke of the adhering portion 11, so as to ensure that when the adhering portion 11 falls, the falling stroke of the adhering portion 21 is not completed, and the adhering portion 21 can still be sucked to the wall. Moreover, before the adhering portion 21 falls, an enough long period of time exists, so as to wait for a user to perform maintenance, for example, attaching the adhering portion 11 to the wall again.

Figure 51:
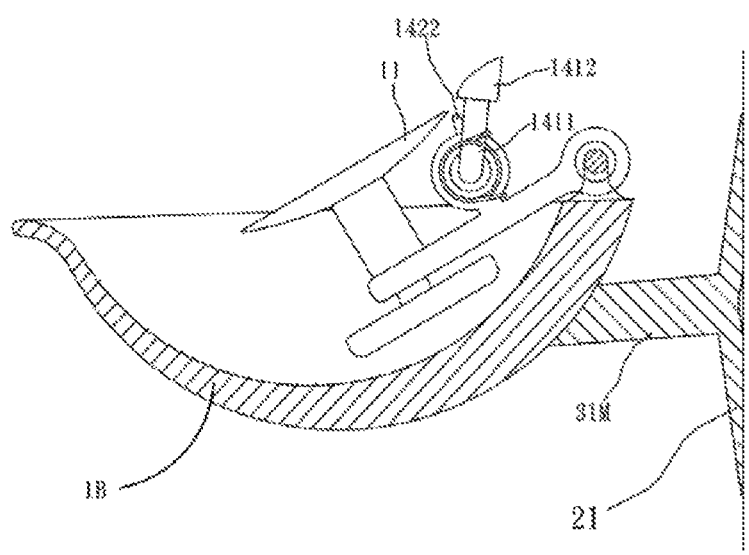
FIG. 51 is a schematic diagram showing a condition that the main attaching member in FIG. 47 has come loose from the wall and has fallen.

As shown in FIG. 50, the main attaching member 1 is formally used, and the adhering portion 11 implements apart of the falling stroke and thus starts to come loose from the wall. Referring to FIG. 51, when the adhering portion 11 of the main attaching member 1 falls from the wall, the connecting rod 13 connected to the adhering portion 11 rotates around the rotating shaft 131 thereof, so as to enable the adhering portion 11 of the main attaching member 1 and the connection portion 1A to fall into the holding portion 1B. The fallen parts are blocked on an accommodation area of the holding portion 1B (e.g. on a bar of soap), and thus, a user necessarily lifts the adhering portion 11 and presses same against the wall again, thereby restarting a falling stroke of the whole holding structure. In this way, the main attaching member 1 has a function of a warning information display member.

When the holding portion 1B is changed from being held by the adhering portion 11 to being held by the adhering portion 21 of the backup attaching member 2, the holding portion 1B may incline outwards. When the holding portion 1B with an arc-shaped cross section, for example, obliquely rotates around the adhering portion 21, an object (e.g. a bar of soap) in the holding portion 1B is still stably placed in the dish. Moreover, on the appearance, the holding portion 1B still approximately retains a form that an arc is in a lower position and an opening is in an upper position. However, the implementation manner of the holding portion 1B is not limited thereto.

Referring to FIG. 48 again, in order to assist a user to appropriately install the holding structure of this embodiment, the holding structure may further include a position displacement mechanism 14.

In one embodiment, the position displacement mechanism 14 may have an abutment member capable of abutting against the wall; when the abutment member is pressed towards the wall, a displacement parallel to the wall may be generated; and when the adhesion-type holding structure mounted onto a wall is to adhere to the wall, the position displacement mechanism 14 may increase, by means of the displacement generated when the abutment member is pressed towards the wall, the distance between the adhering portion 11 of the main attaching member 1 and the adhering portion 21 of the backup attaching member 2, so as to enable the adhesion-type holding structure mounted onto a wall to adhere to the wall. In another embodiment, the position displacement mechanism 14 further includes a swinging device, and the swinging device is connected between the main attaching member 1 and the abutment member or between the backup attaching member 2 and the abutment member, such that when the abutment member abuts against the wall, the swinging device may swing to displace the position to which the adhering portion intends to adhere.

Referring to FIG. 48, the position displacement mechanism 14 is disposed between the main attaching member 1 and the backup attaching member 2, for example, the connection portion 12, and extends to be in contact with the wall. When the adhering portion 21 of the backup attaching member 2 is attached to the wall and the adhering portion 11 of the main attaching member 1 is to be attached to the wall, the position displacement mechanism 14 can be in contact with the wall, so as to lift the position of the adhering portion 11 of the main attaching member 1, such that the adhering portion 11 is attached to the wall. When the adhering portion 11 of the main attaching member 1 is attached to the wall and the adhering portion 21 of the backup attaching member 2 is to be attached to the wall, the position displacement mechanism 14 can be in contact with the wall, so as to move the position of the adhering portion 21 of the backup attaching member 2 downwards, such that the adhering portion 21 is attached to the wall.

As shown in FIG. 48, in one embodiment, the position displacement mechanism 14 may be disposed on the connecting rod 13. The position displacement mechanism 14 may be, for example, an elastic construction extending from the connecting rod 13, and is used for abutting against the wall W. Therefore, when a user installs the holding structure of this embodiment, because the position displacement mechanism 14 is in contact with the wall W first, the holding structure abuts against the wall in a direction of inclining respect to the wall by an appropriate angle. Structures between the adhering portion 11 and the adhering portion 21 of this embodiment need to be elastically deformable. For example, as shown in FIG. 46 and FIG. 48 to FIG. 51, in the structures between the adhering portion 11 and the adhering portion 21, the connection portion 12 and the extended base (that is, the replacement device 31M) connected to the adhering portion 21 are elastically deformable. Therefore, when the position displacement mechanism 14 moves towards the wall, an appropriate displacement in a direction parallel to the wall may be generated, so as to displace a position on the wall to which the adhering portion 11 is finally attached to a relatively high position. The scenario in FIG. 48 is that, the adhering portion 21 is attached to the wall first; when the adhering portion 11 is to be pressed rightwards and is to be pressed towards the wall, an abutment front end 1412 shown in a connection line between two points first abuts against the wall; and when the connecting rod 13 continues moving rightwards, an abutment plate 1411 rotates downwards around a rotating shaft 1413 clockwise, so as to push the rotating shaft 1413, the connecting rod 13, and the connection portion 12 upwards (because an abutment surface 14121 has a relatively large friction force, the downward sliding is prevented).

In another possible implementation, the abutment body 141 in FIG. 48 may be a correspondent body obtained by mirroring the abutment body 141 in FIG. 48 with respect to a horizontal centerline (CL), that is, an inclining direction of the abutment plate 1411 is adjusted to be inclining upwards (which is inclining downwards as shown in FIG. 48), and the abutment surface 14121 of the abutment front end 1412 is also adjusted to a state reverse to the state shown in FIG. 48; the adhering portion 11 of the upper main attaching member 1 is first attached, and the adhering portion 21 of the lower backup attaching member 2 is pressed later; and at this time, the abutment front end 1412 of the position displacement mechanism 14 between the two adhering portions extends rightwards and thus is in contact with the wall first, and thus, a movement is performed towards a reverse direction in accordance with the aforementioned movement manner, so as to enable a position of the wall to which the adhering portion 21 finally adheres to be moved to a relatively low position.

The structures between the adhering portion 11 and the adhering portion 21 can be elastically deformed; the two aforementioned "movements" are used for increasing the distance between the two adhering portions when the two adhering portions are attached to the wall; moreover, in a starting attached state of usage, (referring to FIG. 49), a left end of the holding portion 1B is enabled to be slightly lifted to incline upwards; when a falling stroke is implemented, the left end of the holding portion 1B gradually falls and finally slightly inclines downwards (referring to FIG. 50 and FIG. 51); and in this way, in a whole usage process, the holding portion can be always kept in an approximately horizontal state.

The function of the position displacement mechanism is to increase the distance between the main attaching member 1 and the backup attaching member 2 when the main attaching member 1 and the backup attaching member 2 adhere to the wall. Therefore, a wall-facing front end of a body of the position displacement mechanism 14 may be an anti-sliding body capable of avoiding sliding. For example, the body of the position displacement mechanism 14 is securely connected to the connecting rod 13 and is elastic, and a position of the anti-sliding body in contact with the wall is provided with a material with a relatively large friction coefficient, for example, silica gel and rubber, or a surface of the anti-sliding body in contact with the wall has toothed projections that can prevent sliding or patterns that can prevent sliding.

In the embodiment shown in FIG. 48, the position displacement mechanism 14 includes an abutment body 141, a connection portion 142, and a torsion spring 143. The abutment body 141 includes an abutment plate 1411 and an abutment front end 1412. One end 1431 of the torsion spring 143 is bent and is hooked at a corner between the connecting rod 13 and the connection portion 142, and the other end 1432 of the torsion spring 143 is bent and is hooked at the abutment plate 1411. In this way, a resilient elastic force of the torsion spring can enable the abutment body 141 to rotate counterclockwise with the rotating shaft 1413 being the center. Besides, the abutment front end 1412 of the abutment plate 1411 has a cambered surface. When the abutment body 141 is pressed towards the wall and thus rotates clockwise, the arc surface can roll upwards on the wall, so as to generate an effect of pushing the abutment body 141 upwards. The abutment front end 1412 has an anti-sliding body facing the wall. A surface of the anti-sliding body in contact with the wall is the abutment surface 14121, and may be made of a material with a relatively large friction coefficient, for example, silica gel and rubber. The surface may have toothed projections that can prevent sliding or have patterns that can prevent sliding, so as to reduce sliding. The connection portion 142 is used for connecting the abutment body 141 and the connecting rod 13. The connection portion 142 is securely connected to the connecting rod 13, and is connected to the abutment body 141 by means of a rotating shaft. For example, the connection portion 142 includes a bearing 1421; the abutment plate 1411 has an additional rotating shaft 1413 that is connected to the bearing 1421 in a rotating manner; and the connection portion 142 may further include a baffle 1422, disposed at an outer edge of the bearing 1421, and used for limiting the position of the abutment body 141 (when the abutment body 141 is turned by the torsion spring 143 to rotate counterclockwise, the abutment body 141 is not turned by an excessively large degree to exceed the set position). In this way, the abutment body 141, the connection portion 142, and the torsion spring 143 can generate the movement motion.

By means of the position displacement mechanism 14, the distance between the adhering portion 11 of the main attaching member 1 adhering to an upper portion of the wall W and the adhering portion 21 of the backup attaching member 2 adhering to a lower position of the wall W is pulled to be relatively large, such that the weight borne by the holding portion 1B is borne, by means of the replacement device 31M, by the adhering portion 11 of the main attaching member 1, so as to prevent the adhering portion 21 of the backup attaching member 2 from bearing the weight borne by the holding portion 1B.

In another embodiment, the aforementioned embodiments or other variant embodiments of the position displacement mechanism may be disposed on the connection portion 1A of the main attaching member 1 in the aforementioned eleventh embodiment or other embodiments, which can generate a similar effect.

In another embodiment of the position displacement mechanism, the position displacement mechanism is connected to a main attaching member and includes a connecting member body and an abutment member capable of abutting against a wall, and the abutment member is connected to the connecting member body. When an adhering portion of the main attaching member is attached to the wall and an adhering portion of a backup attaching member is to be attached to the wall, the abutment member of the position displacement mechanism abuts against the wall, so as to move the position of the adhering portion of the backup attaching member downwards, such that the adhering portion of the backup attaching member is attached to the wall. In another example, the position displacement mechanism further includes a swinging device, and the swinging device is connected between the main attaching member (or the connecting member body) and the abutment member or between the backup attaching member and the abutment member, such that when the abutment member abuts against the wall, the swinging device may swing to displace the position to which the adhering portion intends to adhere.

The Thirteenth Embodiment

Figure 52:
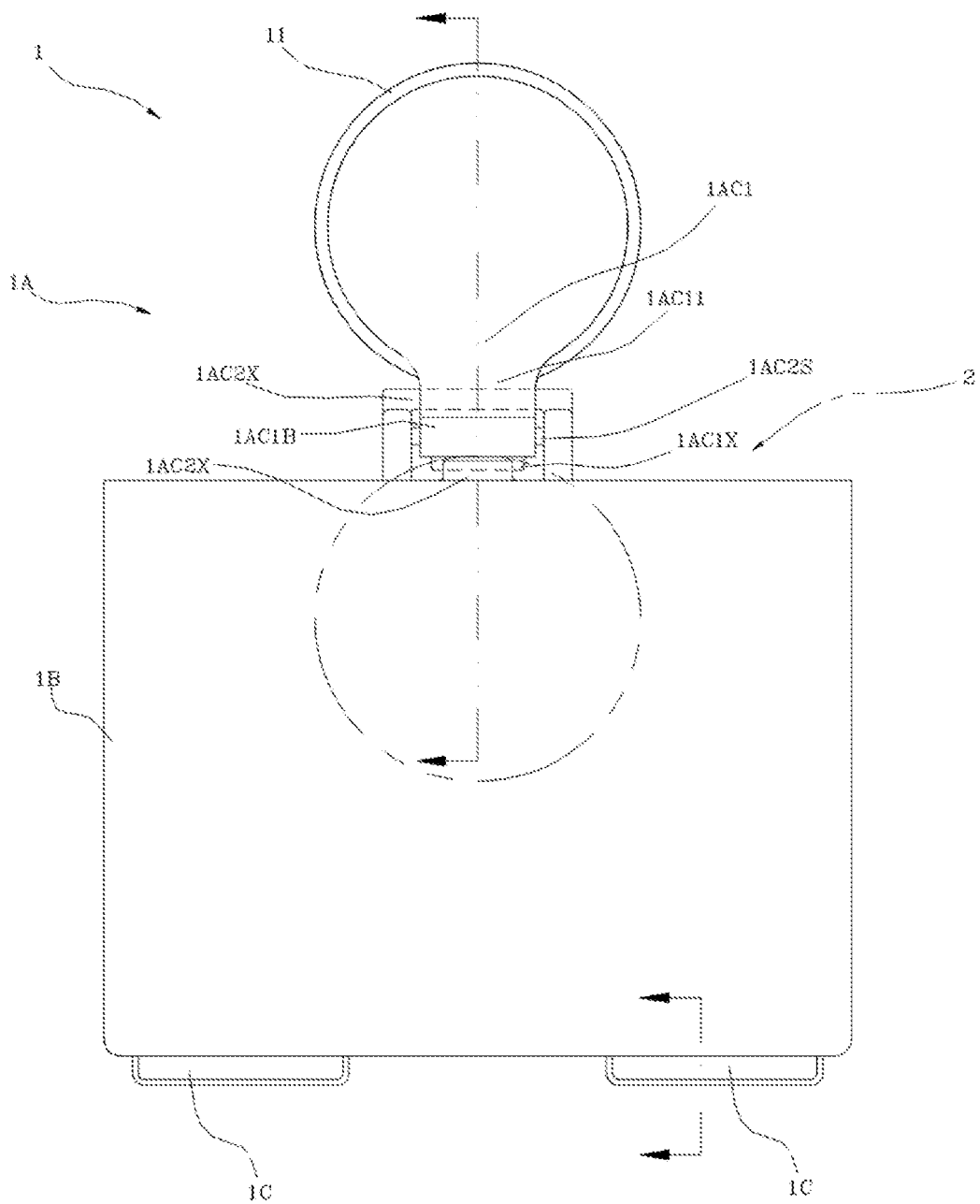
FIG. 52 is a front view of a thirteenth embodiment of the adhesion-type holding structure mounted onto a wall according to the present invention.
Figure 53:
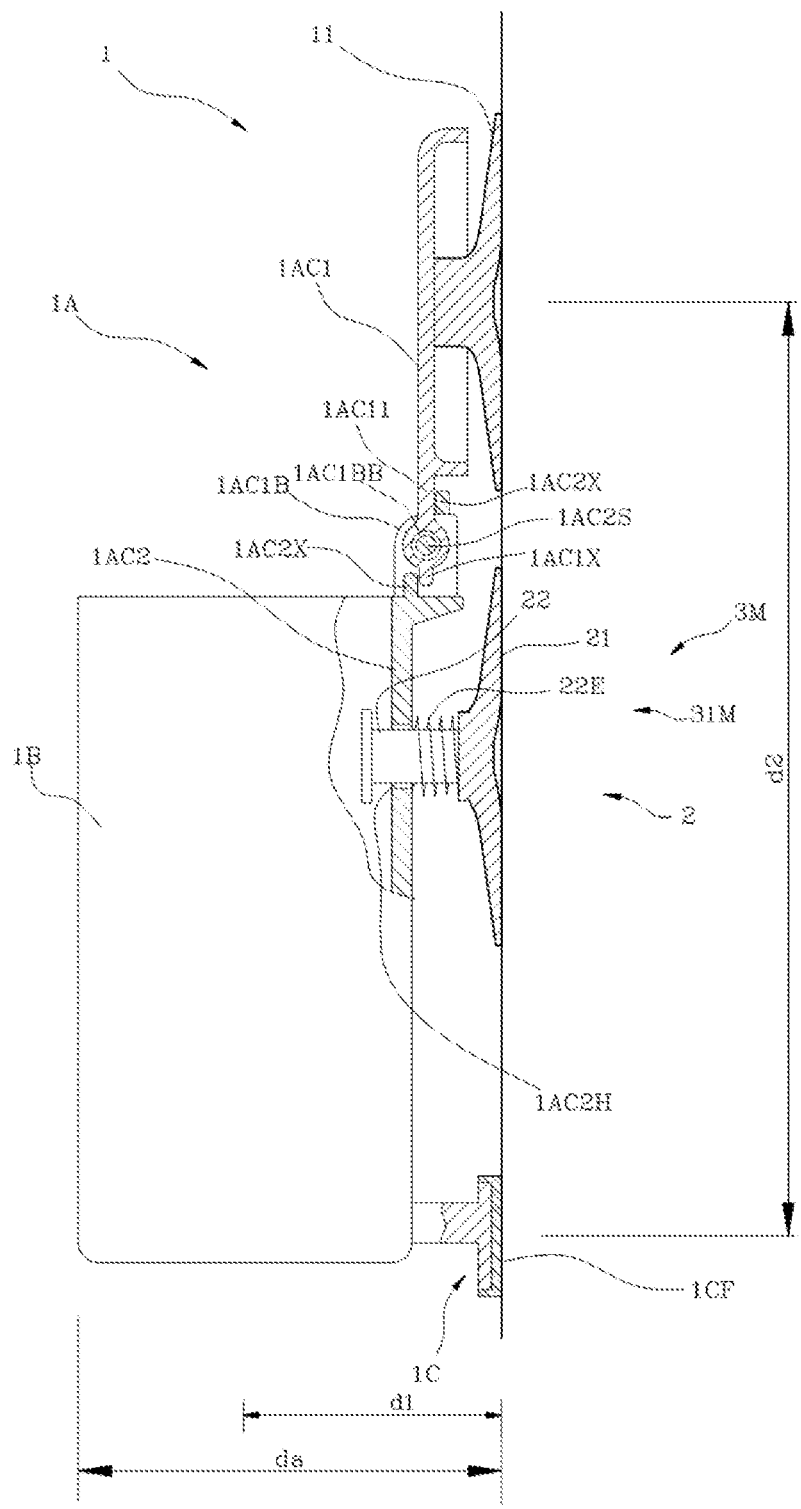
FIG. 53 is a cross-sectional view of the holding structure of FIG. 52.

FIG. 52 is a front view of a thirteenth embodiment of the adhesion-type holding structure mounted onto a wall according to the present invention. FIG. 53 is a cross-sectional view of the holding structure of FIG. 52. The same as the aforementioned embodiments, a holding structure of this embodiment includes a main attaching member 1, a backup attaching member 2, and a safety mechanism 3M; the main attaching member 1 includes an adhering portion 11, a connection portion 1A, and a holding portion 1B; and the backup attaching member 2 includes an adhering portion 21 and a base 22. For example, the adhering portion 11 of the main attaching member 1 and the adhering portion 21 of the backup attaching member 2 are drawn as traditional suction cups in the figures, the holding portion 1B is drawn as a container for accommodating an external object. However, this embodiment is not limited thereto.

As shown in FIG. 52 and FIG. 53, the connection portion 1A of the main attaching member 1 includes a hinge structure, for example, the hinge structure is formed by at least a first connecting member 1AC1 and a second connecting member 1AC2, the holding portion 1B and the adhering portion 11 are connected by means of the connection portion 1A. However, this implementation is not limited to the hinge structure. The connection portion may be any connection structure (which can connect the holding portion 1B and the adhering portion 11), for example, the structures described in the aforementioned embodiments can all be used as or configured as the connection portion of the main attaching member 1.

For example, in the figures, a bearing 1AC1B is disposed below the first connecting member 1AC1 of the main attaching member 1, and thus the bearing 1AC1B has a bearing hole 1AC1BB; a shaft 1AC2S that can penetrate through the bearing hole 1AC1BB to rotate is disposed above the second connecting member 1AC2; a stopper portion 1AC2X is connected to the second connecting member 1AC2; the first connecting member 1AC1 has a neck portion 1AC11 and a lug 1AC1X that extends downwards; and the stopper portion 1AC2X may be disposed at any one or both of two positions shown in FIG. 52 and FIG. 53, so as to stop the neck portion 1AC11 or the lug 1AC1X, so as to block the first connecting member 1AC1.

At a beginning stage of the falling of the main attaching member 1, when an upper portion of the second connecting member 1AC2 starts to move towards a direction away from the wall, the first connecting member 1AC1 above the shaft 1AC2S may be prevented from swinging towards the direction of the wall (which is prevented from rotating around the shaft 1AC2S clockwise in FIG. 53), that is, the second connecting member 1AC2 below the shaft 1AC2S can pull the first connecting member 1AC1 above the shaft 1AC2S to move towards a direction away from the wall. In this way, a force (from an external object borne by the holding portion) driving the second connecting member 1AC2 and the holding portion 1B to come loose from the wall is transferred, by means of the stopper portion 1AC2X, the neck portion 1AC11, or the lug 1AC1X, to the first connecting member 1AC1, so as to be borne by the adhering portion 11 of the main attaching member 1.

Besides, as shown in FIG. 53, the second connecting member 1AC2 extends downwards to be provided with a friction member 1C capable of being in contact with the wall. The main attaching member 1 is fastened to the wall by attaching the adhering portion 11 to the wall at an upper position (referring to FIG. 53), and the holding portion 1B extends outwards from the wall. Therefore, a downward weight of the holding portion 1B presses the friction member 1C towards the wall, such that a friction force reverse to the downward weight is generated between the friction member 1C and the wall, thereby preventing an overall structure connected to the friction member 1C from falling down.

In some application examples, a material of a position of the friction member 1C in contact with the wall is appropriately selected (e.g. materials with relatively large friction coefficients such as silica gel, rubber, and PU); and if the lateral distance between a position of an estimated power receiving center of the holding portion 1B when the holding portion 1B holds an external object and the wall is d1, the distance between a center of the friction member 1C and an attachment center of the main attaching member 1 (e.g. the attachment center of the adhering portion 11) is d2, and the distance between a maximum outer edge of the holding portion 1B and the wall is da, d1, d2, and da are set to satisfy a relationship $0.2 \leq d1/d2 \leq 3$, where $d1 \leq da$. In the example of FIG. 53, d1 is equivalent to da, such that an overall bearing body achieves a good bearing effect, thereby enabling most weight received by the holding portion 1B to be borne by the friction member 1C, and enabling the adhering portion 11 of the main attaching member 1 to merely bear a small part of force. However, implementation manners of this embodiment are not limited thereto. For example, a body of the friction member 1C may be provided with a friction pad 1CF, and the friction member 1C is implemented by using the materials provided in the foregoing embodiments; or the overall friction member 1C is made of the foregoing materials.

Further, the main attaching member 1 may be directly connected to the backup attaching member 2, or may be connected to the backup attaching member 2 by means of an elastic component. In some application examples, the main attaching member 1 is connected to the backup attaching member 2 by means of a stretchable and retractable elastic component. For example, referring to FIG. 53, the first connecting member 1AC1 of the connection portion 1A is connected to the adhering portion 21 of the backup attaching member 2 by means of the base 22 of the backup attaching member 2 and an elastic component 22E. For example, the base 22 is column-shaped and one end of the base 22 is disposed at the adhering portion 21, and the base 22 is further used for penetrating through a through hole 1AC2H of the second connecting member 1AC2 on the wall, and the other end of the base 22 has an end head larger than the through hole, thereby preventing the base 22 from running out from the through hole. Therefore, an elastic force of the elastic component 22E can press the backup attaching member 2 towards the wall, such that when the adhering portion 11 of the main attaching member 1 is attached to the wall, the backup attaching member 2 is pressed against the wall and is in a state of not being formally activated. After the adhering portion 11 of the main attaching member 1 falls, the backup attaching member 2 is released and is not pressed, and the backup attaching member 2 replaces the main attaching member 1 to perform a bearing task. However, implementation manners of this embodiment are not limited thereto.

Referring to FIG. 52 and FIG. 53 again, the replacement device 31M of the safety mechanism 3M of this embodiment is a "press-release type replacement device", and is regarded as including at least the base 22 and the elastic member 22E. In this way, the same as the aforementioned embodiments, the replacement device 31M is disposed between the main attaching member 1 and the backup attaching member 2; when the main attaching member 1 comes loose from the wall and falls down, the backup attaching member 2 can prevent, by means of the replacement device 31M, the main attaching member 1 from falling down, and can timely replace the main attaching member 1 to hold the holding portion 1B.

Other Embodiments

Further, in some embodiment, various types of adhesion-type holding structure mounted onto a wall that can achieve that an attaching service life of an adhering portion of a backup attaching member 2 is longer than an attaching service life of an adhering portion of a main attaching member 1 can be regarded as the embodiments of the present invention. The definition of the attaching service life is: duration from starting to be attached to falling under the same load. Therefore, in accordance with the requirement on the attaching service lives, various changes and design can be made to the materials or features of the adhering portions of the main attaching member and the backup attaching member, for example, the size of a suction cup, the size of a recess of a suction cup, viscosity of an adhesive film, the thickness of a film, and the like, so as to achieve that when the main attaching member falls, because the backup attaching member necessarily does not fall, the backup attaching member replaces the main attaching member to hold the holding portion of the main attaching member or an external object borne by the main attaching member.

Further, in the aforementioned embodiments, conditions for changing an attaching service life of an adhering portion include: (1) structural conditions: an area of the adhering portion, for example; or (2) material conditions: the adhering portion is made as a suction cup, as an adhesive film, or other combinations. For example, an area of the adhering portion of the backup attaching member 2 and an area of the adhering portion of the main attaching member 1 may be used for forming different size relationships: in some examples, the area of the adhering portion of the backup attaching member in the aforementioned embodiments may be made greater than the area of the adhering portion of the main attaching member, so as to enable the attaching service life of the adhering portion of the backup attaching member to be longer than the attaching service life of the adhering portion of the main attaching member.

Further, the foregoing embodiments of the present invention are merely used for illustration. Other embodiments can use different types and element configurations, and use different manners to implement the described functions or structures. Therefore, any implementation manners that can implement a holding structure including a main attaching member, a backup attaching member, and a safety mechanism can be regarded as the embodiments of the present invention, where the main attaching member includes a holding portion for bearing an external object, and an adhering portion for adhering to a wall; the backup attaching member includes an adhering portion for adhering to a wall; the safety mechanism includes a replacement device disposed between the main attaching member and the backup attaching member; when the main attaching member and the backup attaching member are attached to a wall on positions close to each other, and the main attaching member comes loose from the wall and falls down, the backup attaching member can prevent, by means of the replacement device, the main attaching member from falling down, and timely replaces the main attaching member to hold the holding portion.

Besides, all the features disclosed herein can be used for the same, equivalent, or similar objective. Therefore, each disclosed feature is merely an example in a series of concepts derived from a superordinate concept of an equivalent or similar feature.

In view of the above, the content of the present invention are illustrated by using the foregoing embodiments, but the present invention is not limited to these implementation manners. A person skilled in the art can make various variations and modifications without departing from the spirit and scope of the present invention, for example, the technical content illustrated in the aforementioned embodiments is combined or varied to form new implementation manners, and such implementation manners are certainly regarded as the content of the present invention. Therefore, the protection scope of the present application further includes the aforementioned claims and the scope defined by the claims. The embodiments disclosed above are merely examples of the present invention, any modifications and equivalent configurations made in accordance with the spirit and scope of the present invention shall be covered by the claims.

What is claimed is:

1. An adhesion-type holding structure mounted onto a wall, comprising:
    a main attaching member, comprising a holding portion for bearing an external object and an adhering portion for adhering to a wall;
    a backup attaching member, comprising an adhering portion for adhering to a wall; and
    a safety mechanism, comprising:
        a replacement device disposed between the main attaching member and the backup attaching member, wherein when the main attaching member and the backup attaching member are attached to a wall on positions close to each other, and the main attaching member comes loose from the wall and falls down, the backup attaching member can prevent, by means of the replacement device, the main attaching member from falling down, and timely replaces the main attaching member to hold the holding portion; and
        a warning device for generating warning information when the holding portion comes loose from the wall and falls down.

2. The adhesion-type holding structure mounted onto a wall according to claim 1, wherein the safety mechanism further comprises a guiding device for enabling the holding portion to keep an upright posture when the holding portion comes loose from the wall and falls down; and
    a buffer device for reducing a falling speed of the main attaching member that comes loose from the wall and falls down and/or reducing vibration and shaking of the holding portion.

3. The adhesion-type holding structure mounted onto a wall according to claim 1, further comprising a first connection position, a second connection position, and a connection portion; the first upper connection position is disposed at the backup attaching member; the second connection position is disposed at the main attaching member; the first connection position is located above the second connection position; the connection portion is located between the first connection position and the second lower connection position; when the main attaching member falls from the wall, the first connection position pulls the second lower connection position via the connection portion, such that the backup attaching member is connected to the holding portion, and the backup attaching member replaces the main attaching member to hold the holding portion.

4. The adhesion-type holding structure mounted onto a wall according to claim 1, further comprising a first connection position, a second connection position, and a connection portion; the first upper connection position is disposed at the backup attaching member; the second connection position is disposed at the main attaching member; the first connection position is located above the second connection position; the connection portion is located between the first connection position and the second lower connection position; when the main attaching member falls from the wall, the first connection position pulls the second lower connection position via the connection portion, such that the backup attaching member is connected to the holding portion, and the backup attaching member replaces the main attaching member to hold the holding portion.

5. The adhesion-type holding structure mounted onto a wall according to claim 1, wherein the main attaching member further comprises a connection portion connected to the adhering portion of the main attaching member; or a connection portion connected to the holding portion.

6. The adhesion-type holding structure mounted onto a wall according to claim 1, wherein the backup attaching member further comprises a connection portion connected to the adhering portion of the backup attaching member.

7. The adhesion-type holding structure mounted onto a wall according to claim 1, wherein the adhering portion is any one of a suction cup, an adhesive, an adhered pad, an adhesive strip, an adhesive sheet, a magnet, a hot melt adhesive, and a hook and loop fastener.

8. The adhesion-type holding structure mounted onto a wall according to claim 1, wherein the replacement device comprises: a connecting member, having a second connection position connected to the main attaching member and a first connection position connected to the backup attaching member.

9. The adhesion-type holding structure mounted onto a wall according to claim 1, wherein the replacement device comprises: a receiving portion, connected to the backup attaching member and provided with an accommodation groove capable of receiving the main attaching member.

10. The adhesion-type holding structure mounted onto a wall according to claim 2, wherein the guiding device comprises a guided portion and a guiding portion that are respectively disposed at the main attaching member and the backup attaching member; the guided portion and the guiding portion can be fitted with each other and thus can slide relative to each other; and the guiding portion comprises one or more guiding walls disposed at the backup attaching member, or the guiding portion comprises a guiding accommodation position disposed at the backup attaching member, and a guiding surface for guiding the falling main attaching member to arrive at the guiding accommodation position.

11. The adhesion-type holding structure mounted onto a wall according to claim 1, wherein the warning device is a warning information display member capable of displaying warning information, and the warning information is hidden when the main attaching member adheres to the wall, and is visualized after the main attaching member comes loose from the wall.

12. The adhesion-type holding structure mounted onto a wall according to claim 1, wherein the warning device is an electronic warning device capable of sending a warning signal.

* * * * *